United States Patent [19]

Ishida et al.

[11] Patent Number: 4,766,404

[45] Date of Patent: Aug. 23, 1988

[54] COORDINATE INPUT APPARATUS

[75] Inventors: Masato Ishida, Yokohama; Hiroaki Takeda, Kawasaki; Kazuo Watanabe; Akira Suzuki, both of Yokohama; Nobuyuki Suzuki, Musashino; Isamu Sato; Kazuki Miyamoto, both of Yokohama, all of Japan

[73] Assignee: Canon Kabushiki Kaisha, Tokyo, Japan

[21] Appl. No.: 930,913

[22] Filed: Nov. 17, 1986

[30] Foreign Application Priority Data

Nov. 18, 1985 [JP] Japan .................................. 60-258112
Dec. 11, 1985 [JP] Japan .................................. 60-278483

[51] Int. Cl.[4] ..................... G03G 15/00; G08C 21/00
[52] U.S. Cl. ........................................ 355/7; 355/3 R; 355/14 R; 178/18; 340/708
[58] Field of Search .................... 355/3 R, 5, 7, 14 R; 340/707, 708; 178/18, 19

[56] References Cited

U.S. PATENT DOCUMENTS

| 4,340,295 | 7/1982 | Nakamura | 355/7 X |
| 4,492,818 | 1/1985 | Abe | 178/18 |
| 4,558,757 | 12/1985 | Mori et al. | 178/18 |
| 4,609,776 | 9/1986 | Murakami et al. | 178/18 |
| 4,644,391 | 2/1987 | Shibuya et al. | 355/15 X |
| 4,667,248 | 5/1987 | Kanno | 358/280 |

FOREIGN PATENT DOCUMENTS 3148116  7/1982  Fed. Rep. of Germany .
8417149  5/1985  Fed. Rep. of Germany .
2087611  5/1982  United Kingdom .
2089625  6/1982  United Kingdom .

Primary Examiner—Peter S. Wong
Attorney, Agent, or Firm—Fitzpatrick, Cella, Harper and Scinto

[57] ABSTRACT

A coordinate input apparatus (editor) of a copying apparatus and the like includes: a tablet to output a signal indicative of a position which is arbitrarily designated; a pointing device to designate an arbitrary point on the tablet; a recognizing circuit to recognize the positions in the X and Y directions of the point designated by the pointing device; a data memory to store the positions of the designated point; a controller which, when a special area on the tablet is designated by the pointing device, allows the signal indicative of the special area to be output; and a correcting circuit to correct the range of the special area. The positions of the designated point in the X and Y directions are detected a plurality of times and compared. The input coordinate data is discriminated by the result of the comparison to see if it is valid or invalid. When the input data is valid, a copying operation is performed. When it is invalid, the copying operation is stopped and the fact that the input data is improper is displayed by an LED indicator and a buzzer is activated. With this apparatus, the coordinate data can be accurately input from the editor and also the accurate trimming or masking of the image can be realized without an erroneous input operation.

18 Claims, 56 Drawing Sheets

TWO-SIDED COPY FROM ONE-SIDE ORIGINAL

A ORIGINAL  B ORIGINAL

SERIAL PAGE TWO-SIDED COPY
A SIDE  B SIDE

MULITI-COPY

A ORIGINAL  B ORIGINAL

SERIAL PAGE MULTI-COPY

A SIDE  B SIDE

SERIAL PAGE COLOR MULTI-COPY

A SIDE  COLOR ORIGINAL
B SIDE

FIG. 7A 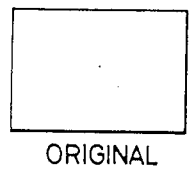 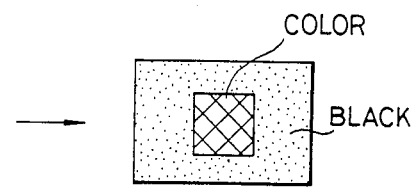
FIG. 7B 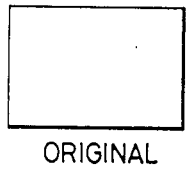 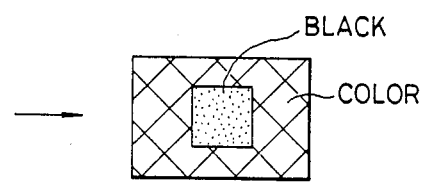
FIG. 7C 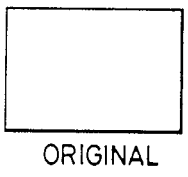 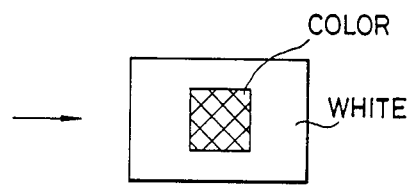
FIG. 7D 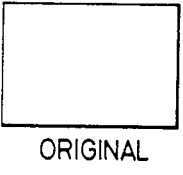 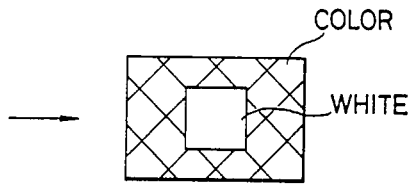
FIG. 7E 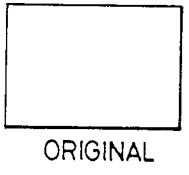 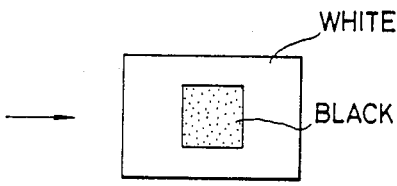
FIG. 7F 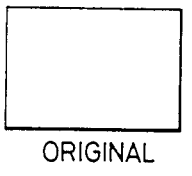 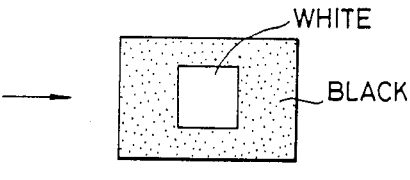

FIG. 31
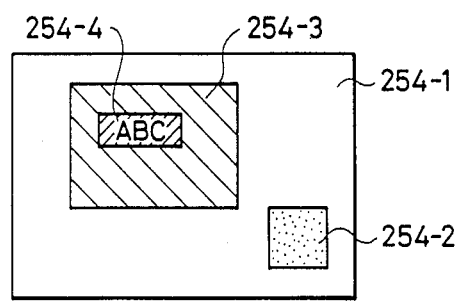
FIG. 32
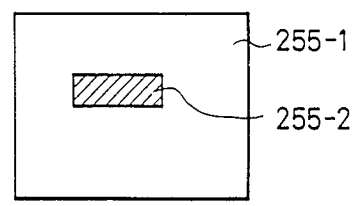
FIG. 33
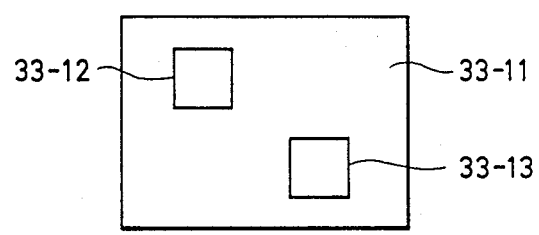
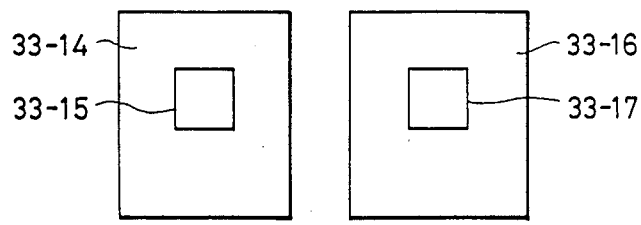

FIG. 75
| NO. | SIZE OF ORIGINAL | CIRCUIT FOR DETECTING ORIGINAL | | |
|---|---|---|---|---|
| | | 12-1 | 12-2 | 12-3 |
| 1 | A3 | ON | ON | ON |
| 2 | B4 | ON | OFF | ON |
| 3 | A4 | ON | ON | OFF |
| 4 | B5 | ON | OFF | OFF |
| 5 | A4R | OFF | OFF | ON |
ON: DETECTION OF ORIGINAL
OFF: DETECTION OF NON-ORIGINAL
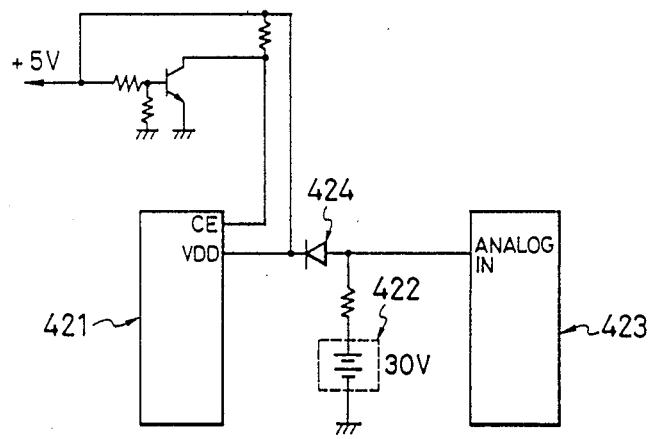
FIG. 76
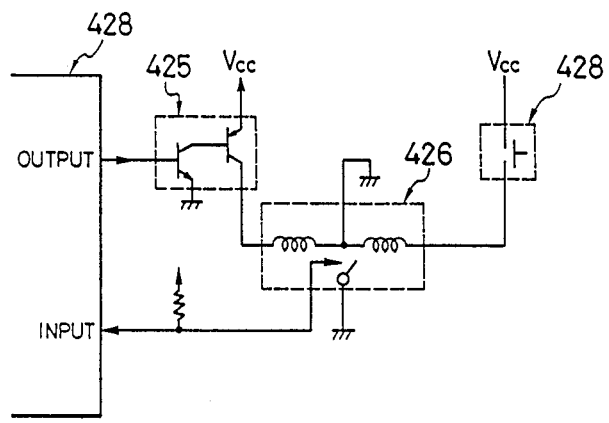
FIG. 77

FIG. 79

| DISPLAY OF THE NUMBER OF COPIES (DATA NUMBER) | CONTENT | DISPLAY OF MAGNIFICATION (STANDARD VALUE) | FUNCTION |
|---|---|---|---|
| 0 | AE INCLINATION | 100 | LARGER SET VALUE → INCLINATION INCREASES |
| 1 | REGISTRATION (LEADING EDGE) | 100 | LARGER SET VALUE → DELAY OF REGISTRATION |
| 2 | BLANK OF LEADING EDGE | 100 | LARGER SET VALUE → BLANK INCREASES |
| 3 | ADJUSTMENT OF PROPER EXPOSURE | 630 | LARGER SET VALUE → AMOUNT OF LIGHT INCREASES |
| 4 | INCLINATION OF COPY DENSITY LESS THAN 6 | 007 | LARGER SET VALUE → AMOUNT OF LIGHT DECREASES (INCLINATION INCREASE) |
| 5 | INCLINATION OF COPY DENSITY MORE THAN 6 | 014 | LARGER SET VALUE → AMOUNT OF LIGHT INCREASES (INCLINATION INCREASE) |
| 6 | DEVELOPMENT-BIAS DC | 180 | LARGER SET VALUE → DEVELOPMENT-BIAS DC INCREASES |
| 7 | DIFFERENCE IN DEVELOPMENT DC BETWEEN COLOR COPY AND BLACK COPY | 050 | LARGER SET VALUE → DEVELOPMENT-BIAS DC INCREASES UPON COLOR COPY |
| 8 | TRANSPORT CURRENT FIRST-SIDE | 220 | LARGER SET VALUE → OUTPUT CURRENT OF TRANSPORT CHARGING COUNTAINER INCREASES |
| 9 | TRANSPORT CURRENT SECOND-SIDE | 140 | LARGER SET VALUE → TRANSPORT CURRENT UPON SECOND-SIDE COPY OF TWO-SIDED/MULTI INCREASES |
| 10 | SEPARATION CURRENT FIRST-SIDE | 070 | LARGER SET VALUE → OUTPUT CURRENT OF SEPARATION CHARGING COUNTAINER INCREASES |
| 11 | SEPARATION CURRENT SECOND-SIDE | 080 | LARGER SET VALUE → SEPARATION CURRENT UPON SECOND-SIDE COPY OF TWO-SIDED/MULTI INCREASES |
| 12 | SPAN IN THE EDITOR X-DIRECTION | 242 | LARGER SET VALUE → RECOGNIZED AREA DECREASES (IN THE X-DIRECTION) |
| 13 | ORIGIN IN THE EDITOR X-DIRECTION | 007 | LARGER SET VALUE → RECOGNIZED AREA DECREASES (ORIGIN) |
| 14 | SPAN IN THE EDITOR Y-DIRECTION | 230 | LARGER SET VALUE → RECOGNIZED AREA DECREASES (IN THE Y-DIRECTION) |
| 15 | ORIGIN IN THE EDITOR Y-DIRECTION | 015 | LARGER SET VALUE → RECOGNIZED AREA DECREASES (ORIGIN) |
| 16 | TIME FOR RETURNING TO STANDARD MODE | 002 | LARGER SET VALUE → TIME FOR RETURNING INCREASES |

COORDINATE INPUT APPARATUS

BACKGROUND OF THE INVENTION

1. Field of the Invention

The present invention relates to a coordinate input apparatus of a copying apparatus and the like.

2. Related Background Art

Hitherto, the masking and trimming of the image of a copying apparatus have been controlled by the input from an editor to designate an area. However, there is the drawback that an image of black stripes and the like is formed in the edge portion because of an erroneous setting (i.e., slight deviation) of the area by the editor and an error of editor.

When the coordinates are designated by pressing a light pen or the like by use of the editor (coordinate input apparatus) to designate an arbitrary area on an original, if the pressing force of the pen is weak or the pressing time of the pen is extremely short, accurate coordinates cannot be recognized, so that the wrong coordinates are recognized.

SUMMARY OF THE INVENTION

It is an object of the present invention to provide a coordinate input apparatus which can eliminate the foregoing drawbacks.

Another object of the invention is to improve a coordinate input apparatus.

Still another object of the invention is to provide a coordinate input apparatus which can perform accurate trimming and masking, in which an unnecessary image is not formed due to the inaccuracy or misoperation of the coordinate input apparatus.

Still another object of the invention is to provide a coordinate input apparatus which can prevent erroneous recognition of coordinates and can perform accurate trimming and masking.

The above and other objects and features of the present invention will become apparent from the following detailed description and the appended claims with reference to the accompanying drawings.

BRIEF DESCRIPTION OF THE DRAWINGS

FIG. 4-1 is a diagram showing LED arrays and a drive circuit thereof;

FIG. 4-2 is a diagram shoiwng the irradiation of the LED onto a drum;

FIG. 4-3 is a diagram showing a light-on timing of the LED;

FIG. 5-1 is a diagram showing a constitution of an editor;

FIGS. 5-2 and 5-3 are equivalent circuit diagrams upon designation in the X- and Y-directions of the editor;

FIGS. 7A to 7F are diagrams showing examples of outputs in an image changing mode;

FIGS. 31, 32, and 33 are diagrams showing examples of outputs in the case of designating areas;

FIG. 75 is a diagram for explaining a method of discriminating the size of original;

FIGS. 76 to 78 are circuit diagrams and a flowchart for explaining the diagnostic operation of an RAM 421;

FIG. 79 is a diagram showing the contents of data in the adjusting mode;

DETAILED DESCRIPTION OF PREFERRED EMBODIMENTS

An embodiment of the present invention will be described in detail hereinbelow with reference to the drawings.

(Overall description)

Figure 1:
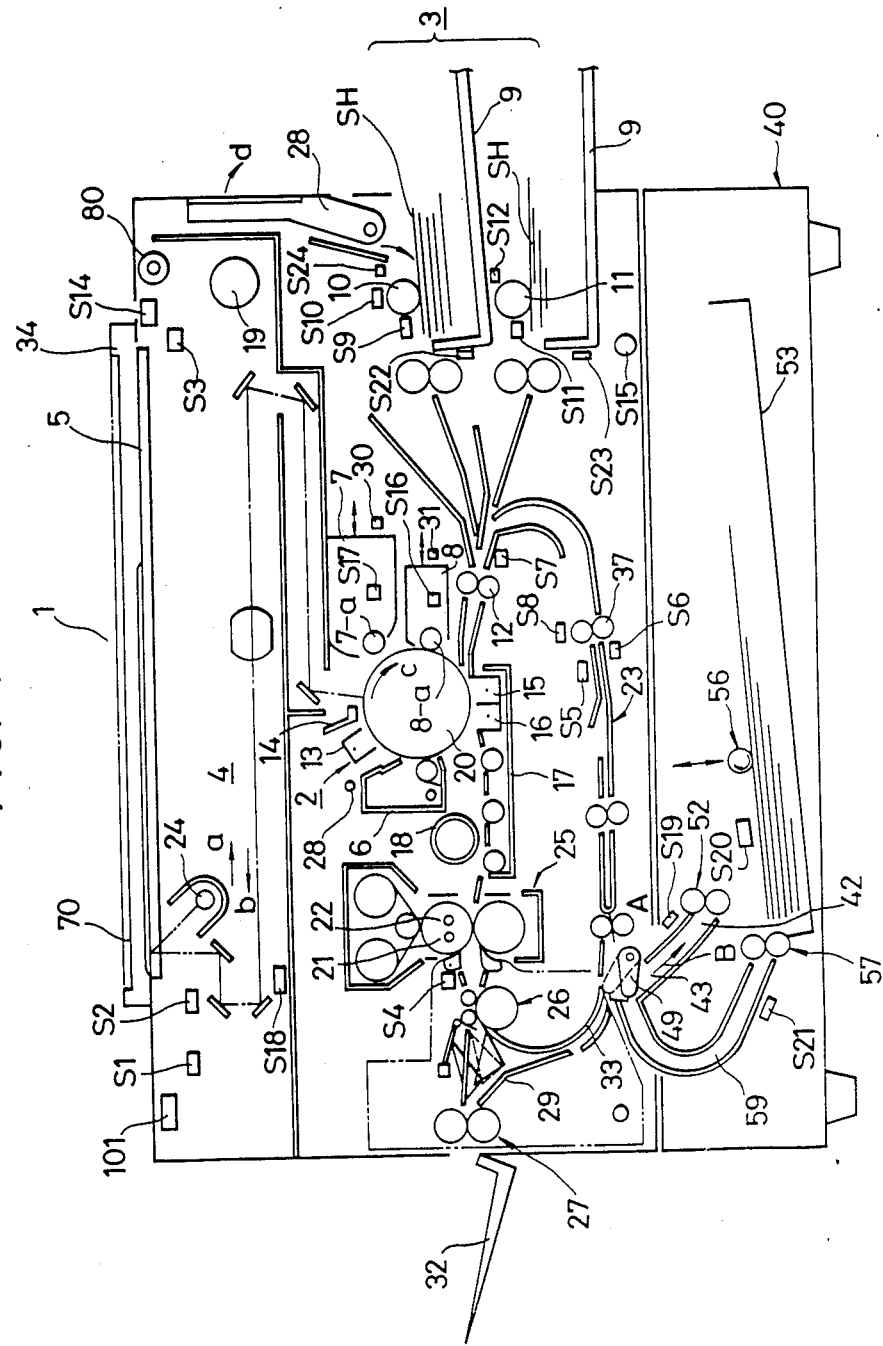
FIG. 1 is a schematic cross sectional view of a copying apparatus to which the present invention can be applied.

FIG. 1 is a schematic constitutional diagram of a copying apparatus according to the invention and shows a main constitution of the copying apparatus and the positions of various sensors $S_1$ to $S_{24}$. In the diagram, reference numeral 1 denotes a main body of the copying apparatus; 2 denotes an image forming section which mainly consists of a photo sensitive drum 20; and 7 and 8 denote development containers in which toners of different colors (e.g., red and black) are stored. As selected one of the two development containers 7 and 8 come into contact with the drum 20. Numeral 3 denotes a paper pick-up section to supply a transfer paper SH into the main body 1 of the copying apparatus (hereinafter, also referred to as the copier). The paper pick-up section 3 comprises cassettes 9 which are detachably mounted to the main body 1, pick-up rollers 10 and 11, and the sensors $S_9$ to $S_{12}$, $S_{22}$, and $S_{23}$. An optical system 4 including a lens system exposes and scans an original and forms an image on the photo sensitive drum 20. The optical system 4 is driven in the directions indicated by arrows a and b by an optical system motor 19. Numeral 23 denotes a second paper pick-up section, which will be explained hereinafter, and 40 denotes a middle tray.

Figure 2:
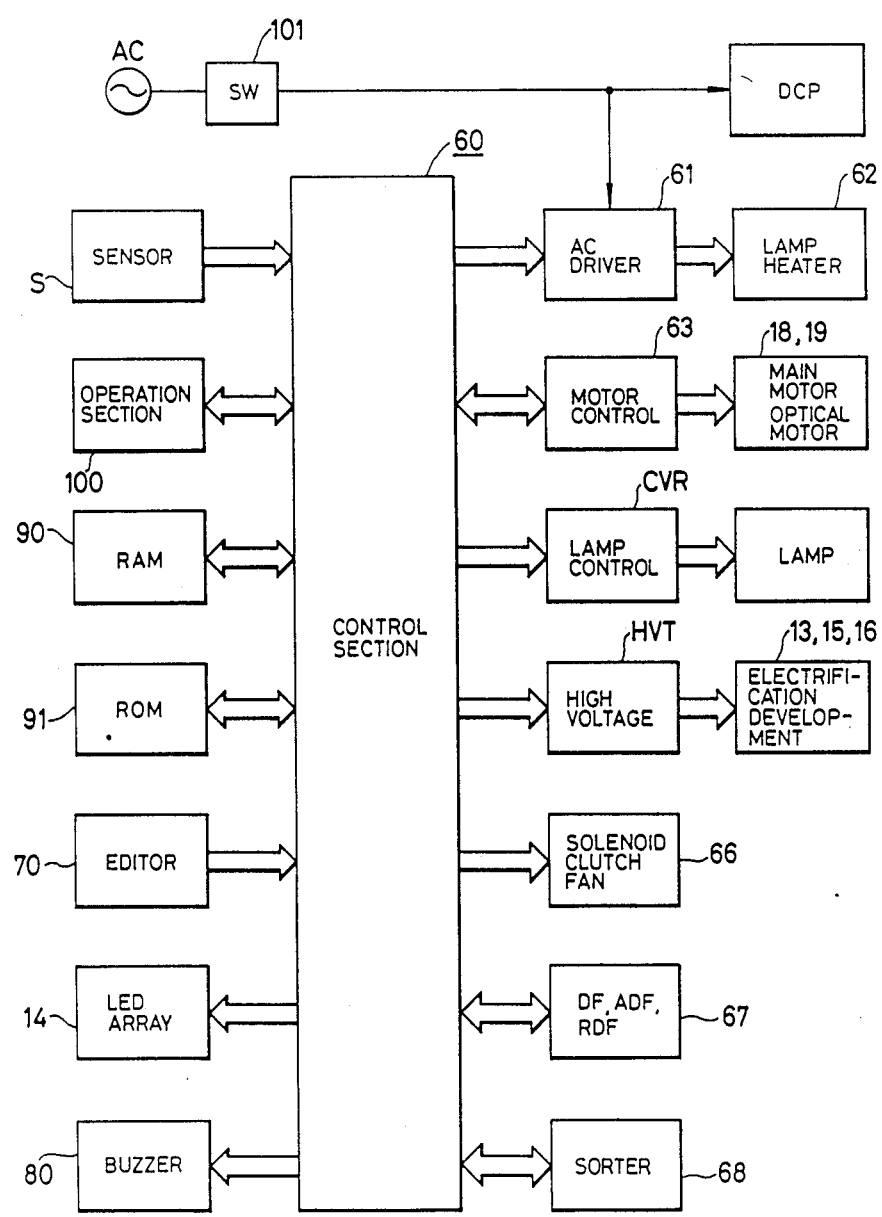
FIG. 2 is a schematic block diagram showing a constitution of the apparatus shown in FIG. 1.

FIG. 2 is a control block diagram, in which numeral 101 denotes a main switch; DCP denotes a DC power source which is supplied to a control section (or controller) 60 and the like; S indicates the sensors shown in FIG. 1; 100 denotes an operation section provided in the upper surface of the copier; 61 and 62 denote AC loads such as the controller to control AC loads, a lamp 24, heaters 21 and 22, and the like; 63 denotes a motor control section to control a main motor 18 and the optical system motor 19; HVT denotes a high voltage generator to supply a high voltage to charging containers 13, 15, and 16 and to the development containers 7 and 8; 66 denotes loads such as a solenoid, clutch, fan, and the like; 67 denotes an original processing apparatus; 68 denotes a sorter; 70 denotes a coordinate input apparatus (editor); 80 denotes a buzzer; 90 denotes an RAM; and 91 denotes an ROM in which a control program is stored.

The operation of the invention will now be described.

When the power switch 101 is turned on, the copier first waits until the heaters 21 and 22 in a fixing apparatus 25 generate the heat and a fixing roller reaches a predetermined temperature sufficient to fix an original image (waiting mode). When the fixing roller reaches the predetermined temperature, a main drive motor is actuated for a constant time to drive the photo sensitive drum 20, fixing apparatus 25, and the like, thereby uniforming the temperature of the roller in the fixing apparatus 25 (wait releasing rotation). Thereafter, the main motor 18 is stopped and the copier waits in the state in which the copy operation can be performed (standby mode). The main motor 18 drives the photo sensitive drum 20, fixing apparatus 25, development containers 7 and 8, and various rollers to transport the transfer paper. When a copy instruction is input from the operation section 100, the copying operation is started.

(1) Description of the image forming operation

In response to the copy instruction, the main motor 18 rotates and the drum 20 starts rotating in the direction of an arrow c. A high voltage is supplied from the high voltage generator HVT to the primary charging container 13, thereby giving a uniform charge to the drum 20. Next, the exposing lamp 24 is lit, the optical system motor 19 is driven, the original set on an original plate 5 is exposed and scanned in the direction of the arrow a, and the reflected optical image from the original is projected onto the drum 20. Thus, an electrostatic latent image is formed on the drum 20. The latent image is then developed by the development container 7 or 8 and transferred to the transfer paper SH at a portion of the transport charging container 15 and separated from the drum 20 at a portion of the separation charging container 16. Next, the remaining toner on the drum 20 is removed and collected by a cleaner 6. The surface of the drum 20 is uniformly discharged by an erasing lamp 28′ and thereafter, the copy cycle is repeated again. At this time, the unnecessary charges in the region other than the image area are erased by a blank exposing lamp 14 which is constituted by LEDs in an array form. As will be explained hereinafter, the blank exposing lamp 14 is constituted by arranging a number of LEDs (light emitting diodes) and can erase an arbitrary area in the image. Either one of the first and second development containers 8 and 7 comes into contact with the drum 20 in response to a selection instruction from the operation section 100. In this embodiment, the black toner is stored in the first development container 8 to obtain the black development container 8. The color toner (e.g., red toner) is stored in the second development container 7 to obtain the color development container 7. The pressing (contact) and releasing operations of each development container onto and from the drum 20 are performed by a solenoid 31 for releasing the black development container and a solenoid 30 for pressing the color development container. The black development container 8 is released from the drum by turning on the solenoid 31. The color development container 7 is pressed onto the drum by turning on the solenoid 30. On the other hand, the black toner sensor $S_{16}$ and color toner sensor $S_{17}$ are arranged in the development containers 7 and 8, respectively.

Development bias voltages are applied from the high voltage generator HVT to development rollers 7-a and 8-a of the development containers. The condition of the bias voltage is changed in the cases of using the black development container 8 and color development container 7 in order to optimize the development conditions of the black toner and color toner. There is also the case where the durability of the photo sensitive drum is improved or the sensitivity varies due to a change in circumstances. However, to cope with this case, the development condition can be also changed by an instruction from the operation panel 100 (which will be explained hereinafter).

In the copying apparatus of the embodiment, not only the ordinary one-sided copying but also the two-sided copying and multi-copying can be performed (which will be explained hereinafter). However, the state such as the resistance value and the like of the transfer paper which has once passed through the fixing apparatus changes as compared with that of the transfer paper when it is used to copy the first side. To cope with such a situation, therefore, the conditions of the high voltages to be applied to the transport charging container 15 and separation charging container 16 are also different with respect to the first side and the second side when the two-sided copying or multi-copying is executed. The development bias voltages or the respective high voltages for transport and separation are set to proper values on the basis of instructions from the control section 60.

The optical system 4 is reciprocated by forwardly and backwardly rotating the optical motor 18 through the motor control section 63 in response to an instruction from the control section 60. The sensor $S_1$ detects the home position of the optical system and is stopped at the position indicated in the diagram during the standby mode. The image tip sensor $S_2$ detects the position of the edge of the original image and is used to obtain the timing for the copy sequence control. The sensor $S_3$ detects the limiter position (reversal position) at the time of the maximum scan. The optical system 4 reciprocates along the scan length according to the size of cassette and copy magnification in response to an instruction from the control section 60.

(2) Control of the transfer paper

In the paper pick-up section 3 in FIG. 1, $S_9$ and $S_{11}$ denote the paper detecting sensors of upper and lower cassettes; $S_{10}$ and $S_{12}$ are the sensors to detect the positions of upper and lower lifters; and $S_{22}$ and $S_{23}$ are the sensors to detect the sizes of upper and lower cassettes; respectively.

Since the paper pick-up operations concerned with the upper and lower stages are substantially the same, the paper pick-up operation of the upper stage will be described hereinafter. First, when the cassette 9 is inserted, the size of cassette 9 is detected by the size detecting sensor $S_{22}$ and this size is discriminated. The display of a non-paper indicator in the operation section 100 is turned off and the detected cassette size is selected and displayed. Next, when the copy operation is started by a copy instruction, a clutch (not shown) for lifting a middle plate is actuated to lift the middle plate in the cassette 9, thereby lifting the transfer papers SH. When the transfer papers SH are lifted up and come into contact with the pick-up roller 10 and reach a predetermined height, the lifter detecting sensor $S_{10}$ outputs a detection signal. The clutch is turned off and the pick-up roller 10 is driven, and the transfer papers are fed into the copier one by one (which will be explained hereinafter). As mentioned above, the transfer papers in the cassette are lifted by the middle plate lifting clutch and thereafter, the lifted position is held. When the next copy operation is started, the lifting operation is not performed. When the number of transfer papers in the cassette decreases during the continuous copy operation and the upper surface of the top transfer paper SH descends to the predetermined position, the middle plate lifting clutch is likewise again actuated to lift up the transfer papers until the predetermined height is reached.

The transfer paper fed into the copier reaches the front paper sensor $S_7$ of resist. At this time, since a resist roller 12 is at rest, a proper loop of the transfer paper is formed and then stops. Next, in order to match the position of the edge of image formed on the drum 20, the resist roller 12 is driven by the timing signal by the optical system 4 and after the edge position is matched, the transfer paper is sent to a paper transporting section 17. In the paper transporting section 17, the toner image formed on the drum 20 by the transport charging container 15 is transferred to the transfer paper and thereafter, it is separated from the drum 20 by the separation charging container 16 and sent to the fixing apparatus 25 by the paper transporting section 17. In the fixing apparatus 25, the surface of the fixing roller is controlled to a predetermined temperature by a temperature sensor (not shown) arranged on the surface of the fixing roller and by the heater 21. The image on the transfer paper is fixed by the fixing apparatus 25. Thereafter, the transfer paper is detected by the feed-out sensor $S_4$ and fed out by rollers 26 and 27.

The hand-insertion copy operation will now be described.

When a hand-insertion tray 28 is lifted down in the direction indicated by an arrow d in FIG. 1, the hand-insertion tray detecting sensor $S_{24}$ is turned on and the copier enters the hand-insertion copy mode. At this time, the middle plate of the cassette 9 set in the upper state is automatically released from the lifted position, so that the transfer papers SH in the cassette descend. Next, the transfer papers are placed on the hand-insertion tray 28 and a hand-insertion lifting clutch is driven by the copy start instruction from the operation section 100 in a manner similar to the case of the paper pick-up operation of the cassette. Thus, the transfer papers set on the hand-insertion tray 28 are lifted and then fed into the copier by the pick-up roller 10.

In the case of the multi-copy operation, a flapper 29 is switched to the position indicated by a broken line by the operation of a solenoid (not shown). The transfer paper whose image was fixed passes through a path 33 and is sent to the second paper pick-up section 23. In the pick-up section 23, after the paper was detected by the second front sensor $S_5$ of resist, the position in the wide direction is matched by the transfer paper edge detecting sensor $S_6$, wide-resist paper sensor $S_8$, and solenoid for wide-resist matching (which will be explained hereinafter). The transfer paper is again sent to the resist roller 12 by a second resist roller 37 in response to a multi-copy instruction from the operation section 100. Subsequently, the copy operation is performed and the transfer paper is fed out to a feed-out tray 32 similar to the operation as previously explained.

In the case of the two-sided copy operation, the transfer paper is fed out by the feed-out roller 27 in a manner similar to the case of the foregoing ordinary copy operation until the fixing process of the first side occurs.

However, after the rear edge of the transfer paper passes through the flapper 29, the feed-out roller 27 is reversely driven and the transfer paper is guided by the flapper 29 and supplied to the path 33 (which will be explained hereinafter). This backward rotation is performed by a solenoid for controlling the forward and backward rotations. The subsequent operation is similar to the case of the foregoing multi-copy operation. As described above, in the case of the two-sided copy operation, the transfer paper is once fed out of the copier by the feed-out roller 27. This transfer paper is turned upside down by the backward rotation of the roller 27 and then sent to the second paper pick-up section.

The multi-copy operation and two-sided copy of one copy sheet have been described above. In the case of the multi-copying or two-sided copying of a plurality of copy sheets, the copy operation is executed by using the middle tray 40. As shown in FIG. 1, a tray 53 to temporarily store the transfer papers which pass through a paper transporting path 43 is provided for the middle tray 40. In the case of the multi-copying of a plurality of copy sheets, the transfer paper after the fixing process is fed out by the feed-out roller 27 under the control similar to the case of the two-sided copy of one copy sheet. Thereafter, by reversely rotating the roller 27, this transfer paper passes through the paths 33 and 43 and is enclosed in the tray 53. After all of a set number of transfer papers in each of which the first side had been copied were enclosed in the tray 53 by repeating the foregoing operations, a pick-up roller 56 is driven by the next copy instruction and the copy of the second side is executed through paths 59 and 33. On the other hand, in the case of the two-sided copying of a plurality of copy sheets, the transfer papers pass through the paths 33 and 43 from the fixing apparatus 25 by the flapper 29 and are enclosed in the tray 53 under the control similar to the case of the single multi-copying. Since the subsequent operation is similar to that in the case of the foregoing multi-copy operation, its description is omitted.

(3) Description of the operation section

The operation panel 100 will now be described.

Figure 3:
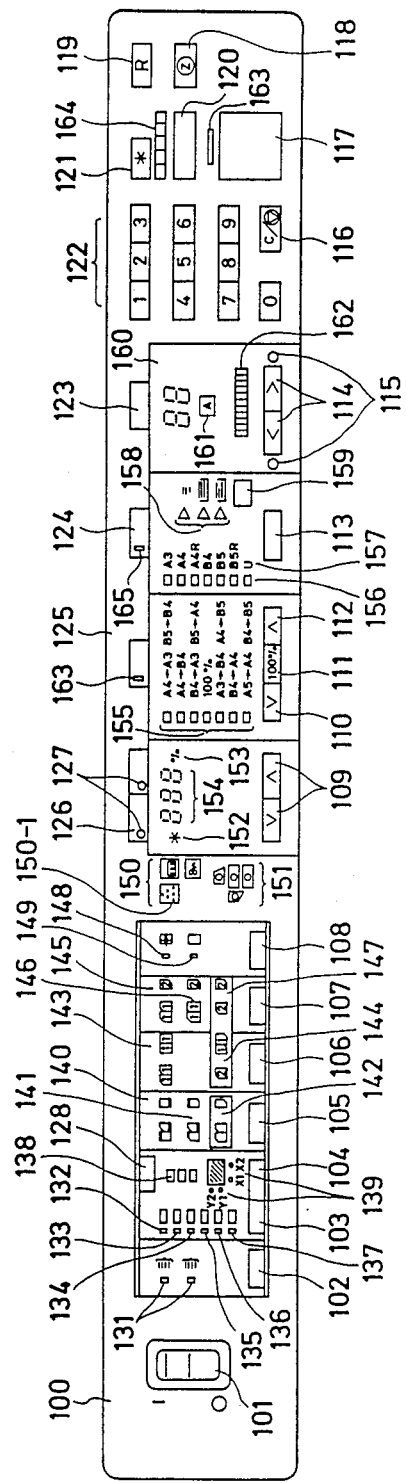
FIG. 3 is an external view showing an operation panel of the apparatus shown in FIG. 1.

FIG. 3 is an external view of the operation panel 100. In the diagram, reference numeral 101 denotes the power switch to control the current supply to the copying apparatus; 102 is a key to instruct the operation of the sorter; and 103 a key to select the copy image mode. The key 103 is pressed to select either one of six kinds of modes (image changing modes) and to copy the area designated in the selected mode. Numeral 104 denotes a point key (which will be explained hereinafter) to designate points (two points in the X direction and two points in the Y direction) which are designated when an area is designated; 105 is a multi-copy key to select the multi-copy mode; 106 denotes a serial-copy key to designate the serial-copy mode in which the copy area of the original glass 5 is divided into two right and left areas and two sheets are automatically copied; 107 denotes a two-sided copy key to select the two-sided copy mode; 108 denotes a key to designate the mode in which a binding margin of one end of the copy paper is formed or the frame of tab for binding is erased; 109 denotes a zoom key (up/down key) to increase or decrease the magnification displayed on a magnification indicator at a rate of 1%; 110 denotes a reduction key to designate the reduction magnification of the fixed form; 111 denotes a key to designate direct copying (i.e., equal magnification); 112 denotes an enlargement key to designate the enlargement magnification of the fixed form, 113 denotes a key to select a desired cassette; 114 denotes a key to adjust the copy density; and 115 denotes a density correction key to change the copy density which is designated by the copy density adjustment key 114. In the embodiment of the invention, the density is adjusted by controlling the light-on voltage of the original exposing lamp 24 (which will be explained hereinafter) by the copy density adjustment key 114, and the density is corrected by changing the development bias by the copy density correction key 115. Numeral 116 is a clear/stop key which operates as a copy stop key during the execution of the copy operation and operates as a clear key to clear the set number of copy sheets and the like in the standby mode; 117 is a copy; 118 denotes a preheating key; 119 denotes a key to return the copier to the standard mode; 120 denotes a color selection key (development container selection key) which is used to change the development containers 7 and 8; and 121 denotes an asterisk key which is used to input the data indicative of the length of the original and a desired length after the copy operation and to calculate the magnification. Numeral 122 is a ten-key keyboard the number of copy sheets; 123 is an AE key to designate the automatic density adjustment mode; 124 denotes a key to designate the automatic paper selecting mode to select the optimum transfer papers in accordance with the size of the original and the copy magnification; 125 denotes a key to designate the automatic magnification selecting mode to select the optimum magnification in accordance with the size of the original and the size of designated transfer paper; 126 denotes a key to access the magnification set in the memory; 127 denotes a key to register a magnification in the memory; and 128 denotes a key to designate an area which is registered when an area is designated and to access the registered area (which will be explained hereainfter). Numerals 131 to 164 denote indicators consisting of LEDs. Numeral 131 is the LED to display the sort mode and group mode when the sorter is used; and 132 to 137 are LEDs to display the copy modes in which the designated areas are copied in combination with the color development container. The LEDs 132 to 137 are sequentially selected by the key 103. These copy modes will be explained hereinafter. Numeral 138 denotes the LED to display the number of designated areas. In this embodiment, three kinds of areas can be designated. Numeral 139 denotes the LED to display the position of the coordinates which are input when an area is designated and 140 to 142 are the LEDs to display the copy modes regarding the multi-copy operation. The LED 140 displays the multi-copy mode in which two sheets of originals are exposed one by one and sequentially multi-copied. The LED 141 displays the serial multi-copy mode in which the copy area on the original glass 5 is divided into two right and left areas and these two areas are automatically multi-copied with the colors designated by the development container selecting key 120. The LED 142 displays the serial color multi-copy mode in which the copy area on the original glass is divided into two right and left areas and these two areas are automatically multi-copied with two colors by sequentially switching the two development containers 7 and 8. In this embodiment, the left half area of the original copy area is copied using the black development container 8 and the right half area is then multi-copied using the color development container 7. The LED 143 displays the serial-page copy mode in which the original copy area is divided into two right and left areas and these two copy sheets are obtained by a single copy instruction. The LED 144 displays the serial two-sided copy mode in which two onesided copies are obtained from the two-side original by use of an RDF (recirculating document feeder), which will be explained hereinafter. The LEDs 145 to 147 display the copy modes concerned with the two-sided copy operation. The LED 145 displays the two-sided copy mode in which two sheets of originals are exposed one by one and sequentially copied to both sides of the transfer paper. The LED 146 displays the serial two-sided copy mode in which the copy area on the original glass 5 is divided into two right and left areas and these two areas are automatically copied to both sides by the colors designated by the development container selecting key 120. The LED 147 displays the twosided copy mode in which the twosided original is copied on both sides of the transfer paper by use of the RDF. The LED 148 displays the mode in which the original image is shifted from the copy area of the transfer paper, thereby forming a binding margin. The LED 149 displays the blank frame mode in which the image at the edge of the transfer paper is erased. The LED 150 displays alarm indications to indicate a non-toner condition, non-control counter, and a jam. The LED 151 displays the position of the jam if it has occurred. The LED 152 is turned on when the magnification is calculated by the asterisk key 121. The LED 153 is lit on when a magnification indicator 154 displays the magnification. The LED 155 displays the fixed form magnification mode designated. The fixed form magnification is designated by the keys 110 and 112. The LED 156 displays the size of the cassette which is used to make the copy. The LED 157 displays the kinds of cassettes set in the copying apparatus. For example, when the A3 cassette is set to the upper stage and the A4 cassette is set to the lower stage and if the lower stage is selected, the lamps indicative of A3 and A4 in the LED 157 are turned on and the LED adjacent to "A4" in the LED 156 is turned on. The LED 158 displays which one of the paper pick-up sections of the hand-insertion paper pick-up section, upper cassette, and lower cassette was selected. The LED 159 is turned on when no paper is left in the cassette or when the cassette is not set. The LED 160 displays the number of copy sheets. The LED 161 displays the automatic density adjustment mode. The LED 162 displays the copy density. The LED 163 displays the standby mode and turns on in green when the copy operation can be performed and in red when the copy operation cannot be executed. The LED 164 displays the color of the designated development container. The LED 165 displays the automatic paper selecting mode. The LED 166 displays the automatic magnification selecting mode. A non-toner indicator 150-1 displays the existence or absence of toner in the development container designated by the development container selection key 120. Namely, if no black toner is left in the development container, the indicator 150-1 is lit on only when the black development container 8 is selected, while the indicator 150-1 is turned off when the color development container 7 is selected. On the contrary, the indicator 150-1 is also similarly turned on or off when no color toner is left.

(Description of the LED array)

The LED array will now be described.

Figures 1, 4:
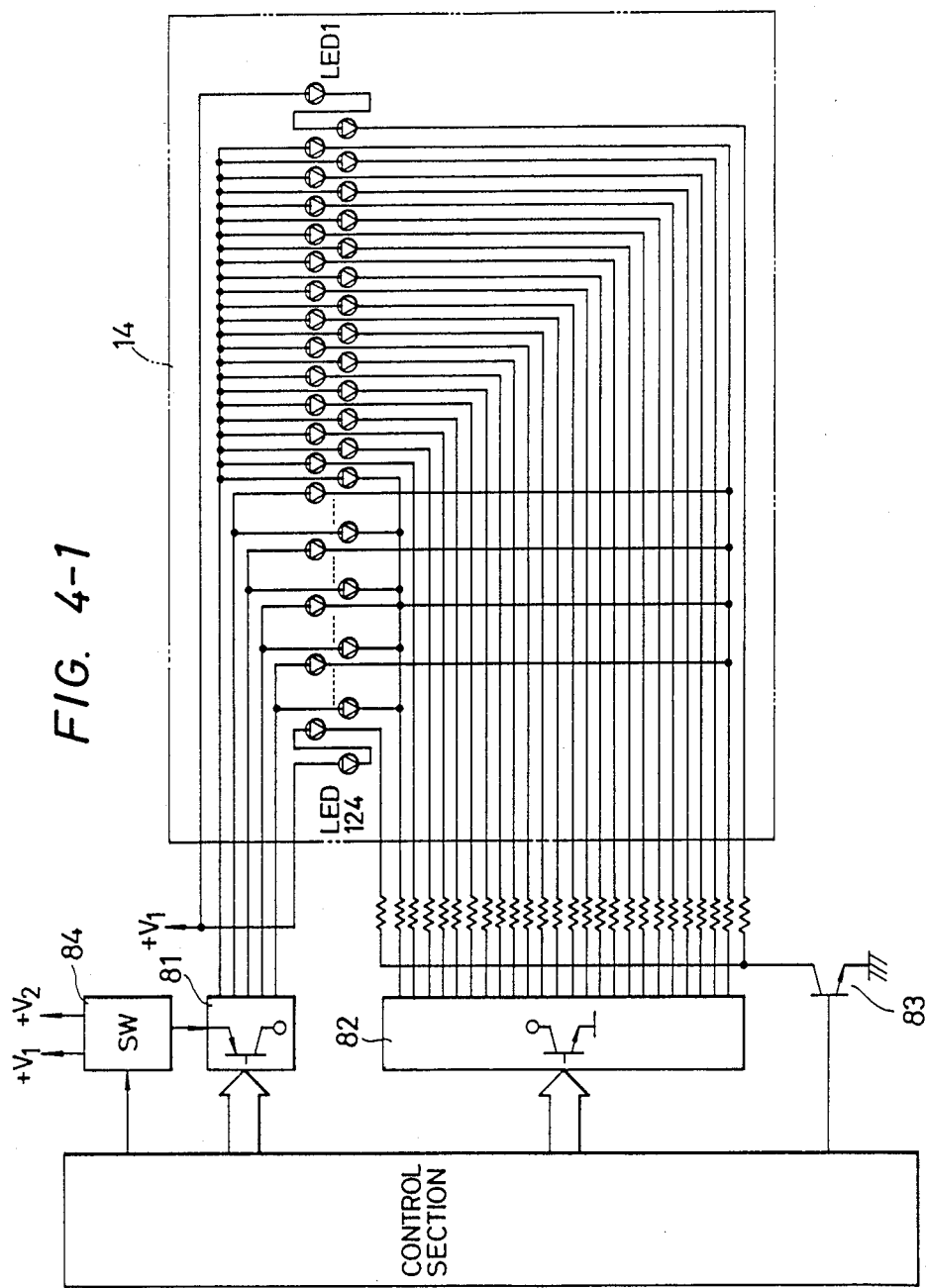
Figures 2, 4:
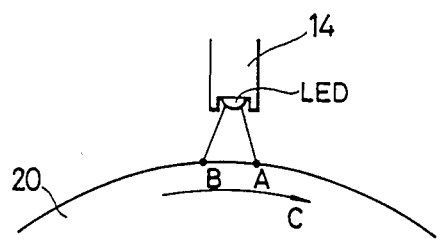
Figures 3, 4:
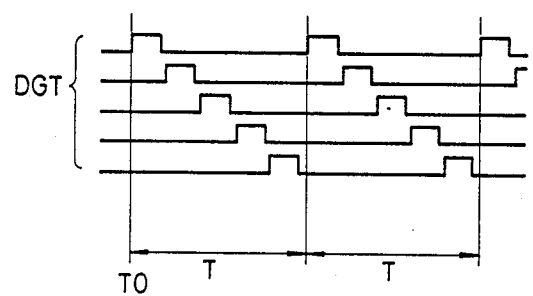

FIG. 4-1 is a diagram showing an LED array 14 and its drive circuit. In the diagram, reference numeral 60 denotes the foregoing control section; 81 indicates five PNP transistors connected to the anodes of the LEDs, respectively; 82 represents twenty-four NPN transistors connected to the cathodes of the LEDs, respectively, as shown in the diagram; and 83 is a transistor. The LED array is composed of 124 $LED_1$ to $LED_{124}$. The 124 LEDs are arranged in a line so as to cover the whole region in the axial direction of the drum 20. The length of light emitting section of the LED array is set to be longer than the width of the maximum transfer paper. In the case of the embodiment, the two $LED_1$ and $LED_2$ and the two $LED_{123}$ and $LED_{124}$ on both ends of the LED array 14 are disposed in the portions longer than the width of transfer paper. The four $LED_1$, $LED_2$, $LED_{123}$, and $LED_{124}$ are statically driven by the transistor 83, respectively. The remaining $LED_3$ to $LED_{122}$ are dynamically driven by the transistors 81 and 82 as a matrix form of $5 \times 24$. In this way, the LEDs are driven and turned on by the transistors.

In the LED array 14, the proper LEDs to be turned on and the turned-on timings of these LEDs are controlled by the control section 60. These LEDs are used to erase the image to remove the unnecessary charges on the drum 20 and to copy the designated area.

Further, numeral 84 denotes a circuit to switch a power source voltage to the transistors 81. The diagram FIG. 4-2 is a partial enlarged diagram of the LED array 14 and photo sensitive drum 20. The LED in the LED array 14 irradiates the area between points A and B on the drum 20. On the other hand, the drum 20 rotates in the direction indicated by an arrow C. The foregoing area designation copy mode will now be considered. In the case of erasing the image in the area after point A on the drum 20, when the LED comes to the position of point A from the control section 60 by the timing signal, the LED starts turning on. Namely, when the LED shown in FIG. 4-2 comes to the positions of points A and B, the LED turns on. At this time, the product (energy) of the light irradiating to the drum surface at point A and the time is smaller than the product at point B and increases toward point B. After point B, the product is the same since the LED is continuously turned on. Therefore, the boundary between the portion where the image is erased and the image portion becomes unclear because a sufficient amount of charge cannot be erased. On the contrary, even when the LED is switched from the turned-on state to the turned-off state, the boundary similarly becomes unclear. To prevent this problem, the switching circuit 84 is made operative when the LED starts turning on and when it is turned off and the voltage $+V_1$ which is ordinarily used is switched to a high voltage $+V_2$, thereby increasing the amount of light emission of the LED (powerful lighting).

Further, the LED array is dynamically lit as mentioned above except for the four LEDs on both ends. However, to prevent the deviation of the lighting position, five digit signals (hereinafter, referred to as DGT signals) which are driven by the five transistors 81 are used as a unit and synchronization with the powerful lighting time is provided. For example, in FIG. 4-3, the DGT signal from the transistor 81 is at a low level before time $T_0$, so that the LEDs are turned off. The turning-on of the LEDs is started at time $T_0$ and the five DGT signals are sequentially turned on (i.e., become a high level), thereby lighting the LEDs. At this time, the switching circuit 84 receives a signal synchronized with a series DGT signal generating time T from the control section 60 and switches to the powerful lighting mode. Although the powerful lighting time is an integer times as long as the time T, it is properly determined on the basis of the extent of lights of the LED array 14 and the rotational speed of the photosensitive drum.

(Description of the editor: I)

Figures 1, 5:
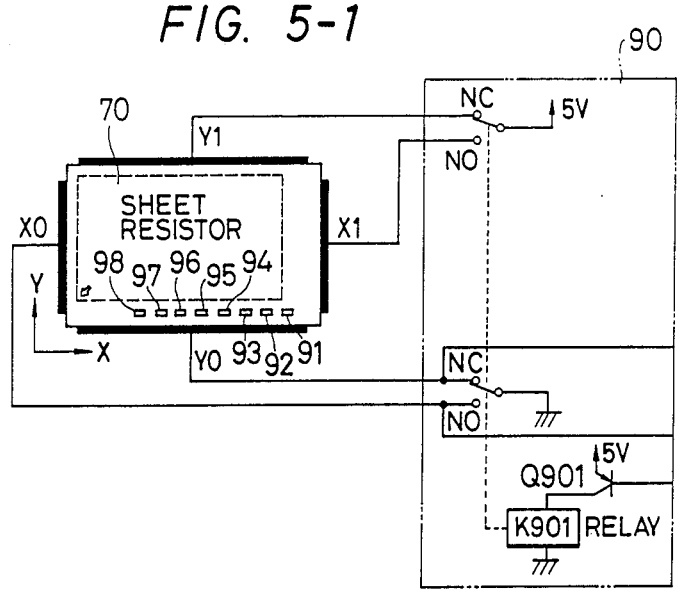
Figures 2, 5:
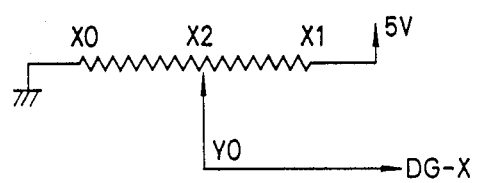
Figures 3, 5:
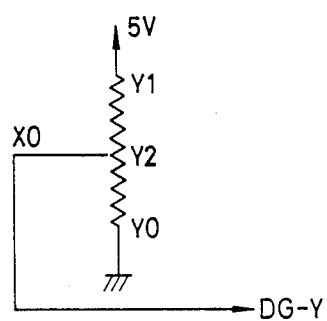

The editor will now be described. The editor 70 is disposed over an original pressing plate 34. A constitution of the editor 70 is shown in FIG. 5.

The editor 70 comprises: a sheet resistor to detect the position in the wide direction (X direction); a sheet resistor to detect the position in the vertical direction (Y direction); a pen (not shown) having a switch therein for pressing the surface of the editor 70 when the coordinates are input; and a switching circuit 90 for switching the X and Y directions when the coordinates are read. The original is placed in the area indicated by a broken line in FIG. 5-1 by setting the reference position to the position indicated by arrows. The sheet resistors cover not only the range indicated by the broken line where the original is to be set but also the portions of a clear key 92, a memory key 91, and area copy mode keys 93 to 98. The keys 93 to 98 correspond to the mode display LEDs 132 to 137 on the operation panel as previously described. The clear key 92 clears the designated area and releases the area copy mode. The memory key 91 registers the designated area. When arbitrary coordinates are input by the pen, a voltage is applied across $Y_1$ and $Y_0$ since a relay $K_{901}$ is held OFF, so that this state is equal to a circuit shown in FIG. 5-3. The control section 60 reads the coordinate in the Y direction by DG-Y as the voltage which is obtained by dividing the power source voltage by with the pen. Next, the control section 60 makes the relay $K_{901}$ operative, so that a voltage is applied across $X_1$ and $X_0$. This state is equal to a circuit shown in FIG. 5-2 and the controller 60 similarly reads the coordinate in the X direction. The coordinates of the area are set on the basis of the read coordinate data and at the same time, the key inputs are also discriminated.

By discriminating the signal from the editor, the copy mode and the coordinates of the designated area are registered. In the case of designating the copy mode, the actuation time of the buzzer is set to 60 msec. In the case of inputting the coordinates of the area, the actuation time of the buzzer is set to 30 msec. This is because the input by the editor is intended to be recognized again by the user. If the input by the user to the editor is improper, the buzzer is not actuated.

Although the area in the editor which is specified by inputting coordinates has the size of 432×297 mm, the portion of 5 mm of the inside of the area is set to the maximum or minimum value in consideration of an error of the editor. In other words, when the area within 5 mm from the inside of the area of the editor is designated, it is regarded that the area of 0 mm from the inside of the area of the editor is designated.

(Description of the copy mode)

The copy mode will now be described in detail.

MODE 1: One-sided original→Two-sided copy (The LEd 145 is turned on)

Figure 6A:
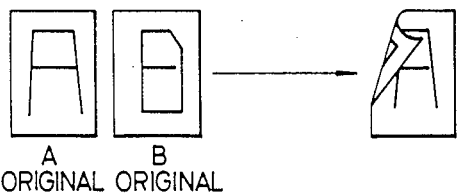
FIG. 6A is a diagram showing an example of an output from a one-side original to a two-sided copy.

As shown in FIG. 6A, the two-sided copy is obtained from two originals.

Namely, an original A is set onto the original plate and the copy key 117 is pressed to form the image on one side of the transfer paper. Next, an original B is set onto the original plate and the copy key 117 is pressed to form the image on the opposite side of the transfer paper.

MODE 2: Serial-page→Two-sided copy (The LED 146 is turned on)

Figure 6B:
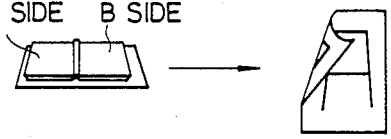
FIG. 6B is a diagram showing an example of an output of a serial-page two-sided copy.

As shown in FIG. 6B, the two-sided copy is obtained from the sides A and B of a double-spread original.

Namely, a double-spread original is set onto the original plate and the copy key 117 is pressed to form the image of the side A onto one side of the transfer paper. Subsequently, the image of the side B is formed on the opposite side of the transfer paper.

Two independent originals may be also used in place of the double-spread original.

MODE 3: One-sided original→Multi-copy (The LED 140 is lit on)

Figure 6C:
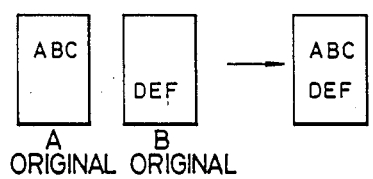
FIG. 6C is a diagram showing an example of an output of a multi-copy.

As shown in FIG. 6C, a multi-copy is obtained from two originals.

Namely, an original A is set onto the original plate and the copy key 117 is pressed to form the image onto one side of the transfer paper. Next, an original B is set onto the original plate and the copy key 117 is pressed to form the image onto the side on which the image of the original A has already been formed.

MODE 4: Serial-page multi-copy (The LED 141 is lit on)

Figure 6D:
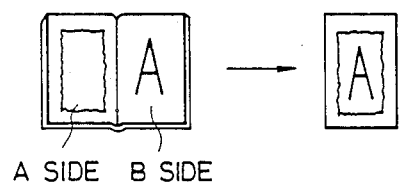
FIG. 6D is a diagram showing an example of an output of a serial-page multi-copy.

As shown in FIG. 6D, a multi-copy is obtained from the sides A and B of a double-spread original.

Namely, a double-spread original is set onto the original plate and the copy key 117 is pressed to form the image of the side A onto one side of the transfer paper. Next, the image of the side B is also formed onto the same side of the transfer paper on which the image of the side A has already been formed.

MODE 5: Serial-page color multi-copy (The LED 142 is lit on)

Figure 6E:
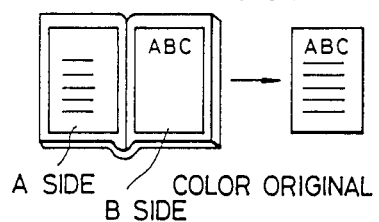
FIG. 6E is a diagram showing an example of an output of a serial-page color multi-copy.

As shown in FIG. 6E, the side A of a doublespread original is copied in black and the side B is copied in color, thereby obtaining the color multi-copy. This copy corresponds to the mode in which the side B in the serial page multi-copy mode was copied in color. The side A may be also copied in color.

MODE 6: Mode in which the inside of the designated area is copied in color and the outside of the designated area is copied in black (The LED 132 is lit on)

As shown in FIG. 7A, the copy is obtained by copying the inside of the designated area in color and by copying the outside of the designated area in black. An original is set, an area is designated, and the copy key is pressed. Thus, the image of the portion outside of the area is formed onto the transfer paper in color. Subsequently, the image of the portion out of the area is formed onto the transfer paper in black. It is also possible to copy from the outside of the area.

MODE 7: Mode in which the inside of the designated area is copied in black and the outside of the area is copied in color (The LED 133 is lit on)

As shown in FIG. 7B, the copy is obtained by copying the image in the designated area in black and by copying the image out of the designated area in color. This mode is opposite to the MODE 6.

MODE 8: Mode in which the inside of the designated area is copied in color (The LED 134 is lit on)

As shown in FIG. 7C, the image in the designated area is copied in color. An original is set, an area is designated, and the copy key 117 is pressed. Thus, the image of the portion in the area is formed onto the transfer paper in color.

MODE 9: Mode in which the outside of the designated area is copied in color (The LED 135 is lit on)

As shown in FIG. 7D, the outside of the designated area is copied in color. An original is set, an area is designated, and the copy key 117 is pressed. Thus, the image of the portion out of the designated area is formed onto the transfer paper in color.

MODE 10: Mode in which the inside of the designated area is copied in black (The LED 136 is lit on)

As shown in FIG. 7E, the image in the designated area is copied in black. An original is set, an area is designated, and the copy key 117 is pressed. Thus, the image of the portion in the designated area is formed onto the transfer paper in black.

MODE 11: Mode in which the outside of the designated area is copied in black (The LED 137 is lit on)

As shown in FIG. 7F, the image out of the designated area is copied in black. An original is set, an area is designated, and the copy key 117 is pressed. Thus, the image of the portion out of the designated area is formed onto the transfer paper in black.

Since only one kind of path is provided for the transfer papers because of the mechanism of the copying apparatus, only either one of the foregoing MODEs 1 to 7, the single copy mode, and the modes of serial-page copy, two-sided serial copy, two-side original→two-sided copy can be selected.

Only one of the MODEs 6 to 11 can be selected because of the construction of the copying apparatus. In addition, only one of the MODEs 8 to 11, the key 148 to form the binding margin, and the key 149 to erase the frame of tab for binding can be selected because of the above reason.

If one of the MODEs 5 to 11 is selected, the color selection key 120 is made inoperative. This is because in the MODEs 5 to 11, the color copy mode is also simultaneously designated.

The case where the MODE 1 or 3 is selected and a document feeder (DF, ADF, RDF) is used will now be described.

(1) In the case of using the DF:

When an original is set onto the original pick-up plate of a DF (Document Feeder), the original is automatically picked up and set to a predetermined position of the original plate of the copier. The copy operation of the first side is started and the copy is performed under the set copy condition. The transfer paper is stored in the middle tray 40 or second paper pick-up section 23. The copy operation of the first side is completed. The DF then feeds out the original.

Similarly to the above, when the next original is set onto the original pick-up plate of the DF and automatically picked up, the copier starts the copy operation of the second side. In this case, the transfer paper whose first side has already been copied and which has been stored in the middle tray 40 or second paper pick-up section 23 is picked up. After completion of the copy operation of the second side, the DF feeds out the original. A series of copy operations are completed in this manner.

In addition, it is also possible to manually set an original in the case of copying the first side and to use the DF for the second-side copy. Or it is also possible to use the DF in the case of copying the first side and to manually set an original for the second-side copy.

(2) In the case of using the ADF:

When an original is set onto the original pick-up plate of an ADF (Auto Document Feeder) and the copy key 117 is pressed, the original is automatically picked up and fed out. If the original which is used for the second-side copy doesn't exist upon completion of the pick-up of the original for the first-side copy, the transfer paper is fed out and the copy operation is finished. However, if one original is used, the transfer paper is stored in the middle tray 40 or second paper pick-up section 23 and the copy operation of the first side is completed in accordance with the copy set condition. Pressing the copy key 117 again allows the copy operation of the second side to be started. In this case, it is also possible to manually set an original and to subsequently use the ADF.

(3) In the case of using the RDF:

When the copy key 117 is pressed, the RDF circulates the originals set on the original pick-up plate, thereby counting the number of original sheets. If the count value is an odd number, the last original is copied in the one-sided mode.

The restriction of the paper size when one of the MODEs 1 to 5 is selected will now be described.

In the multi two-sided copy mode, there is the case where the second paper pick-up section 23 and middle tray 40 cannot be used in dependence on the size of transfer paper. In the case of such a size of transfer paper that the second paper pick-up section 23 and middle tray 40 cannot be used, the transfer paper is fed out and the copy operation is completed.

(1) When the middle tray 40 cannot be used:

Since the originals need to be exchanged in MODE 1 or 3, the number of copy sheets can be set to only "1".

(2) When the middle tray 40 can be used:

Since the originals need to be exchanged in the MODE 1 or 3, the number of copy sheets can be set to up to the number of sheets which can be enclosed in the middle tray. However, if the size of paper is such that the middle tray 40 cannot be used but the second paper pick-up section 23 can be used, the number of copy sheets can be set to only "1". In addition, when the transfer papers are picked up from the hand-insertion tray, there is the possibility such that the transfer papers of different sizes are used. Therefore, the middle tray 40 cannot be used.

When the middle tray 40 is used in the multi two-sided copy mode other than MODEs 1 and 3, the number of copy sheets which can be set is up to the number of sheets which can be enclosed in the middle tray.

(Description of the jam process)

The jam process will now be described.

If the jam occurs in the copy mode using none of the middle tray 40 and second paper pick-up section 23, the jam process is executed. A reset button of $S_{15}$ (shown in FIG. 1) is pressed and the power switch 101 is turned on, so that the copy can be performed. The copier returns to the copy mode before the jam occurs. In this case, the number of copied sheets is subtracted from the set number of copy sheets and the remaining number of copy sheets is displayed in the copy number indicator 160. At this time, by pressing the copy key 117, the remaining number of copy sheets are copied and the copy operation is completed.

If the jam occurs at the time of the first side in the copy mode using the middle tray 40 or second paper pick-up section 23, the jam process is performed. By pressing the reset button of $S_{15}$ and turning on the power switch 101, the copy operation can be performed. In this case, the copy mode is the same as the mode using none of the middle tray 40 and the second paper pick-up section 23. At this time, by pressing the copy key 117, the remaining number of copy sheets are copied and the copy operation of the first side is completed. In the two-sided multicopy mode other than the MODEs 1 and 3, the copy operation for the second side is subsequently carried out. In the MODEs 1 and 3, the copy operation of the second side is performed by pressing the copy key 117 after the originals were exchanged. On the other hand, by pressing the stop key 116 or reset key 119 in the state in which the copy operation can be executed after completion of the jam process, the user determines that he wants to stop the copy of the first side, and the number of transfer papers existing in the middle tray 40 is displayed in the copy number display section 160, and the copier enters the standby mode for the copy operation of the second side. The foregoing process is also executed when the stop key is pressed during the copy operation of the first side.

If the jam occurs at the second side in the copy mode using the middle tray 40 or second paper pick-up section 23, the jam process is executed. By pressing the reset button of $S_{15}$ and turning on the power switch 101, the copy can be performed. At this time, the copier returns to the copy mode before the jam occurs. The number of transfer papers existing in the middle tray 40 is displayed in the copy number display section 160. In this case, by pressing the copy key 117, the copy operation is repeated until the number of transfer papers in the middle tray 40 becomes zero. If no transfer paper exists in the middle tray 40 when the copy can be performed after completion of the jam process, the copy operation is completed.

Even if the power switch is turned off after the jam occurred, the data before the jam occurs is held by the backup of the battery. In addition, even if a front door (not shown) of the copying apparatus is opened, the power supply to high-voltage circuits and the like is shut off.

(Description of the no toner process)

The no toner process will now be described.
(1) In the case of the black toner:

If the amount of black toner is less than a predetermined amount, the copy cannot be performed in the copy MODEs 5, 6, 7, 10, and 11.

Even when the no black-toner is detected during the copy operation, the no toner indication 150-1 is not displayed until the set number of copy sheets are completely copied.

On the other hand, in the case of copying a plurality of originals using the RDF, the count value of the number of remaining originals is multiplied with the value of the set number of copy sheets. When the result of the multiplication is less than 100, even if no black toner is detected during the copy operation, the copy operation is not interrupted but the copy operation is executed until the last original is copied. If the result of the multiplication is 100 or more, the case where the image is influenced by the lack of toner is considered. Therefore, the copy operation is interrupted when no black toner is detected.

(2) In the case of no color toner:

If the amount of color toner is less than a predetermined amount, the copy cannot be performed in the copy MODEs 5, 6, 7, 8, and 9.

If the color toner is absent during the copy operation, the copy operation is interrupted. This is because if the copy operation is continued in the state of the absent of color toner, the mixture ratio of the toner and the carrier becomes abnormal and the carrier of the color development container is deposited onto the surface of the drum, so that bad influences such as damage and the like are exerted on the drum. However, in the case of enclosing the transfer papers into the second paper pick-up section 23, the copier ought to be in the single copy mode and the amount of color toner consumed is probably little. Therefore, the series of copy operations are completed.

In the case of performing the copy using the RDF, the count value of the number of remaining originals is multiplied by the value of the set number of copy sheets. When the result of the multiplication is below a predetermined value, even if the no color-toner is detected during the copy operation, the copy operation is not interrupted but the copy operation is repeated until the last original is copied. After the no color-toner was detected during the copy operation of the second side in the two-sided multi-copy mode, the user turns off the power switch 101 and supplies a desired amount of color toner. At this time, the user removes the transfer papers enclosed in the middle tray 40 or second paper pickup section 23 and interrupts the copy operation. If no transfer paper exists in the middle tray 40 or second paper pick-up section 23 when the power switch 101 is turned on, the copy operation cannot be continued, so that the copier enters the standby mode.

The foregoing process in the no toner state will be further described in detail.

Figure 8:
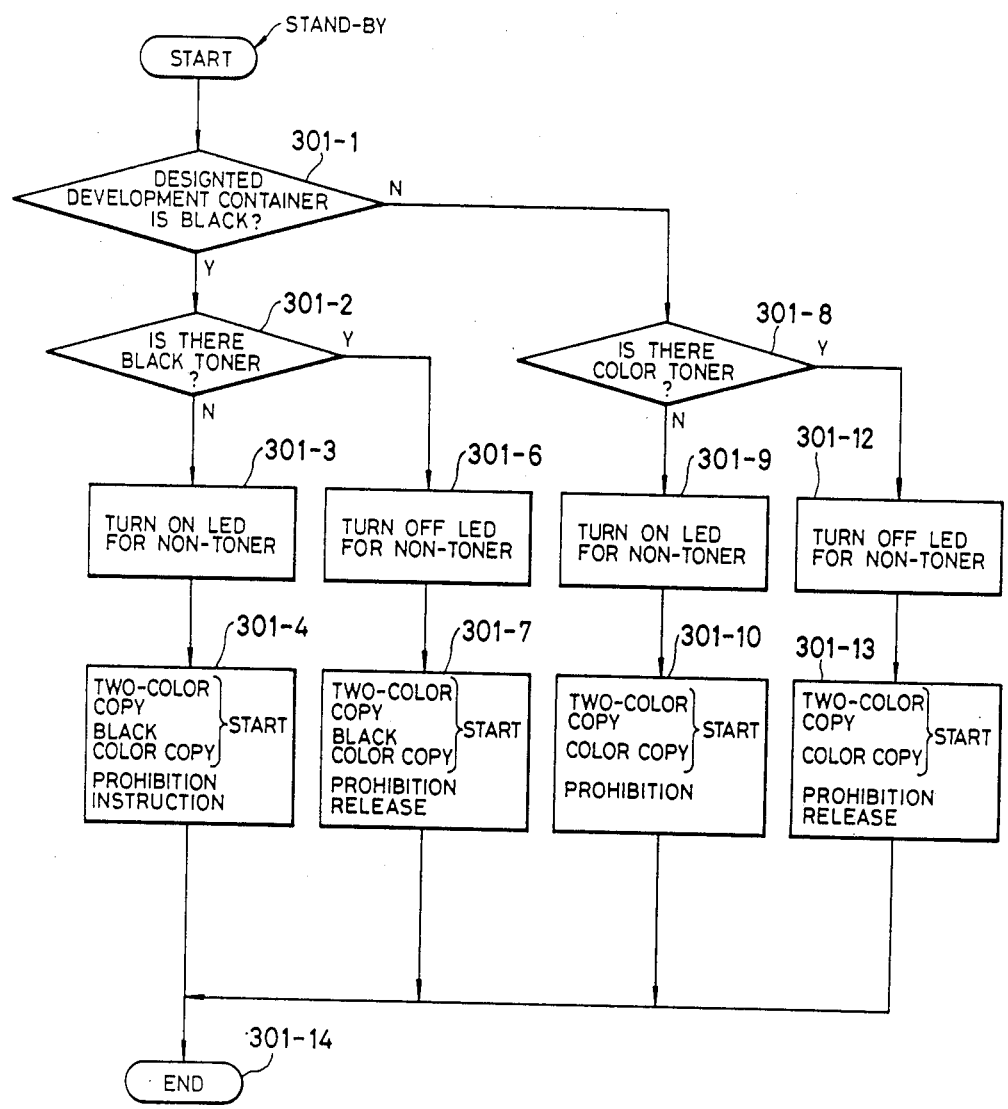
FIGS. 8 to 10 are flowcharts showing sequences in the case of a non-toner.
Figure 9:
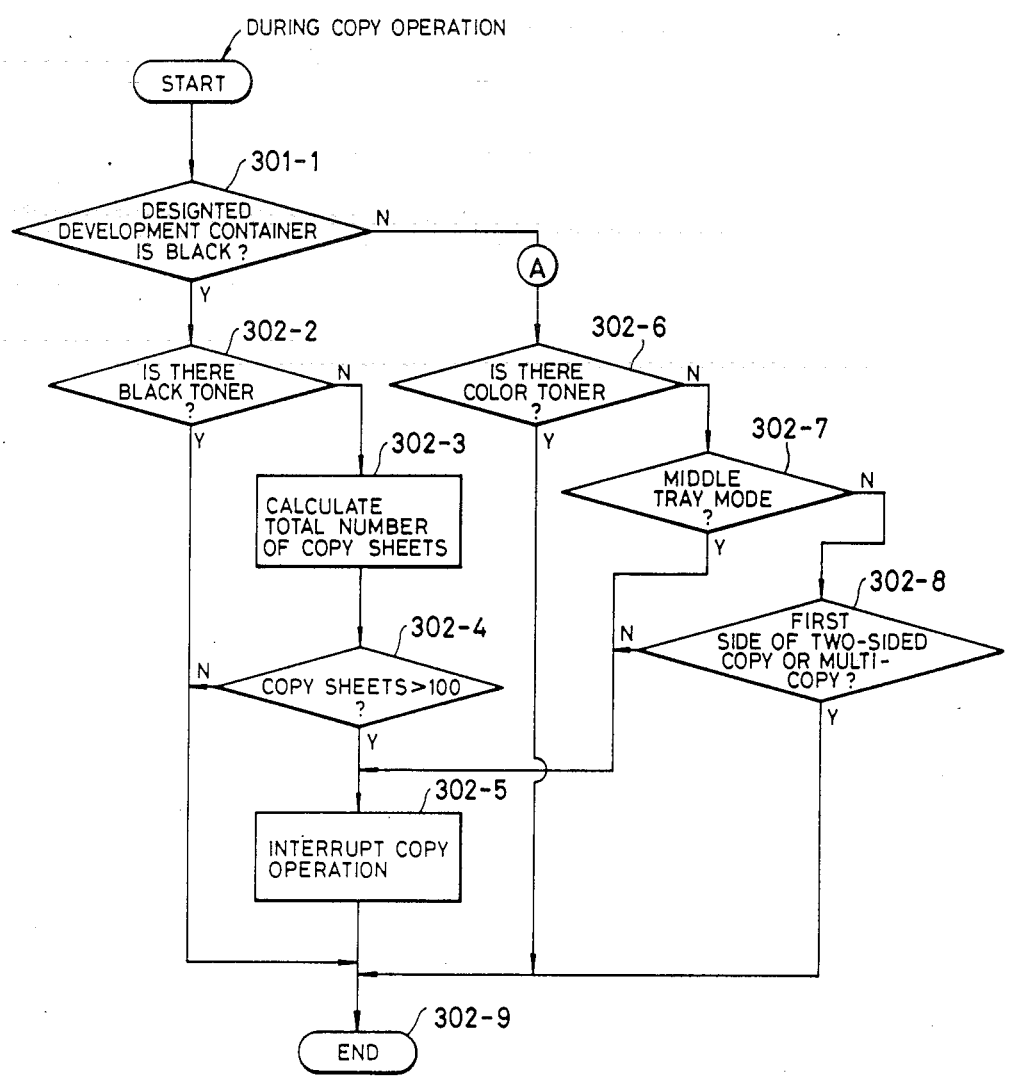

FIGS. 8 and 9 are flowcharts relating the display and copy control in the case of no toner. FIG. 8 shows the process in the standby mode. This process will be first described.

A check is first made to see if the color of the development container designated by the development container selection key 120 is black or not (301-1). If YES, a check is made to see if the toner exists in the selected development container or not by a toner detection signal from a sensor (not shown) (301-2). If NO, the no toner LED 150-1 is turned on (301-3) and the start of the black copy and the start of the two-color copy are prohibited (301-4). Namely, the input of the copy start key 117 is not accepted. If YES in step 301-2, namely if the black toner exists, the no toner LED 150-1 is turned off (301-6) and the prohibition of the start of the two-color copy and black copy is released (301-7). The existence of toner or the no toner is detected by a well-known method. Even if the no toner is detected, this doesn't mean that the toner has completely been consumed. Indeed, the no toner is detected although a proper amount of toner still remains in the development container. In the case of the color copy by the selected color development container, similar to the case of the black copy, the no toner LED 150-1 is turned on if the no color-toner of the selected color development container is detected (301-9). The color copy and the two-color copy are prohibited (301-10). If a sufficient amount of toner exists, the LED 150-1 is turned off (301-12) and the prohibition of the color copy and two-color copy is released (301-13). The two-color copy is the mode in which the black development container and the color development container are alternately used to obtain the two-color copy in the foregoing copy MODEs 5, 6, and 7.

The case where the toner is absent during the copy operation will now be described.

FIG. 9 shows a flowchart in such a case. The processes in this flowchart are checked each time operation for copying one sheet is executed. First, in step 302-1, a check is made to see if the copy to be made is the black copy or color copy. In the case of the black copy, a check is made to see if the black toner exists or not (step 302-2). If the lack of black toner is detected, the total number of copy sheets is calculated (302-3). In the case where the recirculating document feeder (RDF) is not used, the count value is equal to the number of copy sheets which was set by the ten-key 122 keyboard in the operation section 100. If the number of originals set before the copy is started is previously known as in the case of using the RDF, the count value is equal to the value obtained by multiplying the number of copy sheets set by the ten-key 122 keyboard in the operation section 100 and the number of originals.

A check is made to see if the total number of copy sheets calculated is more than 100 or not (302-4). If YES, the instruction to interrupt the copy operation is generated (302-5). In the case of the color copy, a check is made to see if the color toner exists in the color development container or not (302-6). If no toner is detected, a check is made to see if the copy mode is the mode of the two-sided copy or multi-copy of a plurality of copy sheets in which the middle tray is used or not (302-7). If YES in step 302-7, i.e., in the case of the two-sided or multi-copy mode of a plurality of copy sheets, the copy interruption instruction is generated in step 302-5. In addition, in the case other than the first side in the two-sided or multi-copy mode in which the middle tray is not used, the copy interruption instruction is similarly also generated (302-8→302-5). If YES in step 302-8, i.e., in the case of the first side, the copy operation is continued without interruption. For example, if the no toner state is detected during the copy operation of one side of each of a plurality of copy sheets using the color development container, the processing routine advances along the steps 302-1→302-6→302-7→302-8→302-5 and the copy interruption instruction is generated.

In the foregoing embodiment, in the case of performing the copy operation using the color development container, the copy operation is interrupted just after the no color-toner is detected. However, if the set number of copy sheets is relatively small (e.g., about three to five), the copier can be also constituted such that the set number of copy sheets are completely copied without interruption. On the other hand, in the case of copying the designated area by the color development container, if the designated area is small, an amount of toner to be consumed per copy sheet is very little; therefore, the number of copy sheets which can be copied can be further increased.

Figure 10:
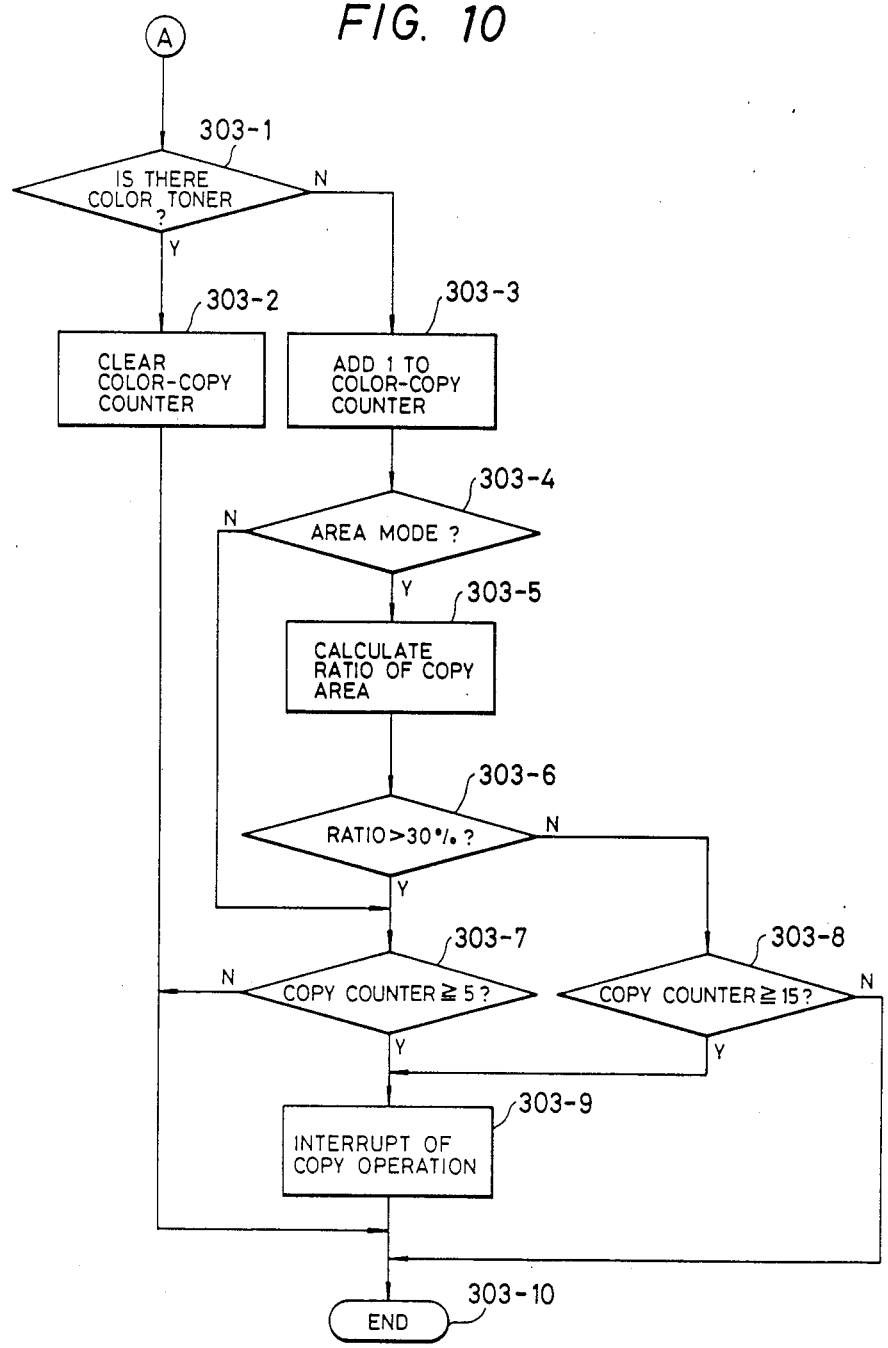

FIG. 10 is a flowchart showing an embodiment in this case and connected to A in FIG. 9. A check is made to see if the color toner exists during the copy operation or not (303-1). If YES, the color-copy counter is cleared (303-2). The color-copy counter counts the number of copy sheets in the no toner state. If the toner lacks, the count value of this counter is increased by "+1" (303-3). In the case other than the mode to copy only the designated area, a check is made to see if the count value of the color-copy counter is five or more or not (303-7). If NO, i.e., if the count value is less than 5, the copy operation is continued. If it is 5 or more, the copy interruption instruction is set (303-9) to interrupt the copy operation. In the area copy mode, the ratio of the designated area to the whole area is calculated (303-5). If the ratio is larger than 30%, the processes similar to those in the ordinary mode are executed. If it is 30% or less, when the count value of the copy counter is 15 or more in step 303-8, the copy interruption instruction is generated in step 303-9.

Further, in FIG. 8, the start of the copy operation is prohibited in the case of no toner. However, if the number of copy sheets is below a predetermined value, the copier may be also easily constituted so as to start the copy.

The ratio of the copy area can be calculated from the size of copy paper selected, copy magnification, and coordinates of the designated area.

In this manner, by combining with the indicator 164 to display the color of the set development container, the no toner indicator 150-1 can be commonly used for both of the black copy and the color copy. If the toner is absent during the copy operation, by dividing the operation mode of the copier into the case of continuing the copy and the case of interrupting the copy in accordance with the development container and copy mode which are at present set, the copy operation can be executed without losing the operation efficiency.

(Description of the editor: II)

Figure 11:
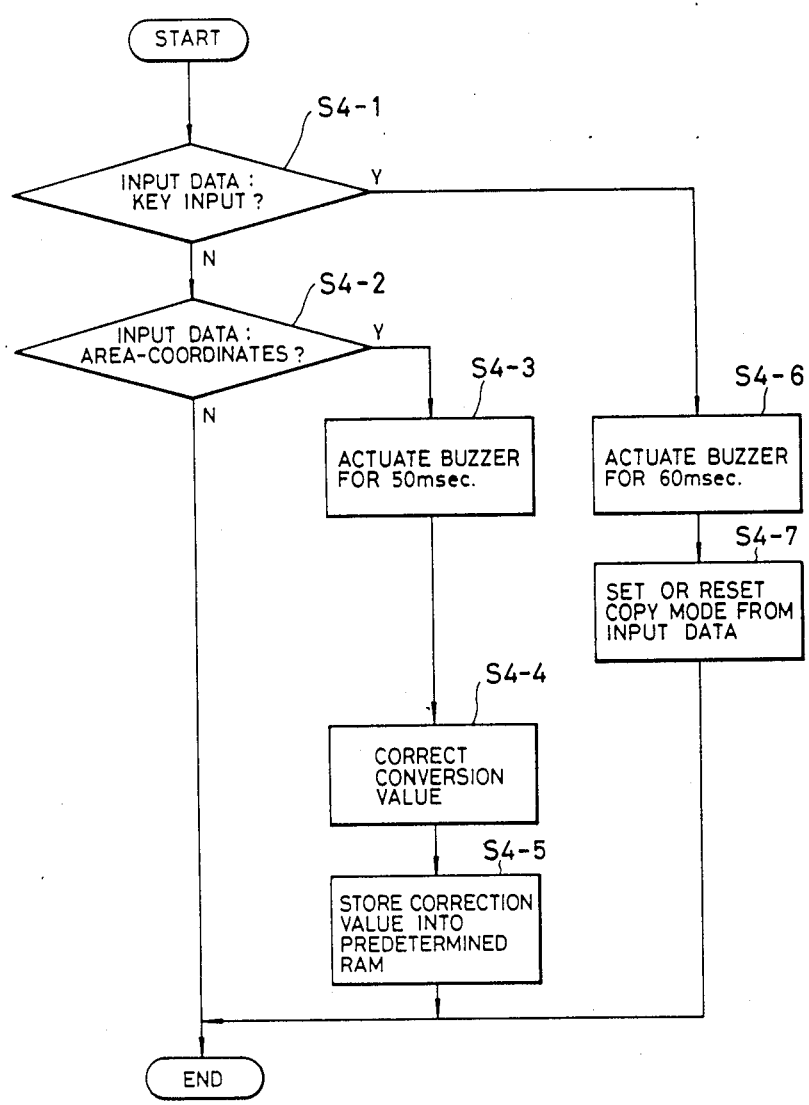
FIGS. 11 to 16 are flowcharts showing processes of input data from the editor.

FIG. 11 is a flowchart regarding the processes of the input value from the editor.

A check is made to see if the input data is the area-coordinates or not (step 4-2). If YES, the buzzer is actuated for 30 msec (step 4-3). The input data from the editor is corrected so as to obtain the better image (step 4-4). The correction value is stored into the RAM (step 4-5).

A check is made to see if the input data is the key-input coordinates or not (step 4-1). If YES, the buzzer is actuated for 60 msec (step 4-6). The copy mode is set and released from the input data (step 4-7).

Figure 12:
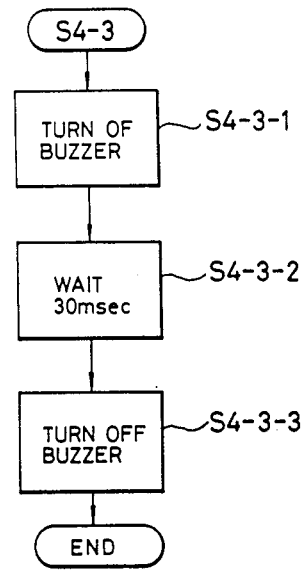

The processes in steps 4-3 to 4-7 will now be described in detail. FIG. 12 is a flowchart showing the details of step 4-3. First, the buzzer is turned on (step 4-3-1) to actuate it. The actuation state of the buzzer is held for 30 msec (step 4-3-2). Then, the buzzer is turned off (step 4-3-3) to stop it.

Figure 13:
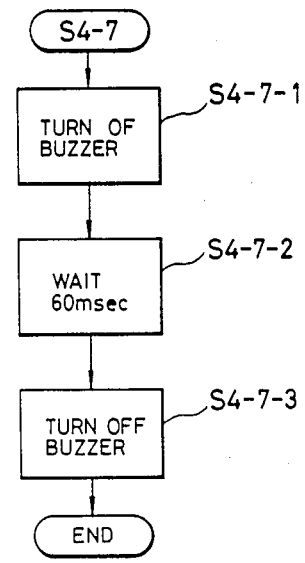

FIG. 13 is a flowchart showing the details of step 4-7. First, the buzzer is turned on (step 4-7-1) to actuate it. The actuation state of the buzzer is held for 60 msec (step 4-7-2). The buzzer is turned off to stop it (step 4-7-3). As shown in steps 4-3 and 4-7, the actuation times of the buzzer differ in dependence on the input of the copy mode and the input of the area coordinates. This is because by allowing the user to recognize the input mode again, thereby reducing the misoperation. As another embodiment, in place of actuating the buzzer, the lighting time and flickering time of the LED or the like can be also made differ.

Figure 14:
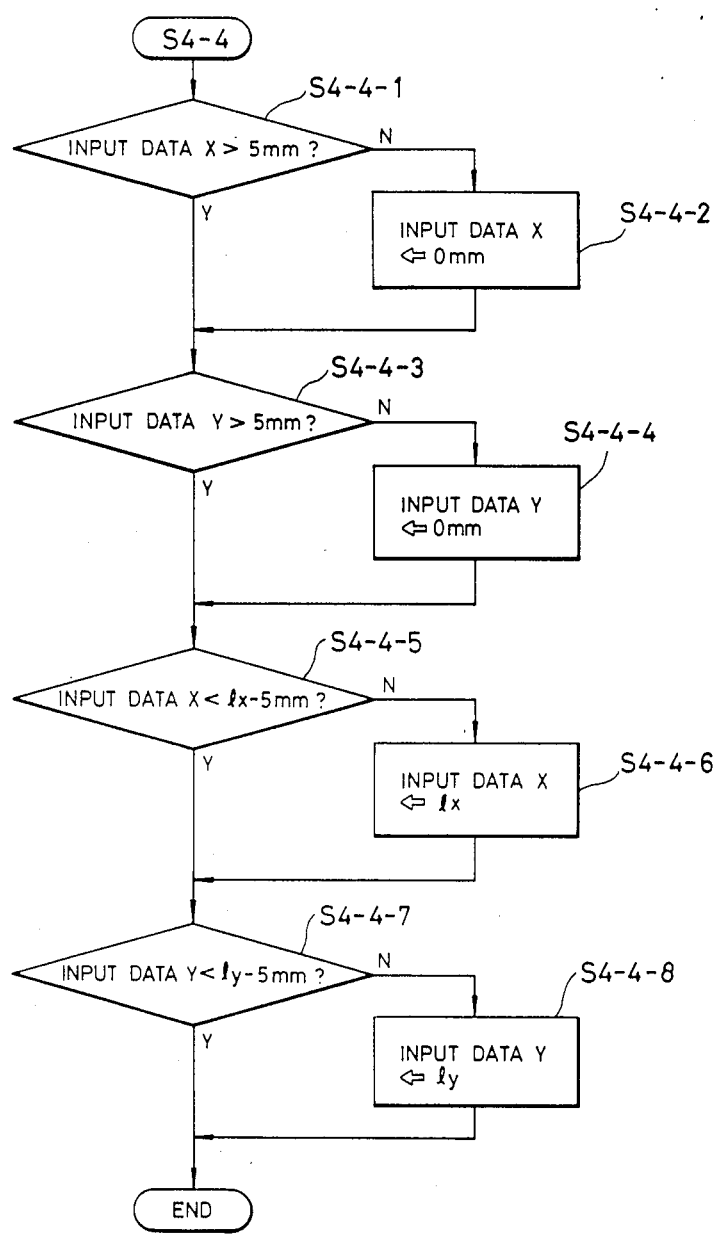

FIG. 14 is a flowchart showing the details of step 4-4. In this step, it is assumed that the length in the X direction of the area which can be designated by the editor is $l_x$ and the length in the Y direction is $l_y$. First, a check is made to see if the input data X in the X direction is larger than 5 mm from the edge of the range of the area or not (step 4-4-1). If NO, i.e., if it is 5 mm or less, the input data X is set to 0 (step 4-4-2). Next, a check is similarly made to see if the input data Y is larger than 5 mm from the edge of the area or not (step 4-4-3). If NO, i.e., if it is 5 mm or less, the input data Y is set to 0 (step 4-4-4). If the input data X is equal to or larger than $(l_x - 5)$ mm (step 4-4-5), the input data X is set to $l_x$ (step 4-4-6). If the input data Y is equal to or larger than $(l_y - 5)$ mm (step 4-4-7), the input data Y is set to $l_y$ (step 4-4-8). This is because when the masking or trimming area is designated, it is intended to prevent the forming of an additional image in the edge of the copy paper due to the error when the edge of the designating area of the editor is designated.

As another embodiment, if the size of original can be detected (for example, a plurality of original detecting sensors are provided under the original glass plate and the size of original is detected by a combination of the outputs from these sensors), the lengths $l_x$ and $l_y$ in the X and Y directions are set to the values corresponding to the dimensions of the original size. According to the foregoing embodiment, since the correction processes in steps 4-4-6 and 4-4-8 are unconditionally performed irrespective of the size of original, this correcting method is ineffective for a small original having the dimensions smaller than $l_x$ and $l_y$. However, if the original size can be detected, the correcting processes in steps 4-4-6 and 4-4-8 can be executed in accordance with the size of original. Therefore, the masking or trimming image better than that in the foregoing embodiment can be formed.

The data corrected in step 4-4 is stored into the RAM. The masking and trimming of a plurality of areas which are away from each other or mutually overlapped can be performed by a trimming/masking image forming method, which will be explained hereinafter.

Figure 15:
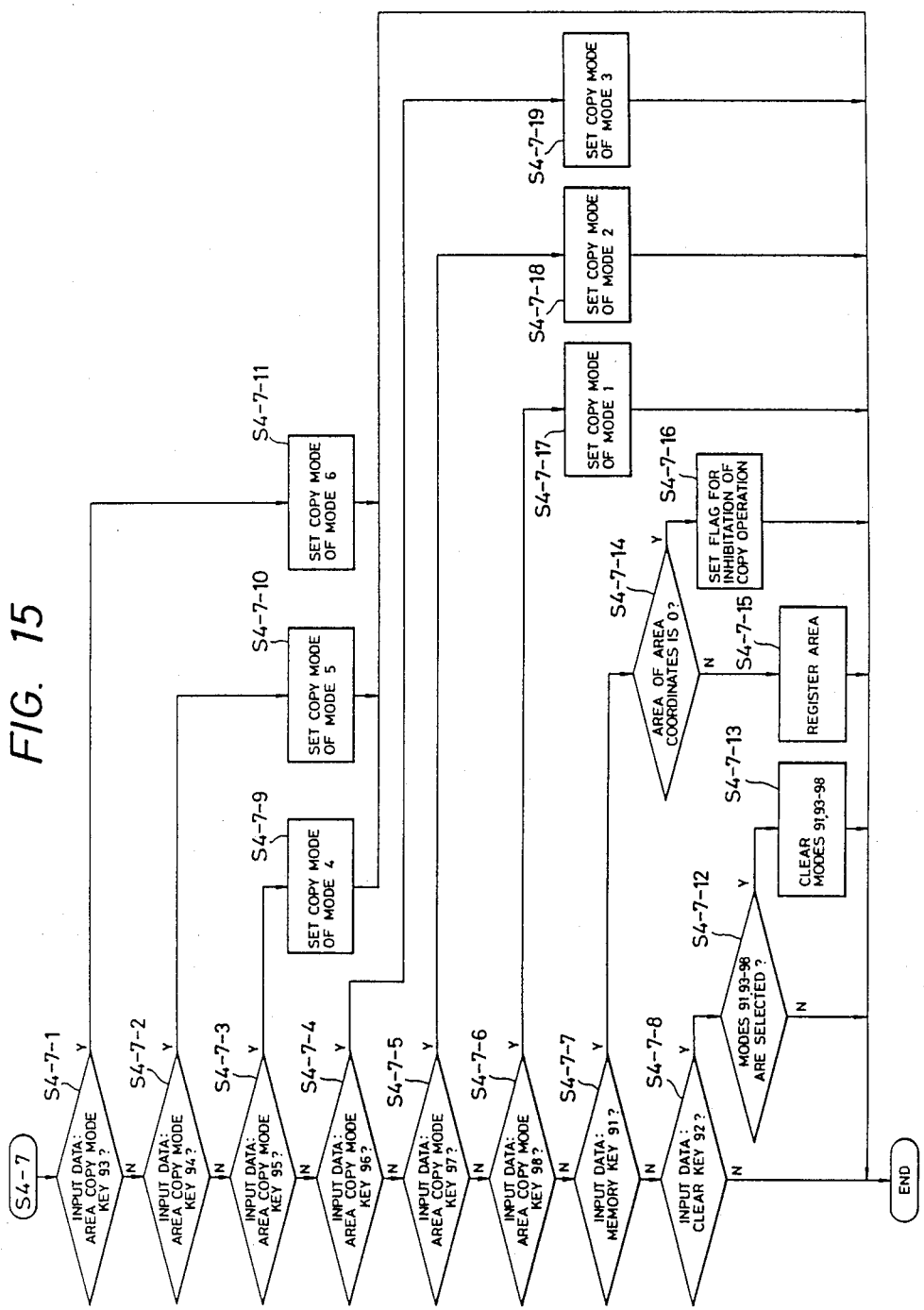

FIG. 15 is a flowchart showing that the designation of the area coordinates, color mode, and multi-mode can be input from the editor.

If the input data denotes the area copy mode key 93 (FIG. 5-1) (step 4-7-1), the copy MODE 6 mentioned previously is selected (step 4-7-11).

If the input data denotes the area copy mode key 94 (step 4-7-2), the foregoing copy MODE 5 is selected (step 4-7-10).

If the input data denotes the area copy mode key 95 (step 4-7-3), the foregoing copy MODE 4 is selected (step 4-7-9).

If the input data denotes the area copy mode key 96 (step 4-7-4), the foregoing copy MODE 3 is selected (step 4-7-19).

If the input data denotes the area copy mode key 97 (step 4-7-5), the foregoing copy MODE 2 is selected (step 4-7-18).

If the input data denotes the area copy mode key 98 (step 4-7-6), the foregoing copy MODE 1 is selected (step 4-7-17).

If the input data denotes the memory key 91 (step 4-7-7), a check is made to see if the area of the registered area is 0 or not (step 4-7-14). If it is 0, the flag for inhibition of the copy operation is set (step 4-7-16). If NO in step 4-7-14, the area is registered (step 4-7-15). The area can be easily calculated from the coordinates of two points in the designated area.

If the input data denotes the clear key 92 (step 4-7-8), a check is made to see if either one of the mode keys 91 and 93 to 98 has been selected or not (step 4-7-12). If YES, the mode selected by either one of the mode keys 91 and 93 to 98 is cleared.

In this manner, the designation of an area, color mode, or multi-mode can be selected from the editor.

In addition, the two-sided mode may be also easily added to the editor.

Figure 16:
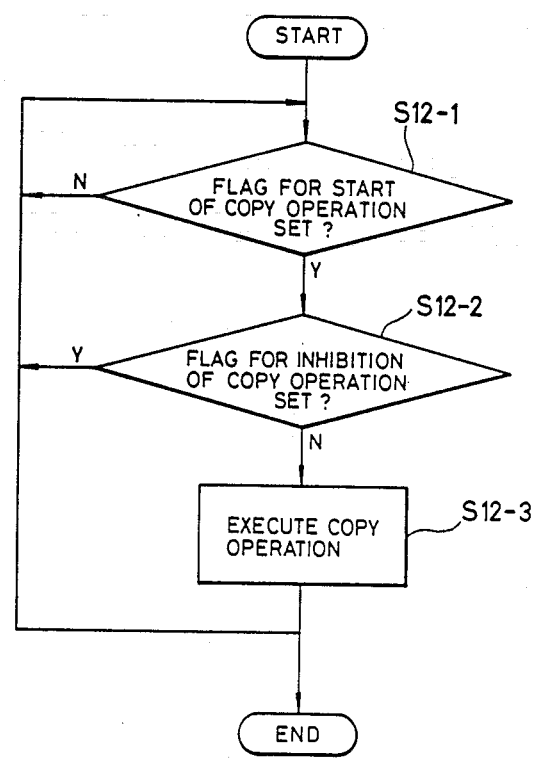

FIG. 16 is a flowchart in the case where the copy operation is not executed when the area of the registered area is 0. By pressing the copy key 117 and the like, the flag for start of the copy operation is set. A check is made to see if the copy operation start flag has been set or not (step 12-1). If YES, a check is made to see if the copy inhibition flag has been set or not (step 12-2). If YES, the start of the copy operation is inhibited. Unless the copy inhibition flag is set, the copy operation is started (step 12-3).

These processes are provided to inhibit the copy operation when the invalid area was registered. This is because when the invalid area was registered erroneously by the user, it is necessary to inform the user of the misregistration.

In this embodiment, the input value is corrected when the area within 5 mm from the periphery of the editor was designated. However, if the user desires to change the range for correction of the input value, this range can be changed by the following procedure. First, by pressing the keys ✱ 1 ✱ (press the asterisk key 121 ✱, key 1 of the ten-key 122, and asterisk key ✱), the copier enters the mode to change the correction range of the input data of the editor. Then, by pressing the keys 3 ✱ (press the key 3 of the ten-key 122 and asterisk key 121 ✱), the correction range of the input data of the editor is changed to the region within 3 mm from the periphery of the editor. On the other hand, by pressing 0 of the ten-key 122 in place of 3 of the ten-key 122, the correction range of the input data of the editor is changed to 0 mm. This means that the input data of the editor is not corrected. As explained above by correcting the input data of the editor, the value of 5 mm shown in steps 4-4-1, 4-4-3, 4-4-5, and 4-4-7 in the flowchart shown in FIG. 14 is changed.

(Description of the designation of an area by the keys)

Figure 17:
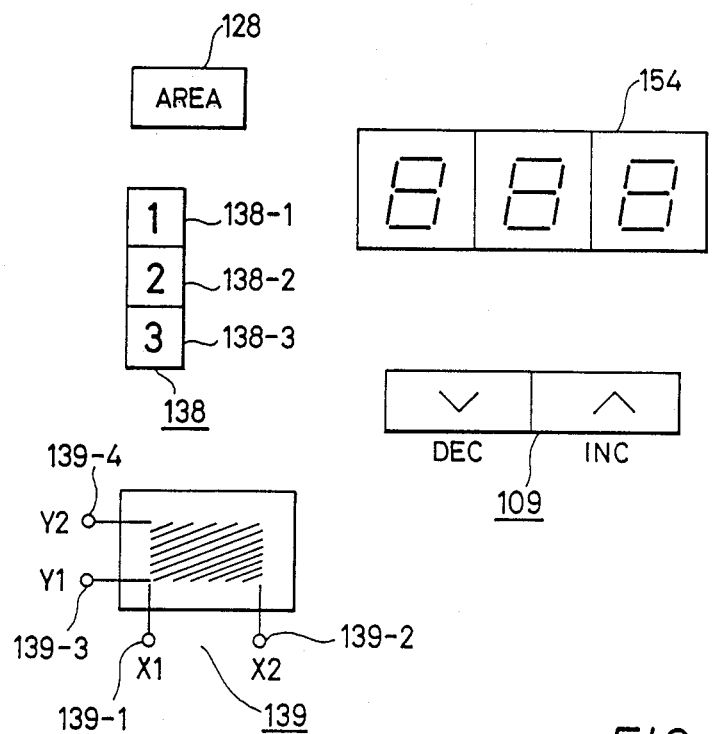
FIG. 17 is a diagram for explaining the designation of an area by keys.
Figure 18:
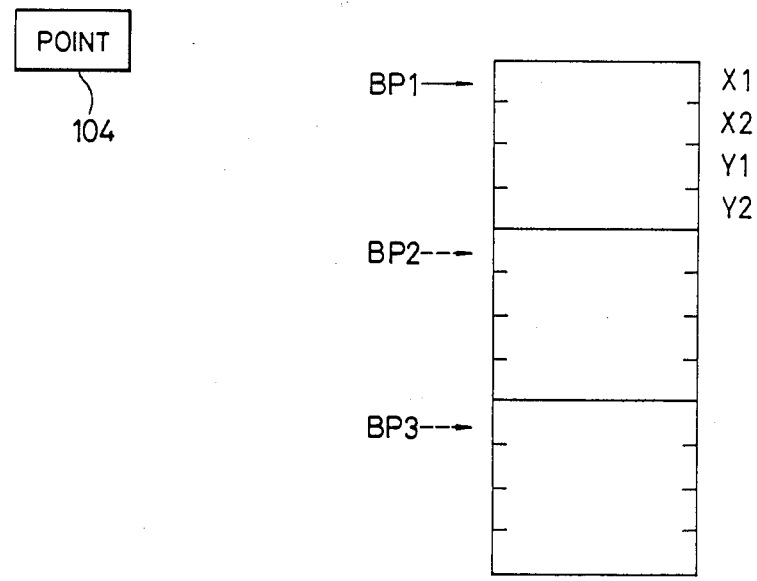
FIG. 18 is a diagram showing positions of base pointers.

The designation of an area and the input of coordinates by the keys will now be described with reference to FIGS. 17 and 18. Three rectangular areas each of which is expressed by two points located on the diagonal line of the area are previously stored in an area memory (not shown). Even if the copying apparatus is used for the first time, these data have preliminarily been stored. Therefore, to execute the area designation copy, the users selects either one of those three areas to be effected. Three kinds of combinations of the areas can be selected: namely, only area 1; areas 1 and 2; and areas 1, 2, and 3. A method of designating an area will now be described. First, by pressing the area key 128 once, an LED 138-1 (see FIG. 17) is turned on. In this state, only the area 1 is effected. By pressing the area key 128 again, LEDs 138-1 and 138-2 are lit. In this state, the areas 1 and 2 are effected. By further pressing the area key 128 again, LEDs 138-1, 138-2, and 138-3 are lit. In this state, the areas 1, 2, and 3 are effected. By pressing the area key 128 at the fourth time, all of the LEDs 138-1 to 138-3 are turned off and the area designation is released.

As previously described, every four coordinate data are stored in each of the three areas. The case of changing these data will be explained hereinbelow.

First, the area key 128 is pressed to designate the area to be changed. The areas 1, 2, and 3 are selected each time the area key is pressed at the first, second, and third times. As shown in FIG. 18, a base pointer BP indicative of the data to be changed is designated. The content of the display of the LEDs 138 (i.e., 138-1 to 138-3) is the same as the foregoing case of the designation of the effective areas.

After the area to be changed was designated, the coordinates to be changed can be selected by pressing the point key 104. First, by pressing the point key 104, an LED 139-1 flickers and the base pointer is set to $X_1$, so that the coordinates of $X_1$ can be input. At this time, the data of $X_1$ stored at present is displayed on a mm-unit basis in the magnification display section 154. $X_1$ denotes the x coordinate of the corner portion on the left lower side of the area; $X_2$ is the x coordinate of the corner portion on the right upper side; $Y_1$ is the y coordinate of the corner portion on the left lower side; and $Y_2$ is the y coordinate of the corner portion of the right upper side. The data of $X_1$ can be changed by use of the ten-key keyboard 122 or zoom magnification key 109. The copy magnification can be changed by use of the zoom magnification key 109 by increasing or decreasing the value displayed in the display section 154.

Next, by pressing the point key 104, the data displayed in the magnification display section 154 is stored as the data of $X_1$ and at the same time, the data of $X_2$ stored at present is displayed in the display section 154 and the base pointer is moved to $X_2$. Further, the flickering of the LED 139-1 is stopped and then it is turned on. An LED 139-2 of $X_2$ flickers. If the data of $X_2$ needs to be changed at this time, it can be changed by performing the operations similar to the above. Similarly, by pressing the point key 104, the data can be changed in accordance with the order of $Y_1$ and $Y_2$. After completion of the storage of the data of $Y_2$ by pressing the point key 109, four LEDs 139-1 to 139-4 of $X_1$, $X_2$, $Y_1$, and $Y_2$ are turned off.

When the base pointer is not selected, namely, when all of the LEDs 138-1 to 138-3 are OFF, even if the point key 104 is pressed, the data of $X_1$ to $Y_2$ cannot be changed.

By pressing the point key 104, the LED 138 corresponding to the selected area flickers so that the value of the base pointer can be confirmed. After completion of the storage of the data of $X_1$ to $Y_2$, the flickering of the LED 138 of the selected area is stopped and then it is turned on. However, the base pointer can be changed only when the area 128 is pressed.

If the area key 128 is pressed when either one of the LEDs 139 (i.e., 139-1, 139-4) of $X_1$ to $Y_2$ flickers or is turned on, the base pointer is shifted to the next area. However, if the base pointer was designated to area 3, the data changing mode is released.

(Description of the blank exposure)

The control of the LED array 14 in the area designation copy mode will now be described.

Figure 19:
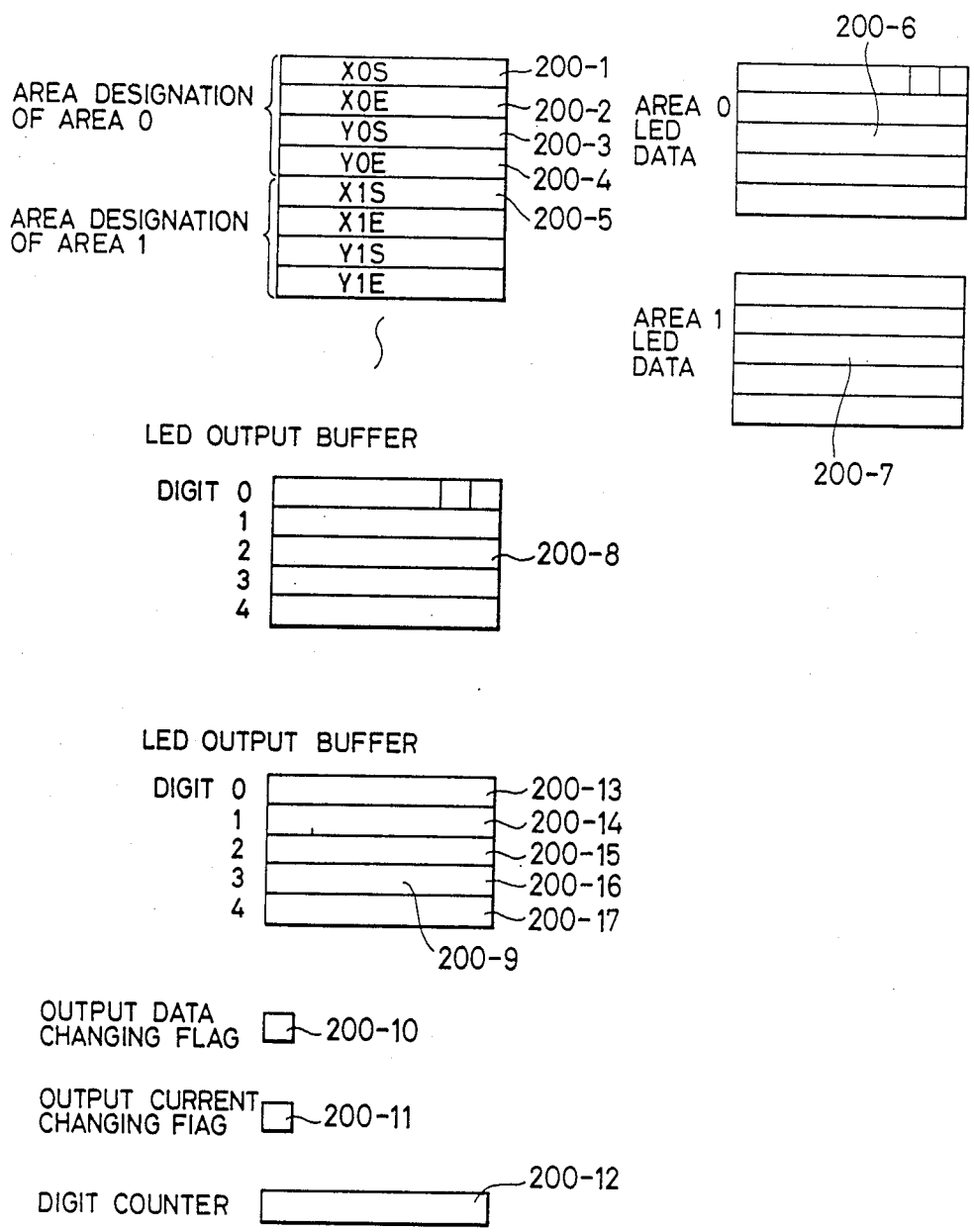
FIG. 19 is a diagram showing RAMs to store data for controlling the LED array.

FIG. 19 shows a part in the RAM. The areas necessary for control are kept in the RAM. The number of areas which can be designated is assumed to be 2 for simplicity of explanation. Reference numeral 200-5 denotes a memory area in which the data of the area set by the operation section 100 or editor 70 is stored. Numeral 200-1 denotes start data in the X direction (scan direction of the optical system) of area 0; 200-2 is end data in the X direction of area 0; 200-3 is the start position data in the Y direction (vertical direction) of area 0; and 200-4 is the end data in the Y direction of area 0. In this manner, four data are set with respect to one area (namely, area 0 in this case). Four data are also similarly set with regard to area 1. Numeral 200-6 denotes ON/OFF data of the LEDs corresponding to the data 200-3 and 200-4. In this embodiment, the data 200-6 as much as $5 \times 24$ bits is provided and one bit corresponds to one LED.

For example, assuming that 100 is set into 200-3 ($Y_{OS}$) and 200 is set into 200-4 ($Y_{OE}$), since the LED array 14 is constituted by arranging the LEDs at the pitch of 2.5 mm, the bits of the data 200-6 from the 40th (100/2.5) bit to the 80th (200/2.5) bit are set to 1 and all of the other bits are set to 0.

Similarly, the data corresponding to the data in the Y direction of area 1 is set into 200-7. Numeral 200-8 denotes an area which is used to change the lighting state of the LED array and has the same number of bits as that in the areas 200-6 and 200-7. An area 200-9 is used to set the state in which the LED array is actually dynamically turned on. As will be explained hereinafter, the data in this area is output in correspondence to each digit and the transistors 82 are driven. An output data changing flag 200-10 and an output current changing flag 200-11 are used when the lighting state of the LED array is changed. A digit counter 200-12 is used to control which digit is output.

Figure 20:
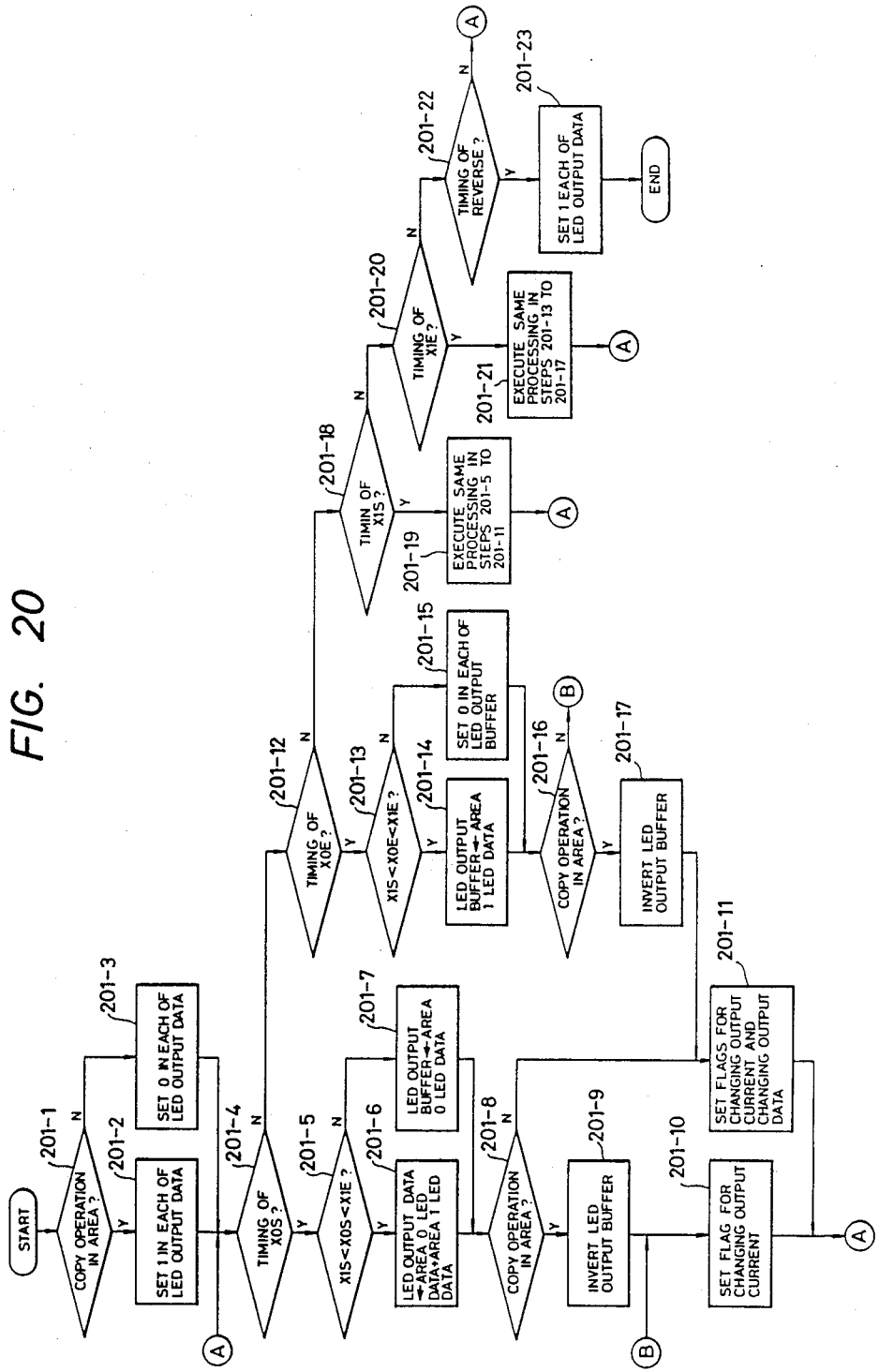
FIGS. 20 and 21 are flowcharts showing controls of the LED arrays.

FIG. 20 is a flowchart showing how to control the LED array 14 in correspondence to the area. When the copy operation is started, the optical system starts scanning in the X direction. A check is made to see if the copy mode is the copy operation in area or not in step 201-1. If YES, the LED output data 200-9 is all set to 1 in step 201-2. Thus, all of the LEDs in the LED array 14 are turned on and the image is all erased. If NO, all of the LED output data 200-9 is set to 0 in step 201-3. Thus, the LED array 14 is all turned off and the image is formed in every portion in the Y direction. In step 201-4, a check is made to see if the operation timing is the start timing in the X direction of area 0 or not. If NO, a check is made to see if the operation timing is the end timing in the X direction of area 0 or not in step 201-12. If NO, step 201-18 follows and a check is similarly made to see if the operation timing is the start timing in the X direction of area 1 or not. If NO, a check is made in step 201-20 to see if the operation timing is the end timing in the X direction of area 1 or not. If NO, a check is made to see if the operation timing is the timing for reverse of the optical system or not in step 201-22. If NO, step 201-4 follows. If the operation timing is none of the process timings as mentioned above, the loop consisting of steps 201-4→201-12→201-18→201-20→201-22→201-4 is repeated.

If the start timing in the X direction of area 0 comes, step 201-5 follows step 201-4 and a series of processes are executed.

In step 201-5, a check is made to see if the value of the start data in the X direction of area 0 lies within a range between the value of the start data of area 1 and the value of the end data of area 1 or not. If YES, step 201-6 follows. In this case, since area 0 and area 1 overlap, the OR of the LED data 200-6 of area 0 and the LED data 200-7 of area 1 is set into the LED output buffer 200-8, then 201-8 follows. If NO in step 201-5, this means that the start position in the X direction of area 0 does not overlap area 1. Therefore, the content of the LED data 200-6 of area 0 is directly set into the LED output buffer 200-8, then step 201-8 follows. In step 201-8, a check is made to see if the copy mode is the copy operation in area or not. If YES, step 201-9 follows and the content of the LED output buffer 200-8 is inverted. The output current changing flag 200-11 is set in step 201-10 and the processing routine is returned to step 201-4. Thus, as explained in the foregoing example, for example, if 100 and 200 are set in 200-3 and 200-4, the LEDs at the positions in the Y direction corresponding to 100 to 200 are turned off and the other LEDs are turned on. The image is output to only the inside of a predetermined area. As will be mentioned hereinafter, since only the output current changing flag 200-11 is set, after the LED array 14 was powerfully lit on for one period of each of the digits 0 to 4 in the lighting state of the LED array 14, the previous lighting state of the LED array 14 is changed. On the other hand, if it is determined in step 201-8 that the copy mode is not the copy operation in area, step 201-11 follows and both of the output data changing flag 200-10 and output current changing flag 200-11 are set. Since the LED output buffer is not inverted, when 100 and 200 are set in 200-3 and 200-4 as in the foregoing example, only the LEDs at the portions corresponding 100 to 200 in the Y direction are turned on and the images in these portions are erased. In addition, since both flags 200-10 and 200-11 are set, the lighting state of the LED array 14 is changed from the timing at which the next digit 0 is output and the LED array 14 is powerfully turned on for only one period of the digit 0. Then, the processing routine is returned to step 201-4.

The case where the end timing in the X direction of area 0 has come will now be described. The processing routine advances from step 201-12 to to step 201-13 and a check is made to see if the end timing in the X direction of area 0 lies within the range between the start and end positions of area 1 or not. If YES, step 201-14 follows. Since the end position in the X direction of area 0 is included in area 1 although the copy of area 0 has already been finished, the data of the LED data 200-7 of area 1 is set into the LED output buffer 200-8. On the contrary, if NO in step 201-13, step 201-15 follows and all 0 is set into the LED output buffer 200-8 since the end position in the X direction of area 0 is not included in any area. In the next step 201-16, a check is made to see if the copy mode is the copy operation in area or not. In the case of the copy operation out of area, the content of the LED output buffer 200-8 is inverted in step 201-17 in a manner similar to the above. In step 201-11, the output data changing flag 200-10 and output current changing flag 200-11 are set, then step 201-4 follows again. On the other hand, if NO in step 201-16, only the flag 200-11 is set in step 201-10, then step 201-4 follows again.

Next, when the start timing in the X direction of area 1 has come, the processing routine advances from step 201-18 to step 201-19. In step 201-19, the processes are executed in a manner similar to the foregoing case where the start timing in the X directon of area 0 has come. The processes in step 201-19 are substantially the same as those in steps 201-5 to 201-11 except that the area number is replaced from 0 to 1; therefore, their descriptions are omitted.

On the other hand, if the end timing in the X direction of area 1 has come, step 201-21 follows step 201-20 and the processes are executed in a manner similar to the foregoing case where the end timing in the X direction of area 0 has come. As the scan of the optical system advances, when the timing for reverse of the optical system comes, the processing routine advances from step 201-22 to step 201-23. In step 201-23, all 1 is set into the LED output data 200-9 and the LED array 14 is all turned on to erase the unnecessary image. The optical system starts moving backwardly and the copy of one cycle is finished. The processes are also similarly carried out when three areas are set.

Figure 21:
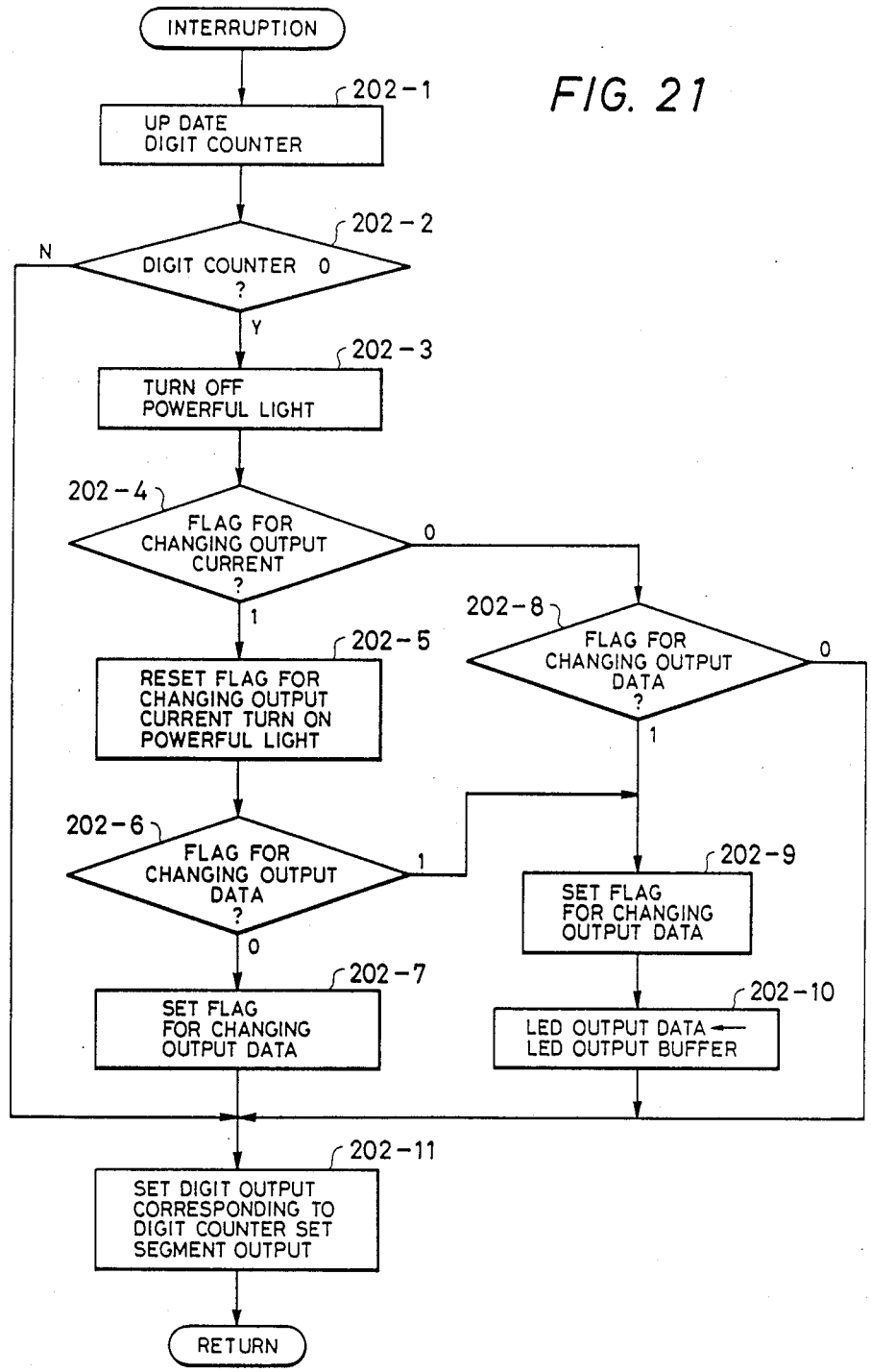

The case of controlling the dynamic lighting operation of the LED array 14 will now be described with reference to FIG. 21. This routine is executed by the timer interruption at every millisecond.

First, the operation in the case where none of the flags 200-10 and 200-11 is set will be explained. The count value of the digit counter 200-12 is updated in step 202-1. In this embodiment, there are four kinds of digits 0 to 4 and the digit counter 200-12 is also updated to one of the values 0 to 4. If the value of the digit counter is not 0, step 202-11 follows. If the count value is 0, step 202-3 follows and the powerful lighting is turned off. The processes in steps 202-4, 202-8, and 202-11 are sequentially executed and the digit output and segment output corresponding to the value of the digit counter 200-12 are set. For example, when the value of the digit counter 200-12 is 0, the digit 0 is turned on. The content of the data 200-13 corresponding to the digit 0 of the LED output data 200-9 is output as the segment output. If the count value of the digit counter is 1, the corresponding LEDs are turned on. If it is 0, the corresponding LEDs are turned off. The count value of the digit counter is sequentially updated. At the next timing, the digit 1 is turned on in step 202-11. The content of data 200-14 corresponding to digit 1 of the LED output data 200-9 is output as the segment output.

Next, the operation in the case where both of the flags 200-10 and 200-11 are set will be described. The processes similar to the above are executed until the count value of the digit counter 200-12 becomes 0. When it becomes 0, the processing routine advances from step 202-2 to step 202-3 and the powerful lighting is released. At this time, since the previous state is also such that the powerful lighting mode is OFF, the process in step 202-3 is meaningless.

After step 202-4, step 202-5 follows and the powerful lighting mode is set and the output current changing flag 200-11 is reset. Then, step 202-9 follows step 202-6 and the output data changing flag 200-10 is reset. In step 202-10, the content of the LED output buffer 200-8 is set to the LED output data 200-9. The process in step 202-11 is executed and the processing routing is finished. When the value of the digit counter 200-12 becomes 0, step 202-3 follows step 202-2 and the powerful lighting is released. Since both flags have already been reset, the ordinary processes in steps 202-4, 202-8, and 202-11 are executed. Therefore, the lighting state of the LED array is changed at the timing of the digit 0 and the powerful lighting is turned on for one period after that.

Figure 22:
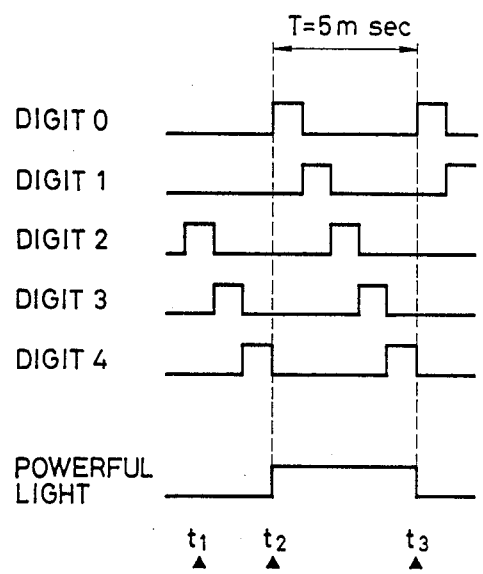
FIGS. 22 and 23 are diagrams showing powerful light-on timings of the LEDs.

The operation in the case where only the output current changing flag 200-11 is set will now be described. When the value of the digit counter 200-12 becomes 0, step 202-3 follows step 200-2 and the powerful lighting is released. After step 202-4, the processes similar to the above are executed in step 202-5. Then, step 202-7 follows step 202-6 and the output data changing flag 200-10 is set, then the process in step 202-11 is performed. In this way, the processing routine is finished. When the value of the digit counter 200-12 becomes 0, step 202-3 follows step 202-2 and the powerful lighting is released. The processes in steps 202-4, 202-8, and 202-9 are executed and the output data changing flag 200-10 is reset. In step 202-10, the content of the LED output buffer 200-8 is set to the LED output data 200-9 and the lighting state of the LED array 14 is changed. Thus, in the lighting state of the LED array 14 before one period, the powerful lighting is turned on for one period after the digit 0. Thereafter, the lighting state of the LED array 14 is updated. FIG. 22 shows timings to change the digit outputs, powerful currents, and LED output data. In FIG. 22, time $t_1$ denotes a start or end timing of an area. At this timing, the output current changing flag 200-11, output data changing flag 200-10, and content of the LED output data 200-9 are set in accordance with the image changing mode.

Figure 23:
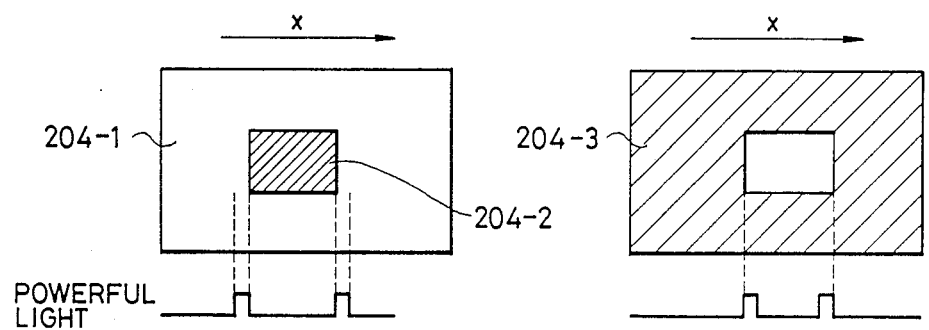

The powerful lighting is turned on at an output timing $t_2$ of the first digit 0 after that. The powerful lighting is released after the elapse of one period T since then. On the other hand, the LED output data is changed at a timing of $t_2$ or $t_3$ in accordance with the image changing mode and the start or end position of the area. The change of the LED output data at timing $t_2$ is performed on the basis of the end timing of the area in the case of the copy operation in area and the start timing of the area in the case of the copy operation out of area. On the other hand, the change of the LED output data at timing $t_3$ is executed on the basis of the end timing of the area in the case of the copy operation out of area and the start timing of the area in the case of the copy operation in area. Thus, as shown in FIG. 23, in any of the copy-in-area mode and the copy-out-of-area mode, the powerful lighting is turned on on the side of the non-image area at the boundary of an image area 204-2 and a non-image area 204-1, so that the sharp edge is held. In addition, by changing the lighting state of the LED array synchronously with the timing of the digit 0, the edge becomes more rectilinear. This state is shown in FIG. 24.

Figure 24:
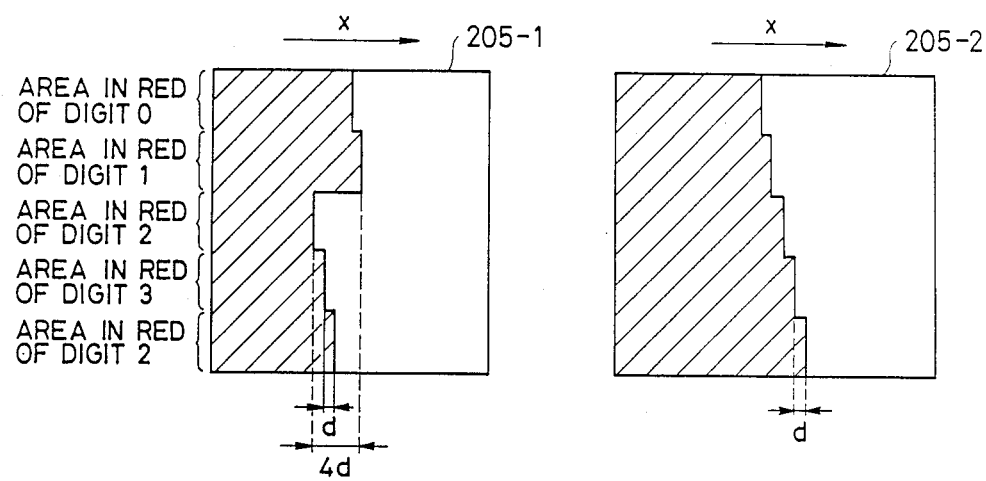
FIG. 24 is a diagram showing an erasing state by the light-on of the LED.

In FIG. 24, reference numeral 205-1 shows the case where, for example, the lighting state of the LED array was changed from all-off to all-on by the digit 2. d represents a distance when the drum moves for one msec.

As shown in the diagram, the deviation of maximum 4d occurs between the areas of the LEDs of the digits 1 and 2. However, by changing the lighting state of the LED array synchronously with the digit 0 as in the present invention, the deviation always becomes d as shown in 205-2. Consequently, the boundary portion seems to be smooth. By attaching the LED array obliquely, the state which is further near the straight line can be obtained.

Figure 25:
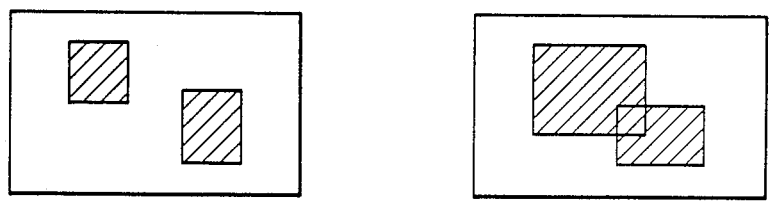
FIGS. 25 and 26 are diagrams showing examples of outputs in the case of designating a plurality of areas.

FIG. 25 is a diagram showing the results of outputs in the case where two areas are set in the copy-in-area mode. The images are output in the hatched portions. As mentioned above, since the OR of two areas is calculated, even if the two areas are away from each other, or even if they overlap, the image of only a desired portion can be obtained.

Figure 26:
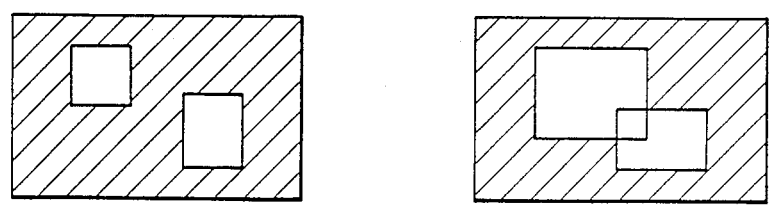

FIG. 26 is a diagram showing the results of outputs when two areas are set in the copy-out-of-area mode. The images exist in the hatched portions. Similarly to the case of the copy-in-area mode, even if the two areas are away from each other, or even when they overlap, the images of a desired portion can be erased.

(Description of the editor: III)

Figure 27:
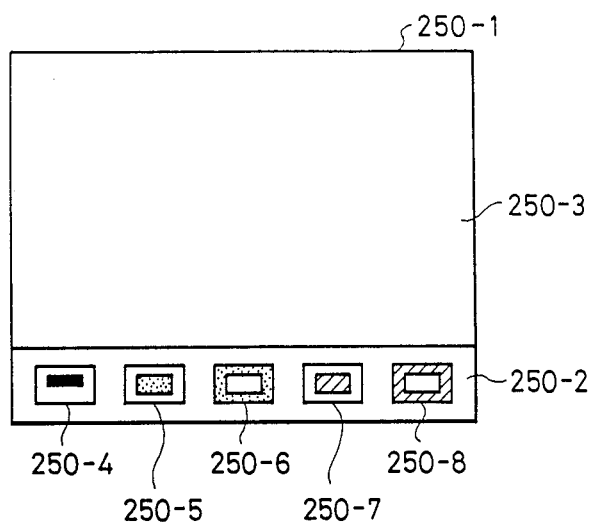
FIG. 27 is a diagram showing another embodiment of an editor.

A different embodiment in the area designation mode will now be described. FIG. 27 shows an editor 250-1. Reference numeral 250-2 denotes a portion to set the image changing mode and 250-3 is a portion to designate an area. The mode setting portion 250-2 includes: a portion 250-4 to designate the painting-out mode; a portion 250-5 to designate the color copy of the inside of the area; a portion 250-6 to designate the color copy of the outside of the area; a portion 250-7 to designate black copy of the inside of the area; and a portion 250-8 to designate black copy of the outside of the area. By pressing the mode setting portion after designating desired two points in the area designating portion 250-3, one area (rectangular having the diagonal line which is defined by these two points) is set and at the same time, the mode of this area is registered. By pressing the painting-out designating portion 250-4, the set area is painted out in color irrespective of the image of the original. By pressing the portion 250-5 to designate the color copy of the inside of the area, only the inside of the set area is copied by the color toner. By pressing the portion 250-6 to designate the color copy of the outside of the area, only the outside of the set area is copied as the color image. By pressing the portion 250-7 to designate the black copy of the inside of the area, only the inside of the set area is copied in black. By pressing the portion 250-8 to designate the black copy of the outside of the area, only the outside of the set area is copied in black.

Figure 28:
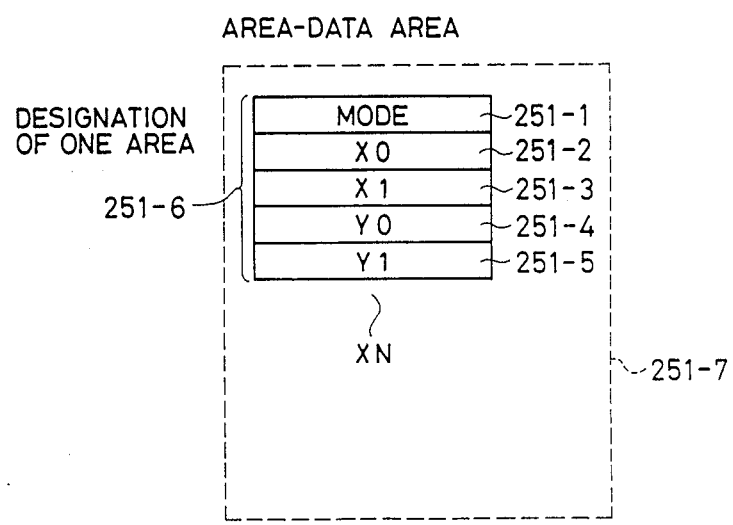
FIG. 28 is a diagram showing a memory to store area data.

FIG. 28 shows an area-data area 251-7 to store the designated area-data. The area 251-7 is provided in the RAM. A portion 251-1 to store the designated mode, e.g., the mode to set the red copy of the inside of the area and to set the black copy of the outside of the area, or the like and portions 251-2 to 251-5 to store the coordinates of the designated area are provided in one area designation 251-6. A plurality of data 251-6 concerned with one area designation are set in the area-data area 251-7. By pressing desired two points in the area designating portion 250-3 in the editor 250-1 by using a pen (not shown) and thereafter by pressing the mode designating portion in the image changing mode setting portion 250-2, the mode is stored into the portion 251-1 and the point data is stored into the portions 251-2 to 251-5.

The copy operation after the copy instruction was input will now be described in accordance with a flowchart shown in FIG. 29. First, in step 252-1, the portions in the area-data area 251-7 where the mode is stored are all searched and examined. In step 252-2, a check is made to see if the mode for painting out in black or the mode for painting out in red has been set in those portions or not. The case where the mode for painting out has been set will be first explained. The transfer paper is picked up from the cassette in step 252-3. As will be explained hereinafter, the copy operation to paint out only the portion corresponding to the designated painting-out area in the designated color is performed. The transfer paper is set into the second paper pick-up section 23 such that the copied side faces downwardly. At this time, as shown in FIG. 32, only a designated portion 255-2 of the transfer paper is painted out in color and the other portion is white. In step 252-4, a check is made to see if the mode to designate the color copy of the inside of the area or the mode to designate the color copy of the outside of the area has been set or not. If NO, i.e., if none of these color modes is designated, step 252-7 follows. If YES, i.e., if either one of those color modes has been set, a check is made in step 252-5 to see if the mode to designate the black copy of the inside of the area or the mode to designate the color copy of the outside of the area has been set or not. If NO, step 252-7 follows. If YES, step 252-6 follows. Therefore, in the case of performing both of the color and black copies, the processing routine advances to step 252-6. In the case of performing either the black copy or the color copy, the processing routine advances to step 252-7. In step 252-6, the transfer paper is picked up from the second paper pick-up section and the color copy in the area designating mode is executed for the designated area as mentioned above. The transfer paper is again set into the second paper pick-up section so that the copied side faces downwardly. In the next step 252-8, the transfer paper is picked up from the second paper pick-up section and the black copy is performed in the area designating mode for the designated area. Then, the transfer paper is fed out and the copy operation is finished.

Therefore, in this case, as shown in FIG. 32, the painting-out copy is first performed and the color copy is executed for the same side and, finally, the black copy is carried out for the same side. In this way, the copy operation is completed.

On the other hand, in step 252-7, the transfer paper is picked up from the second paper pick-up section 23 and the copy operation is executed in the designated color for the designated area. Then, the transfer paper is fed out and the copy operation is finished.

The case where the painting-out mode is not designated will now be described. The processing routine advances from step 252-2 to step 252-9 and a check is made in step 252-9 to see if the mode to designate the color copy of the inside of the area or the mode to designate the color copy of the outside of the area has been set or not. If NO, i.e., if none of those color modes is set, step 252-12 follows. If YES, namely, if either one of those color modes has been set, step 252-10 follows. In step 252-10, a check is made to see if the mode to designate the black copy of the inside of the area or the mode to designate the black copy of the outside of the area has been set or not. If YES, step 252-11 follows. If NO, step 252-12 follows. Namely, when it is necessary to perform both of the color and black copies, step 252-11 follows. When either one of the color copy and the black copy needs to be performed, step 252-12 follows. The transfer paper is picked up from the cassette in step 252-11 and the copy is performed in color for the designated area. The transfer paper is set into the second paper pick-up section 23 so that the copied side faces downwardly. In the step 252-8, similarly to the above, the transfer paper is picked up from the second paper pick-up section and the black copy is performed for the designated area. Then, the transfer paper is fed out and the copy operation is finished. On the other hand, in step 252-12, the transfer paper is picked up from the cassette and the copy operation is performed in the designated color for the designated area. Then, the transfer paper is fed out and the copy operation is completed.

Figure 30:
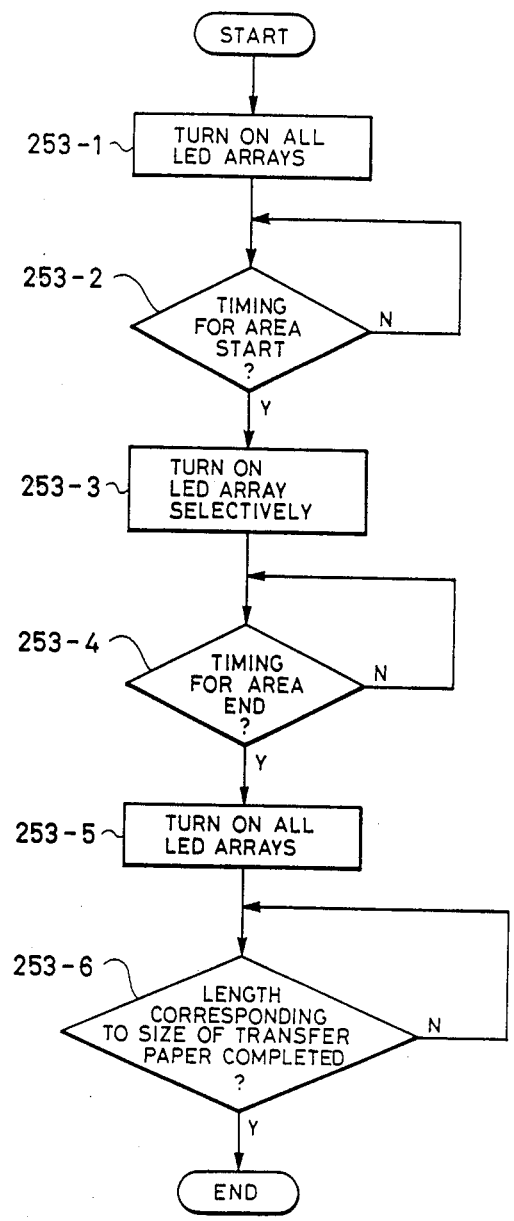

The painting-out copy mode will now be described. In the case of painting out, by keeping the light-off state of the exposing lamp 24, an electrostatic latent image of a painting image (black image) is formed on the photo sensitive drum 20. Therefore, as previously described above with regard to the area copy, by selectively lighting on the LEDs of the LED array 14 at the timings according to the designated area, the latent image in the unnecessary portion can be erased and only a desired portion can be output as a painting image (black image). FIG. 30 shows a flowchart in this case. In step 253-1, all of the LED array 14 is turned on and the pick-up of the transfer paper is then started at a predetermined timing.

A check is then made in step 253-2 to see if the area start timing has come or not. If NO, the loop in step 253-2 is repeated. Thereafter, when the area start timing has come, the LED array 14 is selectively lit on in accordance with the coordinates in the Y direction of the designated area in step 253-3. Next, in step 253-4, a check is made to see if the end timing in the X direction of the area has come or not. If YES, all of the LED array 14 is turned on in step 253-5 to erase the image in the whole area. A check is made in step 253-6 to see if the development of the image corresponding to the size of transfer paper has been finished or not by counting the pulses. If YES, one cycle is finished. FIG. 31 shows an example of the result of the copy. In the diagram, an area 254-4 is painted out in color and an area 254-3 is copied in black. The image in the area 254-4 is also similarly copied in black and as shown in the diagram, the black characters (corresponding to the original) of "ABC" are output to the area 254-4 which was painted out in color. The original is copied in color in an area 254-2. The image of the other portion is erased. Such a copy as shown in FIG. 31 can be obtained by executing the following operations. An original is set onto the editor 250-1 and two points on the diagonal line of the area 254-4 are input by the editor. The painting-out mode of 250-4 is designated. Arbitrary two points which will form a diagonal line of the area of 254-3 are pressed. The portion 250-5 to designate the color copy of the inside of the area is pressed. Arbitrary two points which will form a diagonal line of the area 254-2 are pressed. Finally, the portion 250-7 to designate the black copy of the inside of the area is pressed. The original is set onto the original plate and the copy key is pressed. By executing these input operations, the painting-out portion of the area 254-4 is first copied. Then, the portion 254-2 is copied in color on the same side. Finally, the portion 254-3 is copied in black and the copy operation is automatically finished. In this manner, the foregoing copy can be obtained by the very simple operations. In addition, since the painting-out copy is first performed, the original image can be copied on the portion painted out. Therefore, this method is very useful in the case where, for example, the title portion is highlighted. Further, since the color portion, black portion, and portion to be painted out can be input at a time, the troublesome operations to set the original onto the editor and onto the original plate many times can be reduced. Thus, the operation is fairly simplified and this method matches with the thought pattern of human being.

On the other hand, by use of the LED array having a narrow irradiating width, a thin line such as an underline can be also formed. In this case, the coordinates in the Y direction of the designated area may be equalized.

According to the example of the result of the output shown in FIG. 31, each of the modes to designate the color copy of the inside of the area, to designate the black copy of the inside of the area, and to designate the painting-out of the area has been applied to only one area. However, as described above, those modes can be designated with respect to a plurality of areas. In addition, only the modes shown in FIG. 27 have been registered for one area. However, for example, the mode to designate a copy magnification and the mode to designate the position of the transfer paper to which the image of the designated area is output can be also added. The copy magnification and the designated position are added in the portion 251-1 to store the mode as shown in FIG. 28. Two areas such that, for example, the images in the designated areas are copied in color in copy operation are registered. Assuming that the copy magnification of one of the two areas is set to 100% (this area assumes area 1) and the copy magnification of the other one is set to 64% (this area assumes area 2), it is sufficient to set the processes in steps 252-6 and 252-11 in the flowchart shown in FIG. 29 in the following manner. Only the area 1 is copied in color at the copy magnification of 100% and the transfer paper is set in the second paper pick-up section 23. Next, the magnification is changed and the transfer paper is picked up from the second paper pick-up section 23 and only the area 2 is copied in color at the copy magnification of 64%. Then, the transfer paper is again enclosed in the second paper pick-up section 23. The difference between the value of the designated copy position and the position of the area is calculated and the feeding timing of the transfer paper is deviated by the time corresponding to only this difference. Thus, the position can be designated (only in the X direction in this embodiment). Even in the case where the position is designated, for example, when the deviation amount of the feeding timing of the transfer paper by the designation of the position of a certain area and the deviation amount of another area differ, it is similarly sufficient to perform the multi-copy by separately exposing twice.

If one transfer paper is multi-copied many times, the transportation state will deteriorate, a paper jam will occur, the transfer state will deteriorate, and a good image cannot be obtained due to the damage of the transfer paper. To prevent this problem, the number of multi-copy times is calculated each time the area is registered and if the calculated value is above a predetermined value, the registration is inhibited and an alarm is displayed.

In the foregoing embodiment, the image of each of the designated areas has been multi-copied onto the same transfer paper. However, the images of the respective areas may be also copied onto different transfer papers. In such a mode, the image of the designated area can be also output to the tip portion or central portion of the transfer paper. By pressing the asterisk key 121 [*], key [2] of the ten-key 122, and asterisk key 121 [*], the mode to copy the images of the designated areas to different transfer papers can be designated. On the other hand, by pressing [*] key 121, [3] of the ten-key keyboard 122, and [*] key 121, the mode to the image with the tip of the transfer paper can be designated. Further, by pressing the [*] key 121, [4] of the ten-key keyboard 122, and [*] key 121, the image can be output to the center of the transfer paper.

When the copy operation is started, first, the copy is performed on the basis of the mode and coordinates set at the head of the area-data area shown in FIG. 28 and the transfer paper is fed out. If the mode set at the head of the area-data area is [*][3][*], the feeding timing of the transfer paper is delayed by only $X_0$. If the mode set at the head of the area-data area is [*][4][*], the following calculation is executed.

$$T = \frac{X_1 + X_0}{2} - \frac{l}{2}$$

where, $l$ denotes a size of transfer paper.

As the result of this calculation, if the value of T is positive, the feeding timing of the transfer paper is delayed by only T. On the contrary, if the value of T is negative, the feeding timing of the transfer paper is advanced by only $|T|$.

Next, by reference to the second area designation in the area-data area in FIG. 28, if the data has been registered, the copy is similarly performed and the transfer paper is fed out. In this manner, the copy is sequentially executed. All of the copy operations are performed with respect to the areas registered in the area-data area in FIG. 28. In this way, a series of copy operations are finished.

As described above, according to the present invention, for example, in the case of filing the news of a newspaper for every item, a plurality of news items of the newspaper can be designated at once. In addition, a plurality of news items can be also copied onto different transfer papers by a single copy instruction. Moreover, the news can be copied at desired positions of the transfer paper. Consequently, this invention is very convenient.

FIG. 33 shows the result of outputs in the case of outputting two areas to the central portions of different transfer papers. Portions 33-12 and 33-13 are designated for an original 33-11. The portion 33-12 is copied in a central portion 33-15 of a transfer paper 33-14. The portion 33-13 is copied in a central portion 33-17 of a transfer paper 33-16.

(Description of the copy paper transporting path)

In this embodiment, two systems of the copy paper repick-up mechanisms are provided to realize the two-sided copy or multi-copy as mentioned above. Namely, the second paper pick-up section 23 and middle tray 40 are provided. Either one of them is selected and used in accordance with the copy mode.

Namely, the optimum transporting system is determined by the control section on the basis of the size of copy paper and the set number of copy sheets. The second paper pick-up section 23 is inevitable to realize the two-sided copy or multi-copy. Since the wide-resist can be easily matched by a mechanism, which will be explained hereinafter, the size of copy paper is not so restricted. However, two or more papers cannot be enclosed. On the other hand, although a plurality of papers can be stacked in the middle tray 40, the matching of the position in the wide direction is limited to only a predetermined fixed size.

Figure 34:
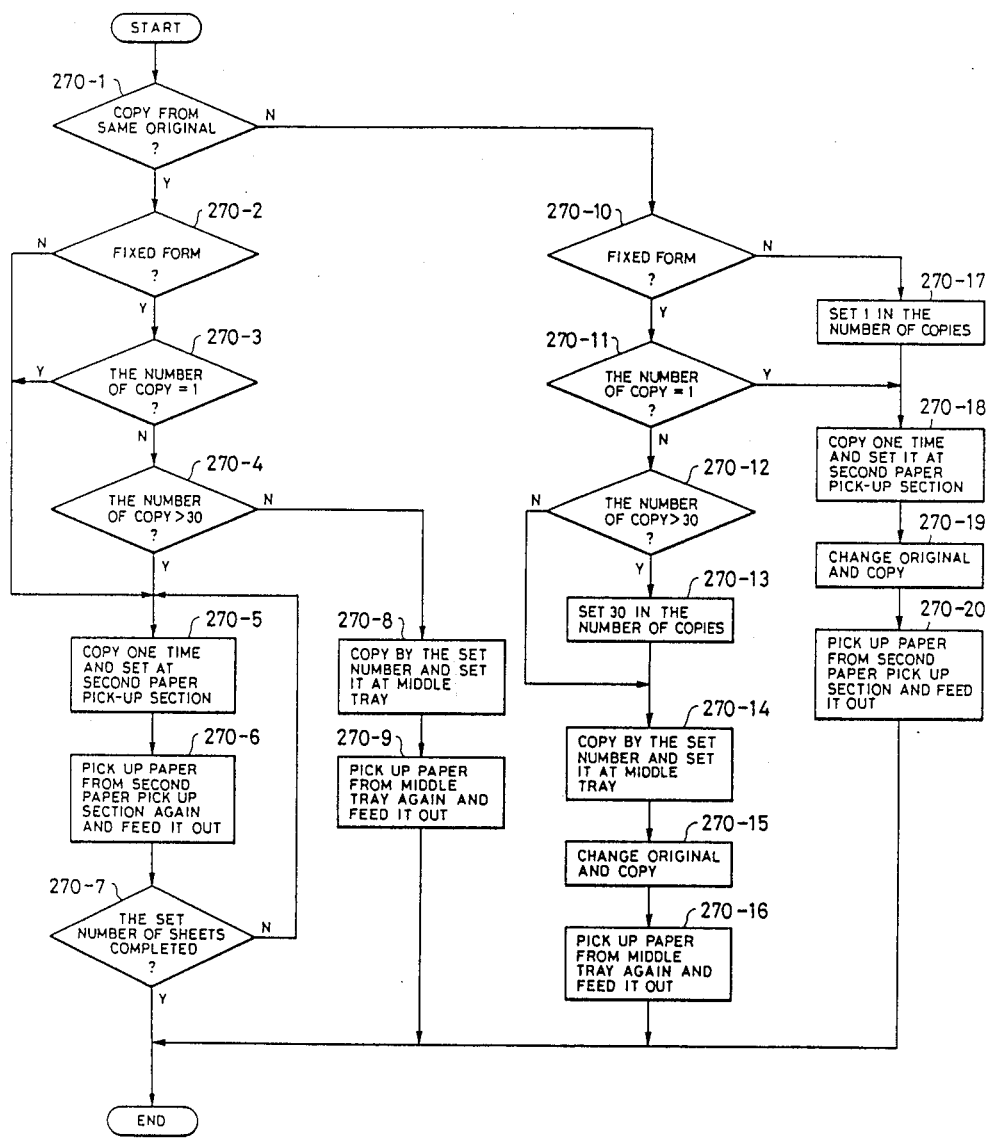
FIG. 34 is a flowchart showing the copying operation on the basis of the size of transfer paper and the number of copy sheets.

A method of selecting the paper path in the two-sided copy/multi-copy mode will be explained with reference to a flowchart shown in FIG. 34.

When the copy operation is started by the copy instruction, a check is first made in step 270-1 to see if the two-sided/multi-copy is performed from the same original, i.e., without exchanging the original or not. For example, it is YES in the case of the mode such that a predetermined portion of one original is copied in color and the other portion of this original is copied in black. If YES in step 270-1, a check is made in step 270-2 to see if the original is the size of fixed form or not. If NO, step 270-5 follows and the second paper pick-up section 23 is unconditionally selected. If YES, a check is then made in step 270-4 to see if the set number of copy sheets is one or not. If YES, step 270-5 follows similarly. If NO, a check is made in step 270-4 to see if the set number of copy sheets is larger than 30 as the maximum number of sheets which can be stacked in the middle tray 40 or not. If YES, step 270-5 follows. If NO, step 270-8 follows. In step 270-5, one transfer paper is copied and set into the second paper pick-up section 23. Then, in step 270-6, the transfer paper is again picked up from the second paper pick-up section 23 and copied thereon. Thereafter, the transfer paper is fed out.

In step 270-7, a check is made to see if the set number of copy sheets have completely copied or not. If NO, the loop of steps 270-5→270-6→270-7 is repeated and the copy operation is continued until the last copy sheet among the set number of sheets is copied. After completion of the copy of the last sheet, a series of copy operations are finished. On the other hand, if the processing routine advances to step 270-8, the copy operation is performed using the middle tray 40. The copy is executed to the set number of copy sheets in step 270-8 and the transfer papers are stacked in the middle tray 40. In the next step 270-9, the transfer papers are again picked up from the middle tray 40 and the copy is performed to the set number of copy sheets. Then, these transfer papers are fed out. In this way, a series of copy operations are finished.

If NO in step 270-1, step 270-10 follows. A check is made in step 270-10 to see if the original size is the fixed form or not. If NO, 1 is set into the set number of copy sheets in step 270-17 and step 270-18 follows. If YES, a check is made in step 270-11 to see if the set number of copy sheets is 1 or not. If YES, step 270-18 follows and the second paper pick-up section 23 is selected.

If NO in step 270-11, the middle tray 40 is selected. A check is made in step 270-12 to see if the number of copy sheets is larger than 30 or not. If it is larger than 30, 30 is set into the set number of copy sheets in step 270-13.

Next, in step 270-14, the copy is performed to the set number of copy sheets in a manner similar to step 270-8. The copy sheets are stacked into the middle tray. The original is exchanged in step 270-15 and when the copy instruction is generated, the copy operation is executed in step 270-16 similarly to step 270-9. In this way, the copy operation is finished. On the contrary, when the second paper pick-up section 23 is selected, the copy is performed in step 270-18 similarly to step 270-5. The original is exchanged in step 270-19 and when the copy instruction is generated, the copy operation is performed in step 270-20 similarly to step 270-6. In this manner, the copy operation is completed.

As described above, according to the embodiment, when the copy of the size other than the fixed form is performed in the two-sided/multi-copy mode, namely, in the case of picking up the transfer paper from the universal cassette or hand-insertion tray, and in the case of the single-copy mode, the transfer paper is not sent to the middle tray 40 but directly sent to the second paper pick-up section 23 and then picked up therefrom again. In the case of copying a number of transfer papers of the fixed form, the papers are temporarily stacked in the middle tray 40 and then sent to the second paper pick-up section 23 and thereafter, they are picked up again.

Either one of those two kinds of transporting systems is automatically selected and used by the sequence program in place of the operator. Therefore, the operator does not need to consider about its selection and the selection of the system is controlled so as to always select the optimum system. On the other hand, in the case of copying a number of transfer papers of sizes other than the fixed form, the middle tray is not used but the transfer papers can be copied one by one using the second paper pick-up section. Further, inconveniences of the transfer paper (for example, the size of paper is too small and the like) are discriminated and the two-sided/multi-copy process is not performed but the transfer paper is fed out. Thus, unnecessary troubles can be avoided.

Figure 35:
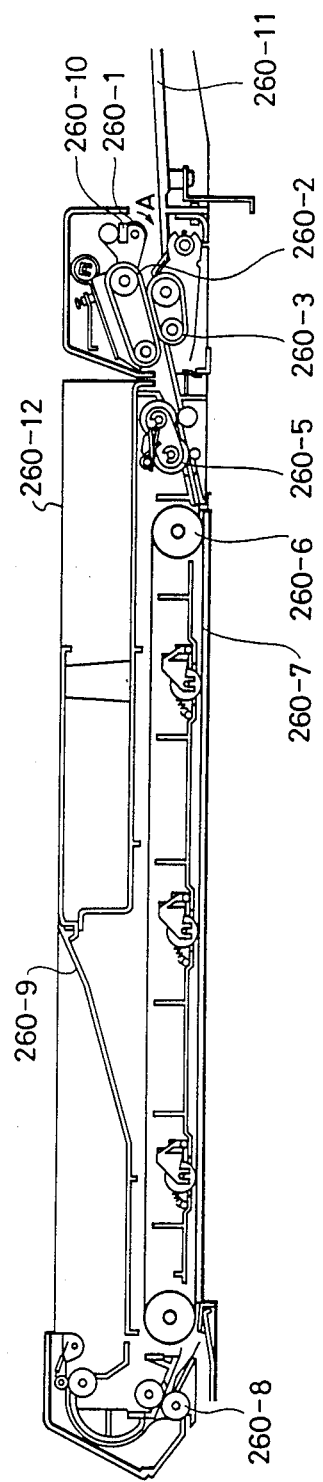
FIG. 35 is a cross sectional view showing a constitution of an auto document feeder.

An auto document feeder (hereinafter, referred to as an ADF) can be also attached to the copying apparatus of the embodiment. FIG. 35 shows the ADF. Hitherto, various kinds of ADFs have been proposed and the operation will be simply explained hereinbelow. In FIG. 35, reference numeral 260-12 denotes an ADF into which a plurality of originals can be set and from which they are automatically picked up; 260-11 is an original tray to set the original; 260-10 denotes an original sensor to detect the original; 260-1 denotes an auxiliary paper pick-up roller to separate and pick up the originals one by one; 260-2 denotes an upper belt; 260-3 a lower belt; 260-5 denotes a paper pick-up roller; 260-6 a drive roller; 260-7 denotes a transporting belt which is driven by the drive roller 260-6; 260-8 denotes a feed-out roller; and 260-9 denotes a feed-out tray portion.

When originals are set into the original tray 260-11, they are detected by the original sensor 260-10. A motor (not shown) is rotated by the copy instruction and each drive section starts operating. The auxiliary paper pick-up roller 260-1 rotates in the direction indicated by an arrow A by a mechanism (not shown) and transports a sheet of original to the pick-up roller 260-5. Then, the roller 260-1 is lifted up. Thereafter, the originals are conveyed by the pick-up roller 260-5 and transporting belt 260-7 and are stopped when the tip of original comes to the reference position of the original plate 5 shown in FIG. 1.

The optical system moves to start exposing the original. After completion of the exposure of a desired number of originals, the ADF restarts operating. At this time, if the originals are detected by the original sensor 260-10, the next original is fed similarly to the above and at the same time, the originals set on the original plate 5 are fed out to the feed-out tray portion 260-9 by way of the feed-out roller 260-8. The next original is copied. These operations are repeated until no original is left on the original tray 260-11. After the last original was set onto the original plate 5 and a predetermined exposure was performed to the original, the original sensor 260-10 doesn't detect the original; therefore, the paper pick-up operation is not performed but the original is fed out to the feed-out tray 260-9. In this manner, a series of copy operations are finished.

Figure 36:
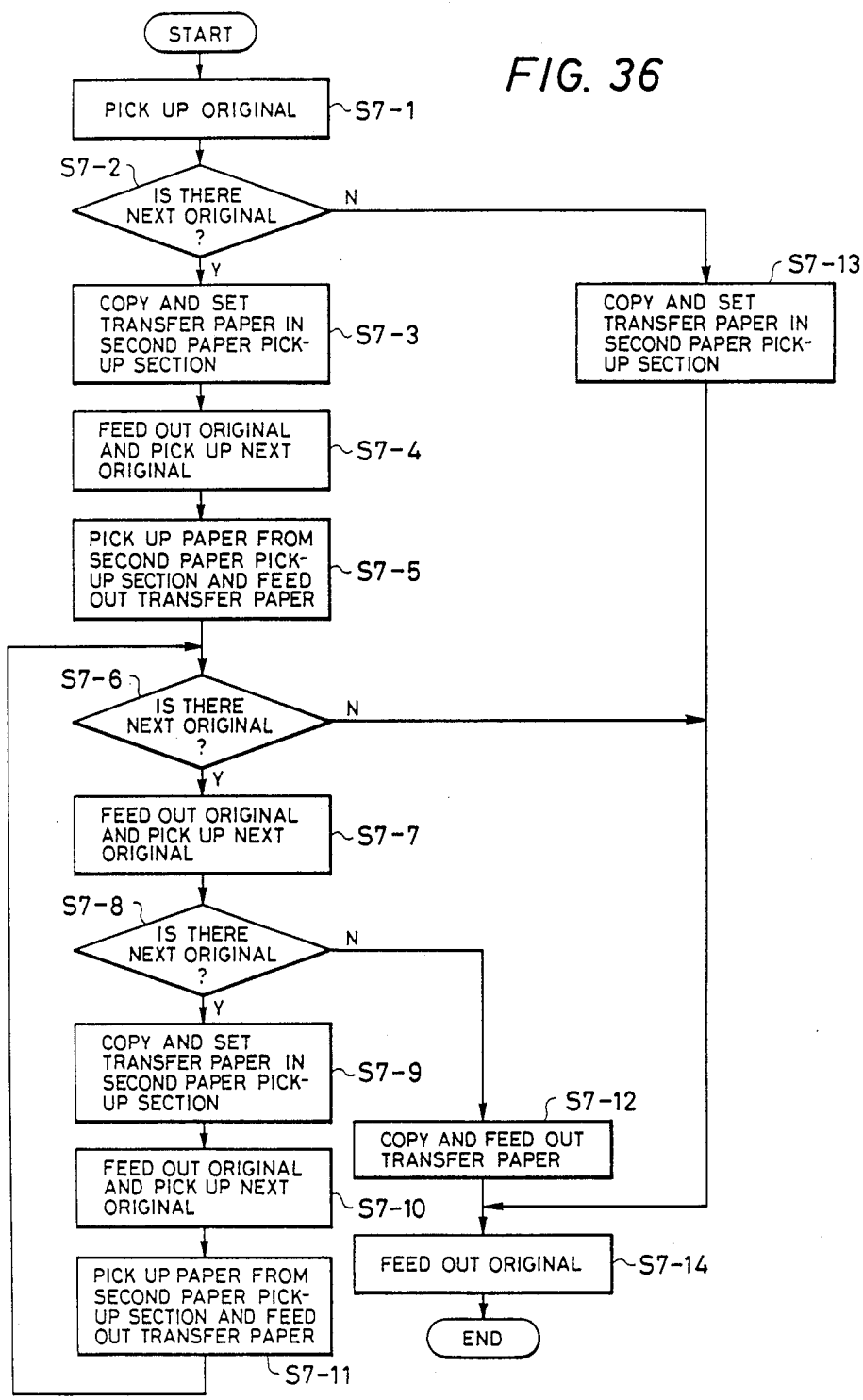
FIGS. 36 and 37 are diagrams showing the copying operation when the auto document feeder is used.

FIG. 36 is a flowchart for explaining that the copy operations differ in dependence on the number of originals set to the ADF in the two-sided or multi-copy mode.

The original is picked up (step 7-1) and set to a predetermined position. At this time, a check is made to see if one or a plurality of originals have been set by the original sensor 260-10 to detect the presence or absence of the original on the original tray 260-11 (step 7-2).

The case of one original will be first explained.

If NO in step 7-2, the number of set originals can be determined to be one. The operation to copy the first side is performed and thereafter the transfer paper is sent to the second paper pick-up section 23 (step 7-13). After completion of the exposure, the original is fed out (step 7-14). The transfer paper existing in the second paper pick-up section is picked up therefrom and the second side is copied by the next copy operation start instruction. In this manner, a series of copy operations are finished.

The case of a plurality of originals will now be explained.

If YES in step 7-2, the number of set originals can be decided to be a plurality of originals. The first side of the transfer paper is copied and then the transfer paper is sent to the second paper pick-up section 23 (step 7-3). After completion of the exposure, the original is fed out and the next original on the original tray 260-11 is picked up (step 7-4). The second side is copied and the transfer paper is fed out (step 7-5). A check is made to see if the next original exists on the original tray 260-11 or not (step 7-6). If no original exists, the original is fed out (step 7-14). In this way, a series of copy operations are completed.

If some originals exist on the original tray 260-11, the original is fed out and the next original is picked up (step 7-7). Further, a check is made to see if the next original exists on the original tray 260-11 or not (step 7-8). If YES, the first side is copied and the transfer paper is conveyed to the second paper pick-up section 23 (step 7-9). The original is fed out and the next original is picked up and the second side is copied. Then, the transfer paper is fed out. The processes are reexecuted from step 7-6.

If NO in step 7-8, after the first side was copied, the transfer paper is fed out (step 7-12). The original is fed out (step 7-14) and a series of copy operations are finished.

The difference in the copy operations depending on the number of originals set into the ADF has been described above. The following effects can be derived according to the processing routine in FIG. 36.

For example, when an original of an extremely large size such as a newspaper or the like which cannot be picked up by the ADF and an original which can be picked up by the ADF are combined and the two-sided/multi-copy is performed, if one sheet of original is set to the ADF, the ADF cannot be used hitherto to obtain the two-sided or multi-copy because the transfer paper is fed out.

Further, the two-sided copy cannot be obtained from a two-side original by use of the ADF because of the same reason as mentioned above.

On the other hand, in the case of obtaining the multi-copy or two-sided copy from two sheets of originals by also using the masking/trimming copy mode, areas cannot be simultaneously designated for two sheets of originals. Therefore, the originals must be set one by one. However, there is the large drawback such that a desired copy cannot be performed using the ADF due to the same reason as above. According to the invention, the foregoing drawbacks can be eliminated. In the case where a number of series of originals are set, especially, many originals of an odd number are set, the last copy is fed out. Therefore, the ADF can be efficiently used similarly to the conventional one.

Figure 37:
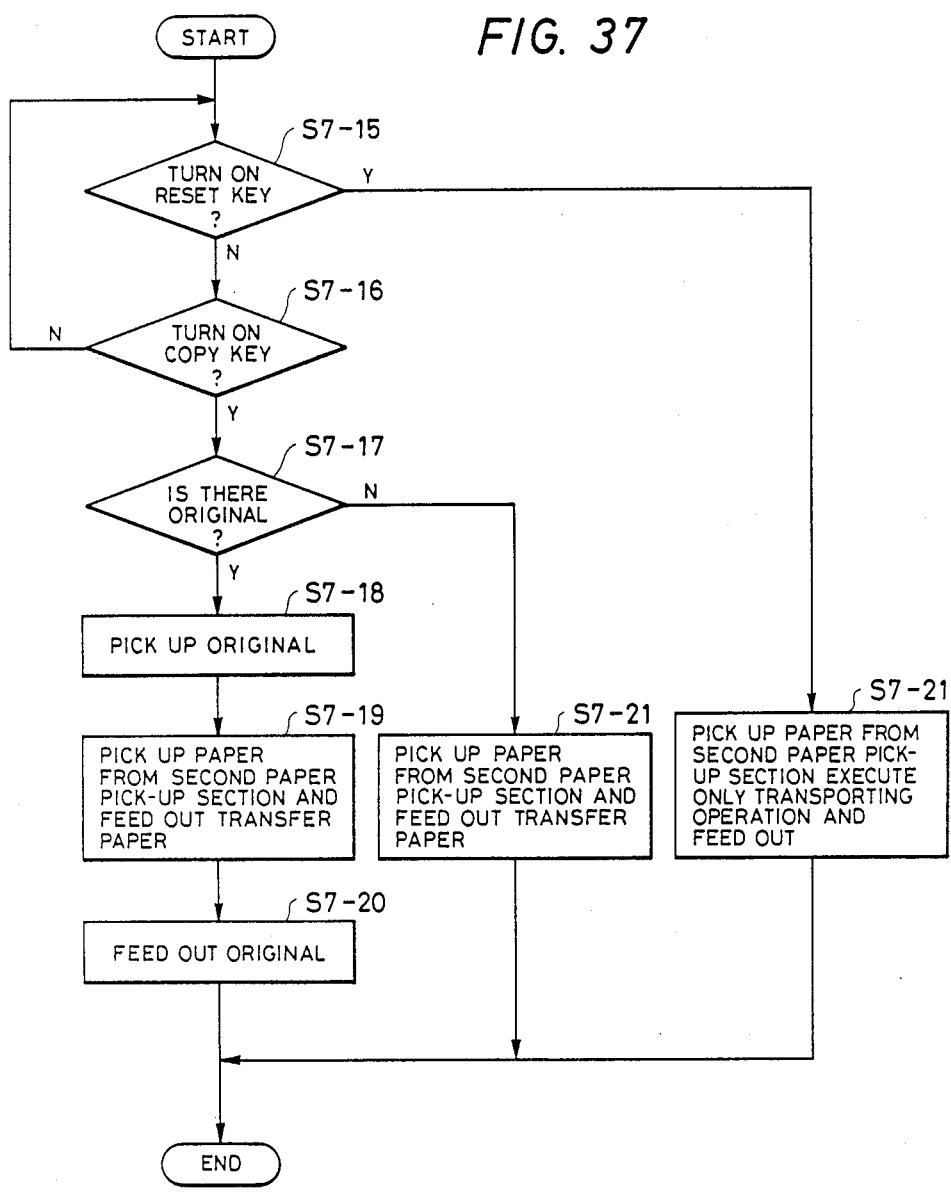

After completion of the processes in steps 7-13 and 7-14, the transfer paper exists in the second paper pick-up section 23. A flowchart for the subsequent processes is shown in FIG. 37.

When the reset key 119 is pressed (step 7-15), the transfer paper set in the second paper pick-up section 23 is conveyed by a paper path for the second side and fed out without performing the copy (step 7-21).

When the copy key 117 is pressed (step 7-16), if the original is left in the original tray 260-11 of the ADF (step 7-17), the original is picked up (step 7-18). The second side is copied and the transfer paper is fed out (step 7-19). The original is then fed out and a series of copy operations are completed (step 7-20).

If no original exists in step 7-17, it is determined that the original has manually been set onto the exposing surface, then the second side is copied and the transfer paper is fed out (step 7-20). A series of copy operations are completed.

(Description of the sequence)

The sequence will now be described with reference to FIGS. 38 to 62.

Figure 38:
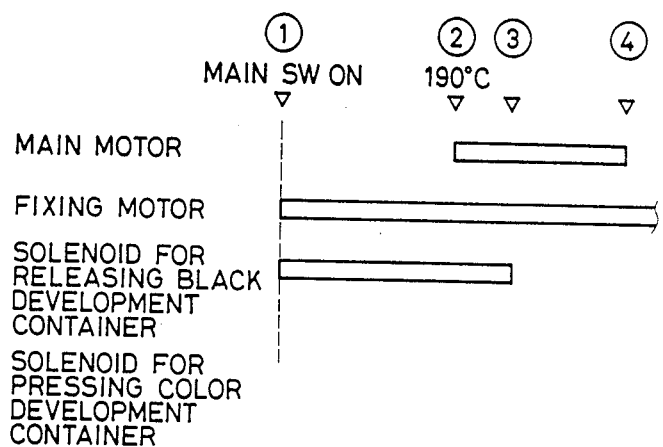
FIGS. 38 to 48, 50 to 52, 54, 55, 57 to 59, 61 and 62 are diagrams showing operation timings of respective sections of the apparatus.
Figure 39:
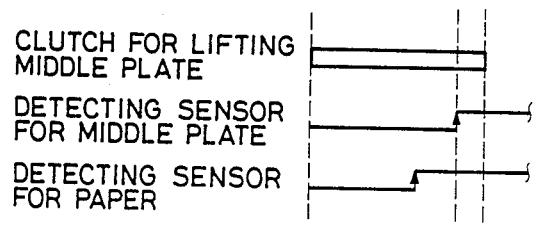
Figure 40:
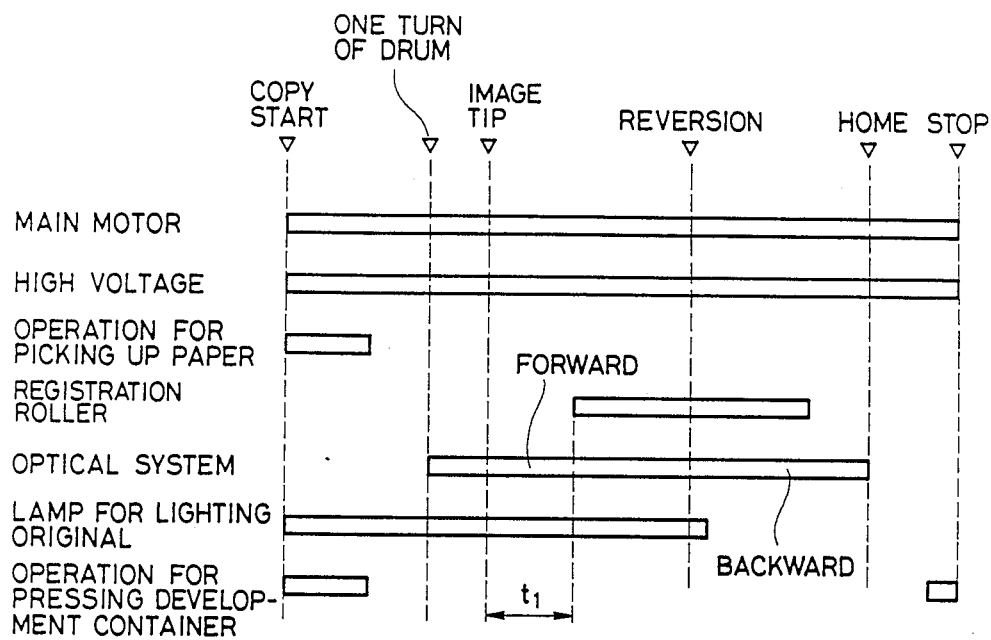

The operation when the power switch is turned on will be first explained. FIG. 38 is a time chart when the power switch is turned on. When a main switch SW is turned on, the fixing heater and black development container releasing solenoid 31 are made operative. When the temperature of fixing apparatus soon reaches 190°, the motor is rotated. After the elapse of one second (③), the solenoid 30 for pressing the color development container is made inoperative. Thus, the black development container once moves to the release position and thereafter approaches the drum. When the drum rotates once subsequently, the main motor is stopped. When the main motor starts rotating at point ②, if the middle plate of the cassette in the paper pick-up section is at the downward position, the middle plates of both upper and lower stages are lifted up. This situation is shown in FIG. 39. After the middle plates have been completely lifted up, the main motor is stopped (④).

FIG. 39 is a time chart for lifting up the middle plates. Both upper and lower stages are made operative at the same timing. When the clutch for lifting up the middle plates is turned on, the middle plates start elevating. The output of the middle plate detecting sensor soon becomes 1. After the elapse of 0.1 second from the output of 1, the clutch is turned off. On the other hand, the paper detecting sensor can detect the existence of the paper by lifting the middle plate. As shown in FIG. 39, if the paper exists, there is the positional relation such that the output of the paper detecting sensor becomes 1 before the output of the middle plate detecting sensor becomes 1. When the output of the middle plate detecting sensor becomes 1, the paper detecting sensor is checked. If the output of this sensor is 0, the no paper indicator is turned on. If no cassette is loaded, this operation is not executed.

The copy operation will now be described. When the copy key is pressed, the main motor, high voltage units, and original lighting lamp are made operative. The paper pick-up operation and development container pressing operation, which will be explained hereinafter, are executed. After the drum rotated once, the optical system moves forward and the edge of image is detected by the image tip sensor. After the elapse of the time $t_1$ from the detection of the image tip, the resist roller is turned on. Thereafter, the resist roller is turned off at the time in accordance with the paper size. Then, when the optical system comes to the position for reverse, the optical system moves backward. The original lighting lamp is turned off 0.2 second later. When the optical system is returned to the home position, the optical system is stopped, then the motor is rotated. After the transfer paper was fed out, the drives of the motor, high voltage units, and the like are stopped. In the case of the color copy mode, the development container pressing operation, which will be explained hereinafter is executed.

Figure 41:
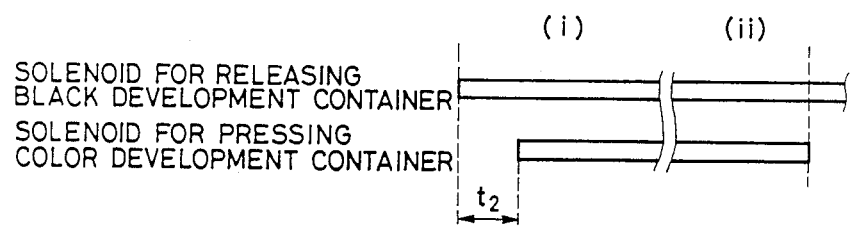

The development container pressing operation will now be described. FIG. 41 is a timing chart when the color copy was started in the state in which the black development container had been set. First, the solenoid 31 for releasing the black development container is turned on to remove the black development container from the drum. After this container was away from the drum, the solenoid 30 to press the color development container is turned on, thereby allowing the color development container to be come into contact with the drum. After completion of the copy, the color development container pressing solenoid is turned off to remove the color development container from the drum. At this time, the black development container is held away from the drum. In order to enable the color toner to be smoothly supplied, when the color copy is finished, the color development container pressing solenoid is always released (ii). In this state, both development containers are released. In addition, the black development container is held in contact with the drum after the black copy was finished.

Figure 42:
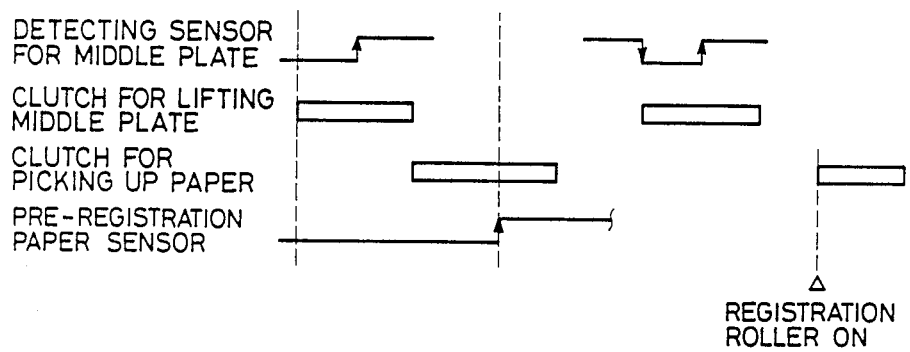

The paper pick-up operation will now be explained. FIG. 42 shows a timing chart. If the output of the middle plate detecting sensor is 0 when the copy operation is started, the middle plate lifting operation is performed similarly to the case described in conjunction with FIG. 39. The paper pick-up clutch is turned on after completion of the middle plate lifting operation and the transfer paper starts moving. Thereafter, when the transfer paper reaches the front paper sensor $S_7$ of resist, the output of this sensor becomes 1. After the elapse of a predetermined time, this clutch is turned off and the transfer paper abuts on the resist roller 12 and stops in the state in which a loop is formed. Subsequently, as the copy operation progresses, when the resist roller is ON, the paper pick-up clutch is again turned on for only a predetermined time, thereby reducing the load of the paper feed of the resist roller. On the other hand, the middle plate is then controlled asynchronously with the copy operation. When the output of the middle plate detecting sensor becomes 0, the middle plate lifting clutch is turned on. When the output of the middle plate detecting sensor becomes 1, the clutch is turned off 0.1 second later. The presence or absence of the cassette is always detected and the middle plate lifting operation is stopped immediately after it was detected that the cassette is ready to be come off.

The paper pick-up operation in the case of the hand-insertion copy will now be described. The hand-insertion tray lifting clutch is turned on simultaneously with the start of the copy, thereby starting pressing the hand-insertion tray upwardly. As the tray ascends, if the transfer paper has been set, the output of the paper detecting sensor becomes 1. After the expiration of a predetermined time from the detection of the output of 1, the paper pick-up clutch is turned on and the paper is sent into the copying apparatus. After the elapse of time $t_5$ until the transfer paper is sandwiched by the next roller, the hand-insertion tray lifting clutch is turned off. In association with the turn-off of the clutch, the hand-insertion tray descends, so that the output of the paper detecting sensor becomes 0. On the other hand, the transfer paper is sent to the position of the front paper sensor $S_7$ of resist and the output of this sensor becomes 1. After the elapse of a predetermined time from the output of 1, the paper pick-up clutch is turned off and the transfer paper abuts on the resist roller, so that a loop is formed and then the paper stops.

Figure 43:
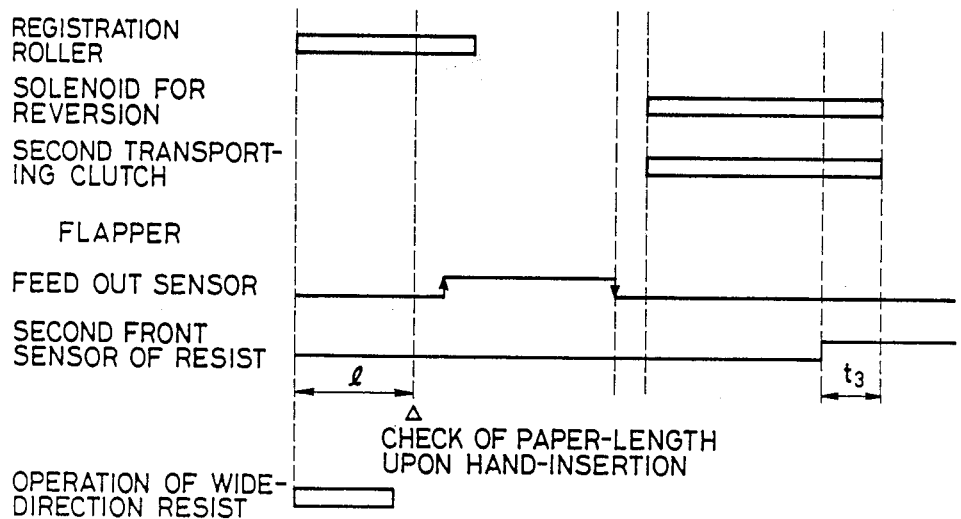

The copy of the first side of the single two-sided copy will now be described. The operation of the high voltage units, lamp, optical system, paper pick-up devices, and the like are similar to those mentioned above. Therefore, the movement of the transfer paper after the resist roller 12 was turned on will be explained. FIG. 43 is a timing chart for explaining the movement of the transfer paper. The transfer paper is sent to the fixing apparatus by turning on the resist roller. Thereafter, when the transfer paper passes through the feed-out sensor $S_4$, the output of the feed-out sensor changes from 0 to 1 to 0. At this time, resist means in the wide direction, which will be explained hereinafter, is moved to the home position. After the elapse of a predetermined time, namely, when the portion of about 10 mm from the rear edge of the transfer paper is sandwiched by the feedout roller 27, the backward solenoid is turned on, thereby moving the transfer paper backward. At this time, the second transporting clutch is also turned on. The transfer paper is sent to the second paper pick-up section 23 and the output of the second front sensor $S_5$ of resist becomes 1. After the elapse of a predetermined time, the second transporting clutch is turned off. The transfer paper abuts on the second resist roller 37 and forms a loop of about 15 mm and stops. At this time, the backward solenoid is also turned off. The second paper pick-up section 23 can pick up only the transfer paper of a length longer than about 180 mm. In the case of the hand-insertion copy of the transfer paper whose size is unknown, the output of the front paper sensor $S_7$ of resist is discriminated after the elapse of the paper transportation time corresponding to the distance of $1=180$ mm$-24$ mm (24 mm is the distance between the sensor $S_7$ and the resist roller 12) from the turn-on of the resist roller 12. If the absence of paper has been decided, this means that the size of transfer paper is smaller than 180 mm. Therefore, the transfer paper is not moved backward but fed out thereafter. On the contrary, if the existence of paper has been determined, this means that the size of transfer paper is larger than 180 mm. Therefore, a predetermined operation is executed.

Figure 44:
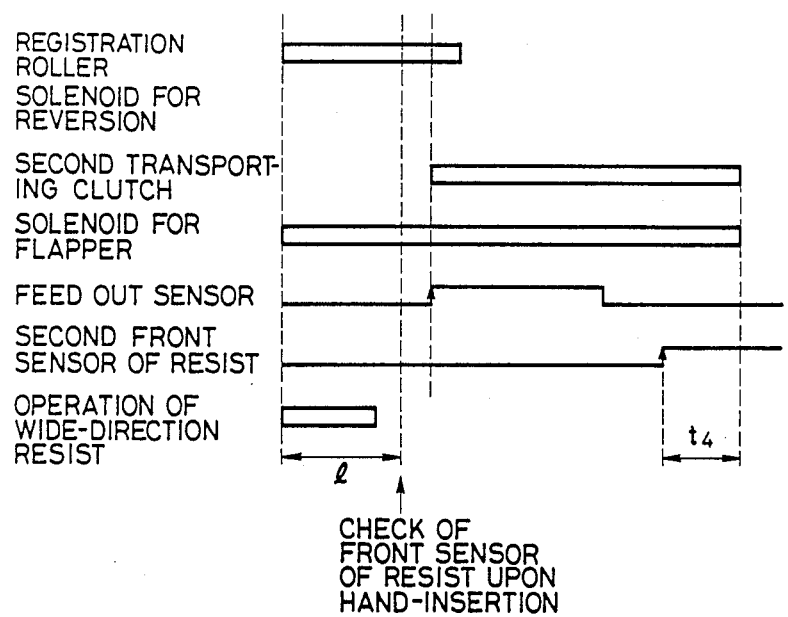
Figure 45:
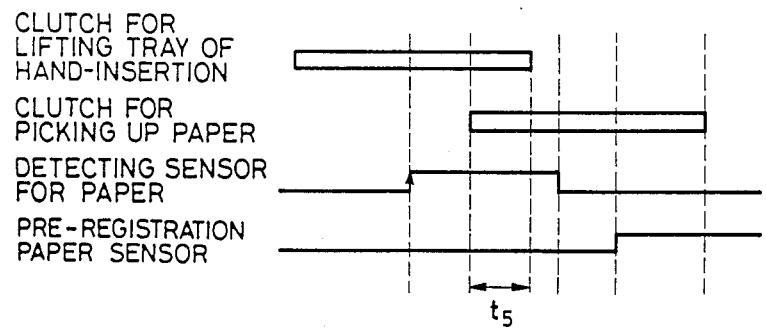

The operation concerned with the first side in the single multi-copy mode will now be described. The movement of the transfer paper after the resist roller was turned on will be explained. FIG. 44 is a timing chart for explaining the movement of the transfer paper. The resist roller 12 and flapper solenoid 29 are turned on and the wide-direction resist means (second resist roller 37), which will be explained hereinafter, is moved to the home position. After the transfer paper moved by only the distance l, the output of the front sensor of resist is checked in the case of the hand-insertion copy mode similarly to the foregoing two-sided copy modes.

If no paper is detected, the flapper solenoid 29 is turned on to feed out the transfer paper. When the transfer paper advances and the output of the feed-out sensor $S_4$ becomes 1, the second transporting clutch is turned on. After the transfer paper was conveyed to the second paper pick-up section 23 and the output of the second front sensor $S_5$ of resist became 1, the second transporting clutch is turned off a predetermined time $t_4$ later. The transfer paper abuts on the second resist roller 37 and forms a loop and stops. Since the curled state and direction of the transfer paper differ from those in the case of the two-sided copy mentioned above, the time $t_4$ after the output of the sensor $S_5$ became 1 until the transfer paper stops is set to a different value in this case.

Figure 46:
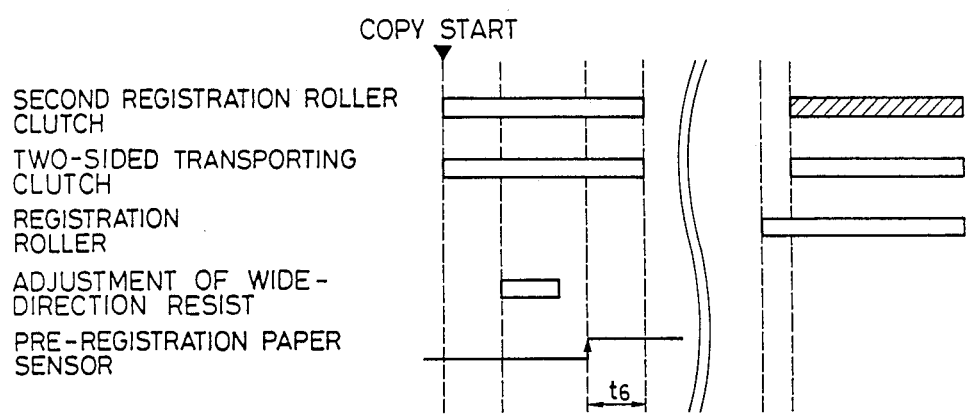
Figure 47:
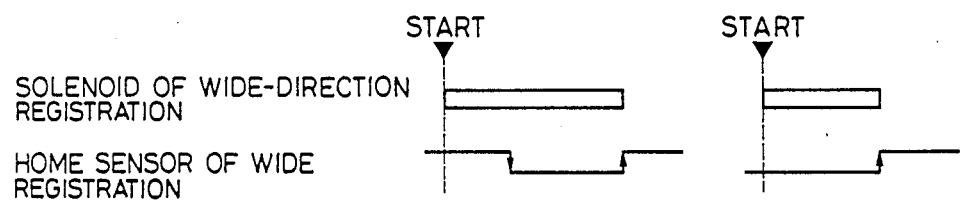

The copy operation of the second side in the single two-sided/multi-copy mode will now be described with reference to FIG. 46. The transfer paper is now set in the second paper pick-up section and is in the state in which it has already abutted on the second resist roller 37 and formed a loop and stopped. When the copy is started in this state, the second resist roller clutch and two-sided transporting clutch are turned on, so that the transfer paper starts moving toward the first resist roller 12. After 0.1 second, the portion of 17 mm from the edge of the transfer paper is sandwiched by the second resist roller. In this state, a wide direction resist adjusting operation, which will be explained hereinafter, is started. The output of the front paper sensor $S_7$ of the first resist becomes 1. After the elapse of a time $T_b$ thereafter, the second resist roller clutch and two-sided transporting clutch are turned off. The transfer paper abuts on the first resist roller 12 and forms a loop and stops. Thereafter, the optical system starts forward and the timing to turn on the resist roller 12 comes. After the transfer paper was sent by about 5 mm, the second resist roller clutch and two-sided transporting clutch are turned on in the case of the two-sided copy. The transfer paper progresses in the state in which the loop was reduced by 5 mm. On the other hand, in the case of the multi-copy, only the two-sided transporting clutch is turned on and the transfer paper is pulled by the resist roller 12 and the second resist roller 37 becomes a load, so that the transfer paper is conveyed in the state in which the loop amount is 0. Subsequently, the transfer paper passes through the fixing roller and is fed out. In this way, the copy is finished. The time $t_b$ which determines the loop amount before the resist roller is set to a value different from that in the case of picking up the transfer paper from the cassette because the conditions such as warp of transfer paper and the like differ.

The operation to set the second resist roller to the home position in the wide direction will now be described. The second resist roller 37 transfers the drive force of the main motor through a spring clutch and turns on the resist solenoid in the wide direction, so that the second resist roller can reciprocate in the wide direction. A wide resist home sensor to detect the position of the second resist roller and a wide resist paper sensor to detect the transfer paper disposed between the second resist roller and the wide resist home sensor are arranged. Although the second resist roller 37 can move bilaterally in the axial direction of the drum, it is certainly stopped for every movement in a single direction in order to improve the stop accuracy. Namely, as shown in a timing chart in FIG. 47, when the output of the wide resist home sensor is 1 at first, the second resist roller 37 is stopped when this output changes from 1 to 0 to 1. If the output of this sensor is 0 at first, the second resist roller is stopped when the output changes from 0 to 1.

Figure 48:
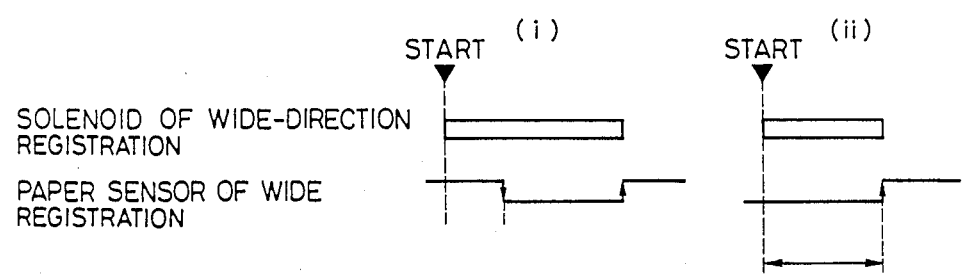
Figure 49:
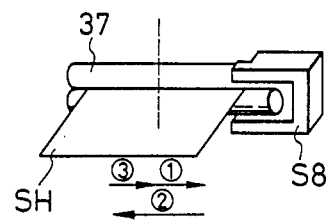
FIG. 49 is a schematic diagram showing a second paper pick-up section.

The resist adjusting operation in the wide direction will now be explained. In FIG. 49, reference numeral 37 denotes the second resist roller, $S_8$ is the wide resist paper sensor, and SH is the transfer paper. When the second resist roller 37 is set to the home position, it stops at the central point of the operating range. By turning on the resist solenoid in the wide direction, the second resist roller reciprocates as shown in arrows ①→②→③→① in the diagram. When the transfer paper is sandwiched in the state in which the second resist roller 37 stops at the home position, at first, there are the cases where the wide resist paper sensor $S_8$ detects the paper and where it doesn't detect the paper in depending on the position of the transfer paper which was inserted. The case where the paper is detected will be first explained. As shown in FIG. 48, (i), the transfer paper is stopped when the output of the wide resist paper sensor changes from 1 to 0 to 1. If the transfer paper was inserted extremely one-sidedly on the side of the wide resist paper sensor, there is a fear such that the output of the wide resist paper sensor always becomes 1. Even in this case, the following processes are executed to stop the transfer paper at the proper position as accurately as possible. Namely, as shown in FIG. 49, when the transfer paper moves as indicated by the arrows ① and ② as shown in the diagram, the transfer paper is most ready to be removed. At this time, if the output of the wide resist paper sensor $S_8$ is 1, the transfer paper will move in the direction of the arrow ③ from that position, so that the output of this sensor will not become 0. Therefore, the position at which the transfer paper is stopped at that time becomes the optimum position. Namely, assuming that the time of one period of the movement in the wide direction of the second resist roller 37 is T, if the output of the sensor $S_8$ does not become 0 even if the transfer paper is moved by the time of $(\frac{1}{2})T$, i.e., the time corresponding to the arrows ① and ②, the transfer paper is stopped at this time.

The case where the output of the wide resist paper sensor $S_8$ is 0 at first will now be explained. In this case, as shown in FIG. 48, (ii), the transfer paper is stopped when the output of the sensor $S_8$ changes from 0 to 1. If the transfer paper was conveyed so as to be extremely away from the sensor $S_8$, the output of the sensor $S_8$ will become 0. Even in this case, to stop the transfer paper at the proper position as accurately as possible, if the output of the sensor $S_8$ does not become 1 when the transfer paper is moved by only the time of $(\frac{1}{4})T$ corresponding to the arrow ① in FIG. 49, the transfer paper is stopped at that time.

Figure 50:
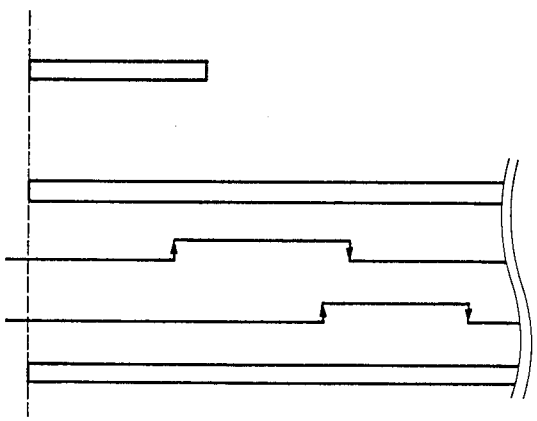

The operation of the first side of the two-sided copy in the case of using the middle tray will be explained. The operation of the paper pick-up devices, high voltage units, and optical system after the start of the copy are similar to those mentioned above; therefore, the movement of the transfer paper when the first resist roller 12 is turned on will be explained. FIG. 50 is a timing chart. The flapper solenoid (not shown) to drive the flapper 29 and a middle tray flapper 49 are turned on simultaneously with the turn-on of the resist roller. The transfer paper sent from the first resist roller 12 passes through the fixing roller 26 and is directly conveyed to the middle tray 40. The number of transfer papers stacked in the middle tray can be detected by the entrance sensor $S_{19}$ of the middle tray. After the number of stacked transfer papers was detected, the operation is stopped.

Figure 51:
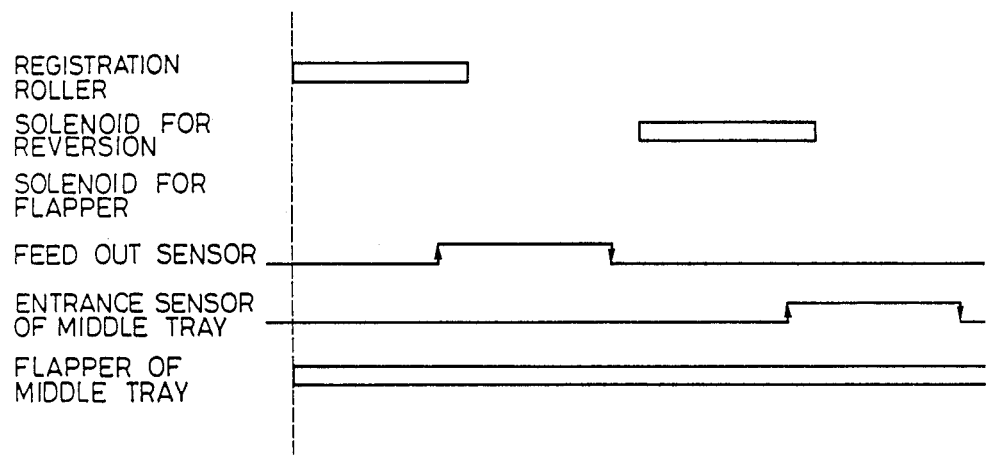

The operation of the first side in the multicopy mode in the case of using the middle tray will now be described. FIG. 51 is a time chart for this operation. The middle tray flapper 49 is turned on simultaneously with the turning-on of the first resist roller, thereby forming the paper path to convey the transfer paper to the middle tray. The transfer paper is sent by the resist roller. When the paper passes through the feed-out sensor $S_4$, the solenoid for reverse is turned on. The transfer paper is moved backward similarly to the foregoing case of the single two-sided copy mode and transported and stacked into the middle tray 40. At this time, the number of stacked transfer papers is counted by the entrance sensor $S_{19}$. After the number of stacked papers was detected, the operation is stopped.

Figure 52:
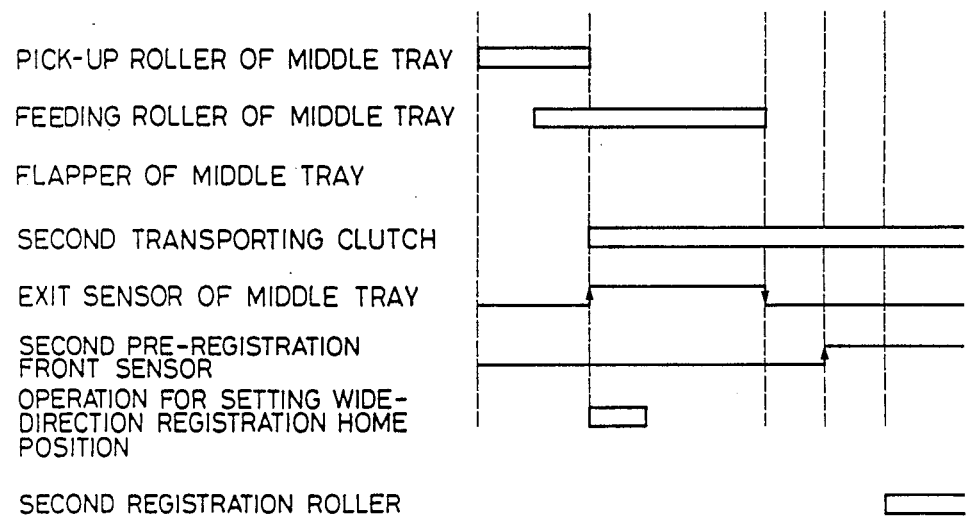

The operation of the second side in the multi/two-sided copy mode using the middle tray will be explained. The transfer papers have already been stacked in the middle tray. The transfer papers are picked up therefrom and conveyed to the second paper pick-up section 23. This situation is shown in FIG. 52. First, when the middle tray feeding roller solenoid (not shown) is turned on, the pick-up roller 56 descends by the drive means (not shown) and the top transfer paper abuts on a feeding roller 57. Thereafter, the middle tray feeding roller solenoid is turned on, so that the transfer paper is sent to the transporting path 59 by the middle tray feeding roller 57. When the tip of the transfer paper reaches the exit sensor $S_{21}$ of the middle tray, the middle tray feeding roller solenoid is turned off. Thus, the pick-up roller 56 ascends and removes from the transfer paper. At this time, the second transporting clutch (not shown) is turned on and the foregoing operation to set the second resist roller 37 to the home position is started. The transfer paper soon reaches the second front sensor $S_5$ of resist. After the elapse of a predetermined time thereafter, the transfer paper abuts on the second resist roller 37 and forms a loop. Then, the second resist roller 37 is turned on and the transfer paper is conveyed to the first resist roller 12. The subsequent operations are similar to those of the second side in the single multi/two-sided copy mode as previously explained.

Figure 53:
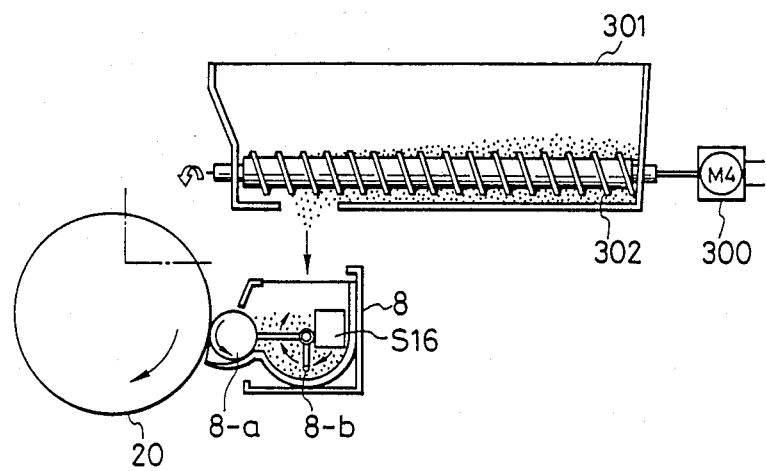
FIG. 53 is a diagram showing a constitution of a development container.

The operation to supply the toner into the black development container 8 from the hopper will be explained. In FIG. 53, reference numeral 301 denotes a hopper and 302 is a screw to stir the toner in the hopper 301 and to feed the toner into the black development container 8. The screw 302 is rotated by a hopper motor 300. The toner sensor $S_{16}$ to detect the presence or absence of the toner, a stirring rod 8-b to stir the toner, and a development sleeve 8-a are arranged in the black development container 8. The stirring rod 8-b is driven by the main motor 18 at a period of four seconds. When the toner sensor $S_{16}$ detects the absence of the toner, the hopper motor 300 is rotated to supply the toner. When the toner sensor $S_{16}$ does not detect the existence of the toner even if the hopper motor 300 is driven for a desired time, the absence of the toner in the hopper portion is determined. Thus, a sign for no toner is displayed and warns to the user. The control in this case will be described in detail.

Figure 54:
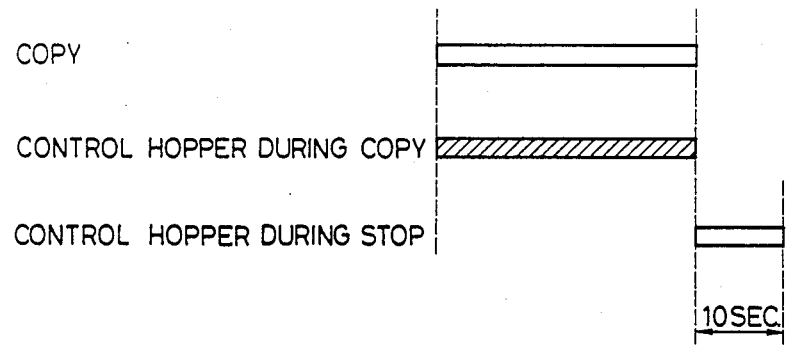

The operation during the copy operation and the control method when the copy is stopped differ. As shown in FIG. 54, when the copy is stopped, if the absence of the toner is detected at this time, the hopper motor 300 is rotated for ten seconds. On the contrary, if the existence of the toner is detected, nothing is performed.

Figure 55:
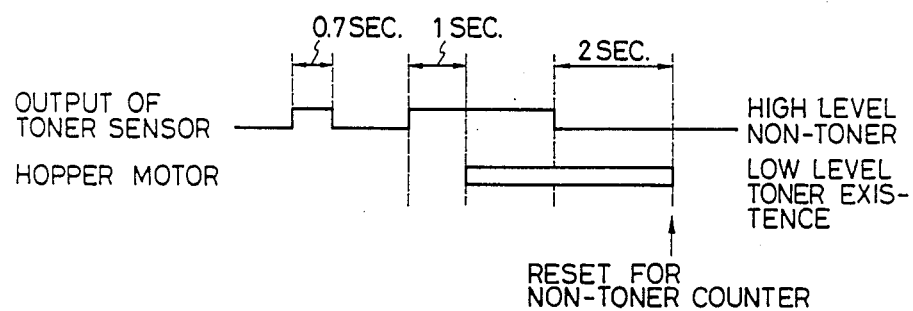

The control of the hopper motor 300 during the copy operation will now be described. There is the case where, for example, in spite of the fact that the toner does not exist substantially, the stirring rod 8-b comes into contact with the toner sensor $S_{16}$ due to the rotation of the stirring rod 8-b, so that the toner sensor outputs the signal indicative of the existence of the toner. This detection time is up to one second. On the contrary, there is also the opposite case where in spite of the fact that the toner still remains, the toner near the toner sensor $S_{16}$ is removed by the stirring rod, so that the toner sensor outputs the signal indicative of the absence of the toner. The detection time when the absence of the toner is detected is up to two seconds. Therefore, when the no toner signal continues for one or more seconds as shown in FIG. 55, the hopper motor 300 is driven and if the toner existence signal continues for two or more seconds, it is determined that the toner exists in the development container. Thus, the hopper motor 300 is stopped and a hopper no toner timer, which will be explained hereinafter, is reset. On the other hand, when the toner does not exist in the hopper, even if the hopper motor 300 is rotated for a desired time, the toner sensor $S_{16}$ will never output the signal indicative of the existence of the toner. In this manner, the absence of the toner in the hopper is detected. The time of the rotation of the hopper motor 300 is measured by a timer to detect the absence of the toner in the hopper. If the total time of the rotation time becomes 18 seconds, it is decided that no toner exists in the hopper 301 and the sign for no toner is displayed. This timer is reset when the power switch is turned on and when the existence of the toner is detected during the copy operation as mentioned above.

Figure 56:
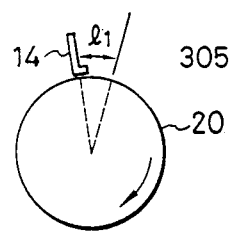
FIG. 56 is diagrams showing LED arrays and an exposing position.
Figure 57:
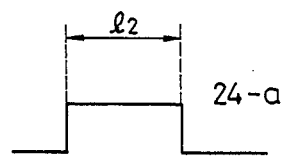
Figure 58:
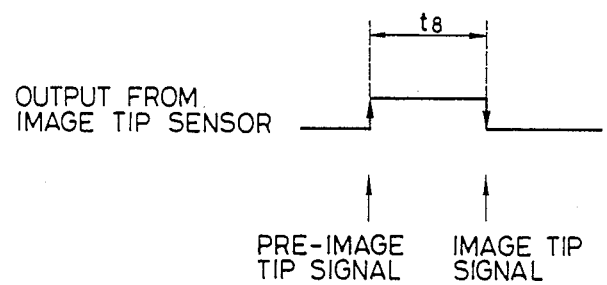

The operation of the LED array 14 for blank exposure will be explained. It is prevented by the LED array 14 that the toner is deposited onto the unnecessary portion of the drum 20. Further, the LED array 14 is also used to form a blank portion of about 2 mm at the edge of the transfer paper and to erase the image in or out of the designated area (i.e., for the masking or trimming process) in the area designation mode. The control timing is derived from the signal of the image tip sensor $S_2$ to detect the position of the optical system 4. A shielding plate 24-a (FIG. 57) is attached to the optical system 4. When the shielding plate 24-a shields the image tip sensor $S_2$, a signal is output. A length of shielding plate 24-a is $l_2$. As the optical system moves forward, a signal is output as shown in FIG. 58. In FIG. 58, the leading edge of the output of the image tip sensor assumes the pre-image tip signal and the trailing edge assumes the image tip signal. The edge of the original is just exposed in response to the image tip signal. Assuming that the speed of the optical system is $V_k$, the time $t_8$ equals $l_2/V_k$. On the other hand, as shown in FIG. 56, the relation between the blank LED array 14 and an optical axis 305 of the reflected light from the original is such that the blank LED array 14 is located upstream by only $l_1$. Therefore, the blank exposure needs to be controlled earlier by only $l_1/V_p$ in correspondence to the original when it is assumed that the processing speed is $V_p$.

Figure 59:
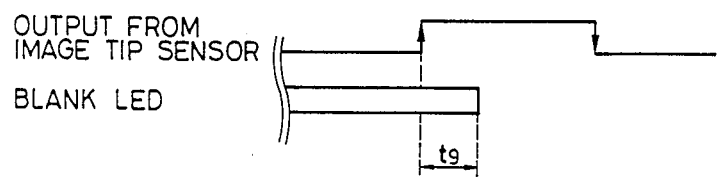

First, the control to form the blank of 2 mm at the leading edge will be explained. As shown in FIG. 59, the optical system is scanned and after the expiration of a time $t_9$ from the pre-image tip signal, the blank LED array 14 is turned off. The time $t_9 = l_2 + 2/V_k = l_1/V_p - \alpha/V_p$. $\alpha$ is the width of ½ of the irradiation width of the blank LED array 14. Thus, the proper leading edge blank according to each magnification can be derived. In the case of the reduction copy mode in which the speed $V_k$ of the optical system is large, the value of $l_2$ is also set such that $t_9$ doesn't become a negative value. Since $\alpha$ is not a constant value due to variations in light amount and the like of the LED array, it can be adjusted from the operation section as will be explained hereinafter.

Figure 60:
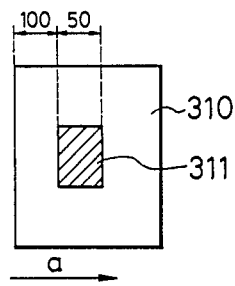
FIG. 60 is a diagram for explaining timings for the blank exposure.
Figure 61:
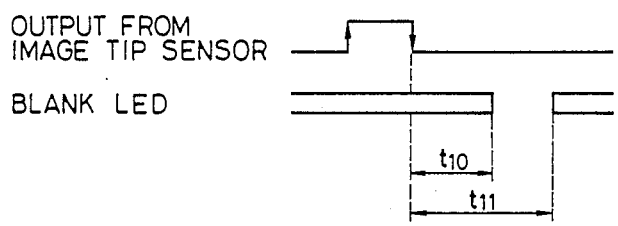
Figure 62:
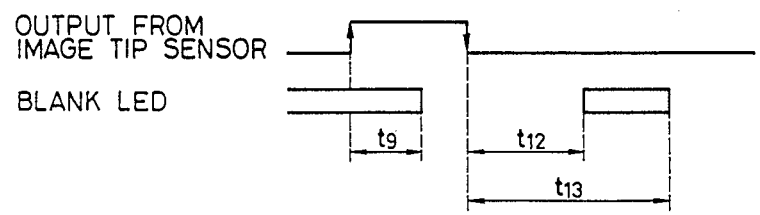

The area designation mode will now be considered. In FIG. 60, the optical system 4 scans an original 310 in the direction indicated by an arrow a. Numeral 311 denotes a trimming area. For example, the range in the direction of the arrow a of the trimming area 311 is set to 100 to 150 mm. In such a case, as shown in FIG. 61, the blank LED array 14 is turned off after a time $t_{10}$ from the image tip signal. By turning on the blank LED array 14 after a time $t_{11}$ from the turn-off of the LED array 14, the image in the designated area 311 can be output as shown in FIG. 60. Now, assuming that $t_{10}$ and $t_{11}$ are $$t_{10} = \frac{100 \times \text{copy magnification}}{V_p} - \frac{\alpha}{V_p}$$

$$t_{11} = \frac{150 \times \text{copy magnification}}{V_p} + \frac{\alpha}{V_p}$$

a desired area can be blank exposed. On the other hand, when the trimming area is set into another area different from the area 311 in FIG. 60, the blank LED array 14 is turned off after the time $t_9$ from the pre-image tip signal as shown in FIG. 62. The leading edge blank is formed. The blank LED array 14 is turned on after the elapse of time $t_{12}$ from the image tip signal. The blank LED array 14 is turned off after a time $t_{13}$ from the turn-on of the blank LED array 14. $t_{12}$ and $t_{13}$ are as follows.

$$t_{12} = \frac{100 \times \text{copy magnification}}{V_p} - \frac{\alpha}{V_p}$$

$$t_{13} = \frac{150 \times \text{copy magnification}}{V_p} + \frac{\alpha}{V_p}$$

As described above, in the case of the trimming in the designated area (i.e., white→image), $\alpha/V_p$ is subtracted. In the case of the trimming out of the designated area (i.e., image→white), $\alpha/V_p$ is added. Thus, the accurate trimming can be performed. As mentioned above, in the case of performing the area designation copy in different colors at once, the areas are respectively narrowed and copied in order to prevent the mixture of the color toner and black toner. For example, in the case of copying the area 311 in black and the other portion in red in FIG. 60, if the area 311 is first copied in black, the copy operation is controlled as shown in FIG. 61. However, the value of $t_{10}$ is increased by 1 mm than the foregoing value and the value of $t_{11}$ is reduced by 1 mm than the foregoing value. Next, in the case of copying in color, the blank LED array 14 is controlled as shown in FIG. 62. In this case, however, the value of $t_{12}$ is reduced by 1 mm less than the foregoing value and the value of $t_{13}$ is increased by 1 mm more than the foregoing value. Thus, the blank area of 2 mm is formed in the black and color areas. Thus, even if the resist is slightly deviated, the mixture of colors due to the overlap of the black and color areas is prevented.

(Description of the mode setting)

Figure 63:
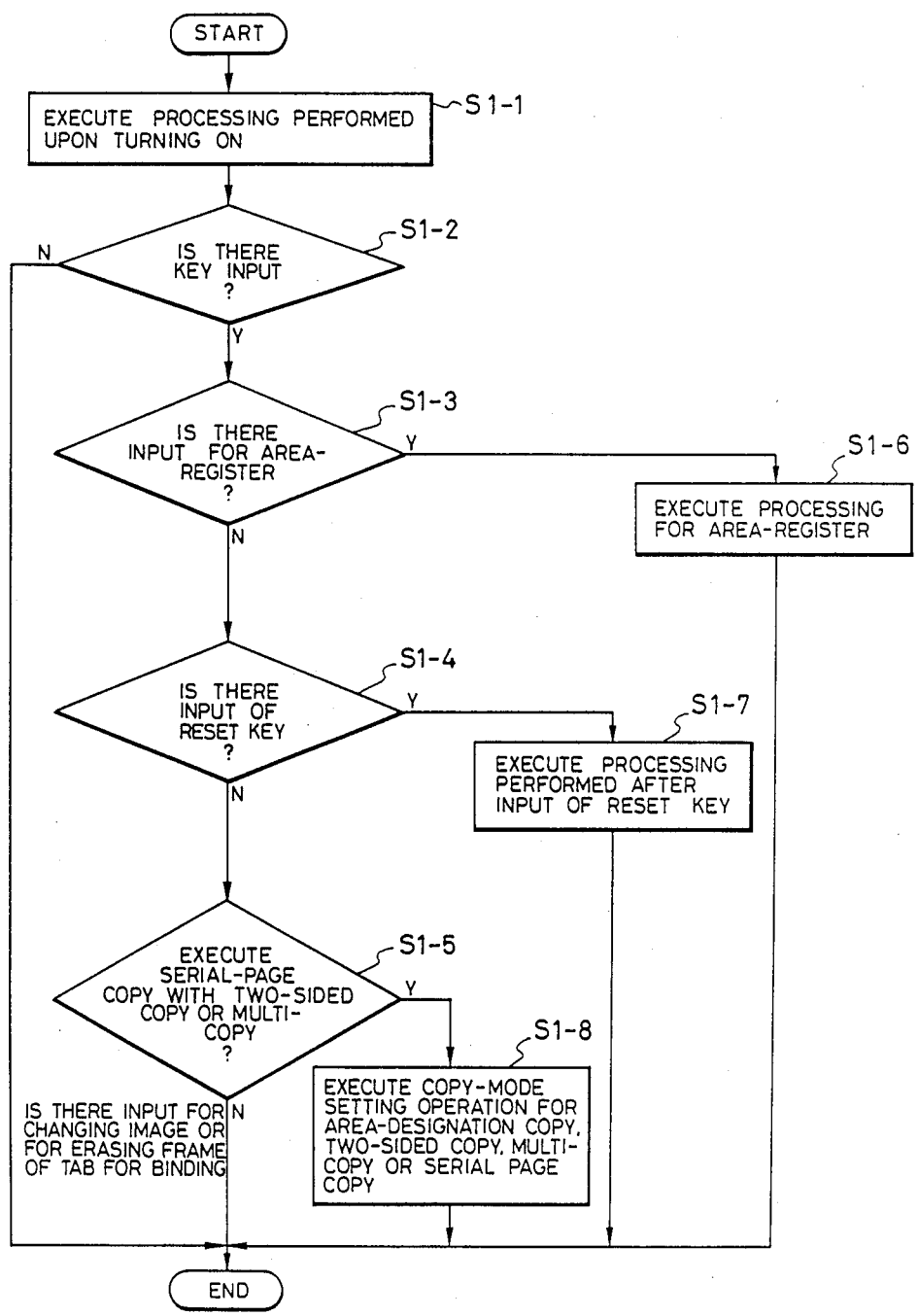
FIGS. 63 to 67 are flowcharts showing input processes in the copy mode upon initialization.

FIG. 63 is a flowchart with respect to the processes (for automatically clearing) after the elapse of a constant time after the reset key 119 was pressed in the copy mode when the power switch is turned on or after the end of copying, and the processes in the two-sided-multi-serial-page modes and for inputting the area designation mode.

Figure 64:
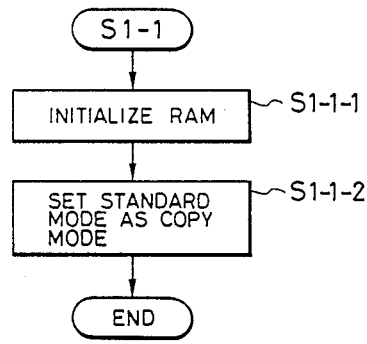

FIG. 64 is a flowchart showing the details of step 1-1. The content in this step will be explained. Since a battery is connected to the RAM 90, the content of the RAM is held even after the power source is shut off. Therefore, when the power switch is turned on, the necessary data of the content in the RAM must be held and the unnecessary data must be erased (step 1-1-1). The copy mode is set into the standard mode (step 1-1-2). This standard mode is the same as the standard mode which is set when the reset key 119 is pressed. In the standard mode, for example, the set number of copy sheets is 1, the direct copy (i.e., equal magnification), black development container, lower cassette, and the like are selected.

Next, a check is made to see if the data has been input from the key in the operation section 100 or not (step 1-2). A check is made to see if the key input data is concerned with the area registration or not (step 1-3). If YES, the process in step 1-6 is executed as will be explained hereinafter. If the data has been input by the reset key 119 (step 1-4), the process in step 1-7 is executed as will be explained hereinafter. In the case of the input of the two-sided key 107, serial-page key 106, multi-key 105, image changing key 103, or key 108 for forming a binding margin or erasing the frame of tab for binding, the process in step 1-8 is performed as will be explained hereinafter.

Figure 65:
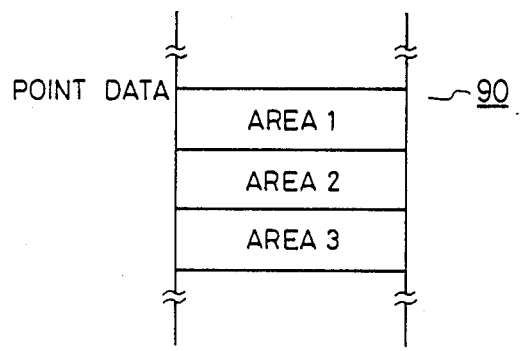

Step 1-6 will be explained. Areas 1, 2, and 3 are registered by a setting method, which will be explained hereinafter. In this case, the contents of areas 1 to 3 are stored into predetermined areas in the RAM 90 shown in FIG. 65.

Figure 66:
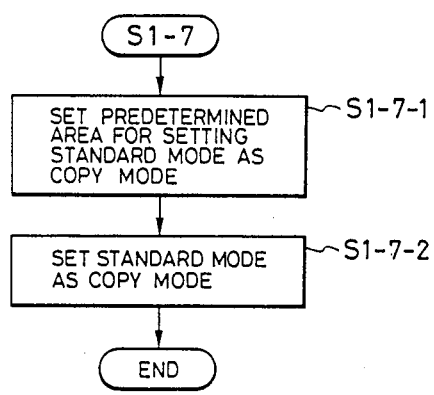

FIG. 66 is a flowchart showing the details of step 1-7. The content of this step will be described. To set the copy mode into the standard mode, the content of a predetermined area in the RAM 90 is set (step 1-7-1). The copy mode is returned to the standard mode (step 1-7-2).

Although the registration of areas 1 to 3 is released when the copy mode is set into the standard mode, the data in the RAM registered in the area in step 1-6 is not cleared. This causes the inconvenience such that when the reset key 119 is erroneously pressed by the user or the like, the areas must be registered again. To prevent this, the content of the RAM registered in the area is not cleared. The data registered in the area is not changed until the registration of the area is corrected.

Figure 67:
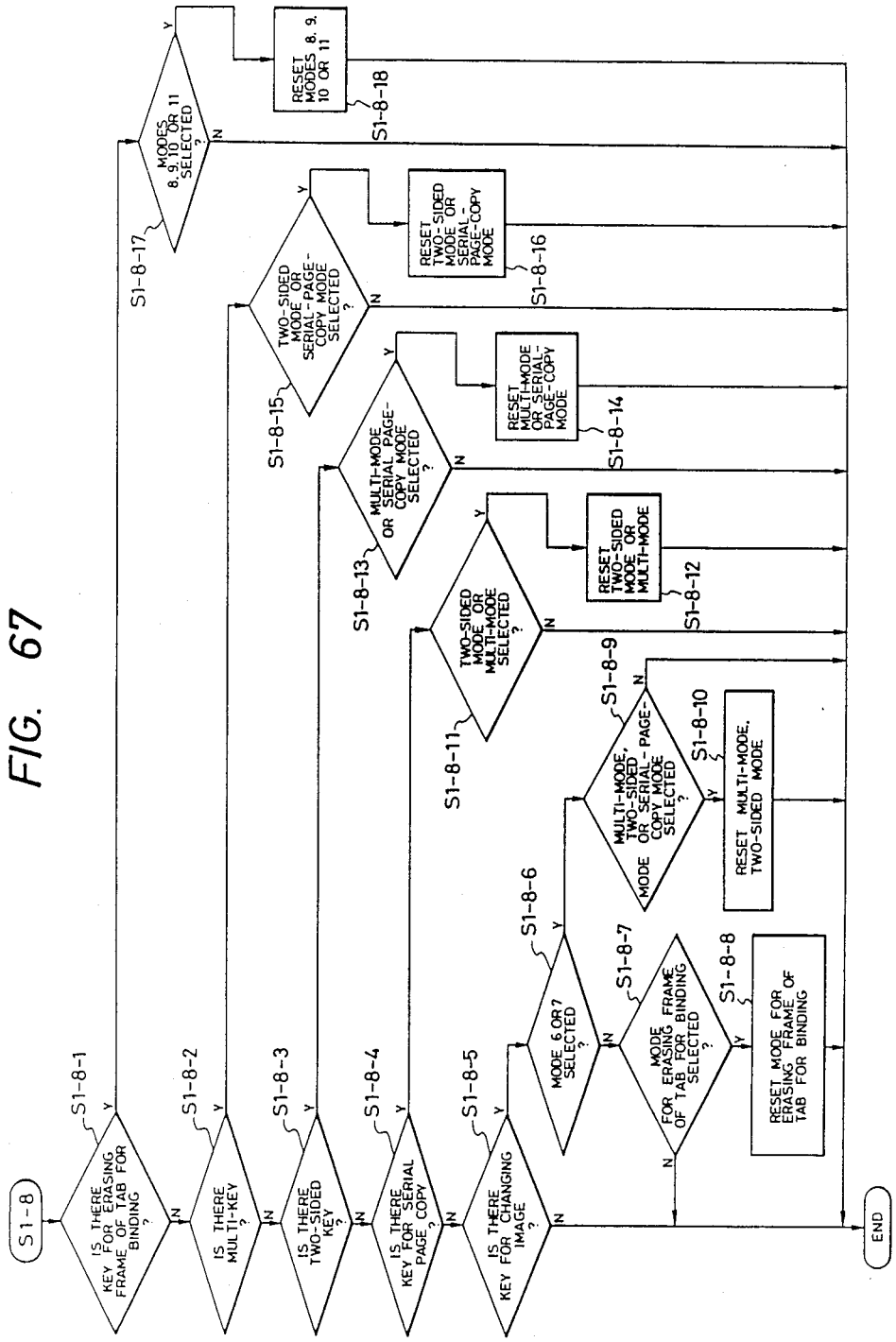

FIG. 67 is a flowchart showing the details of step 1-8. The content of this step will be explained.

When the key to erase the frame was input (step 1-8-1), if either one of the copy MODEs 8 to 11 has been selected (step 1-8-17), this copy mode is released (step 1-8-18).

When the multi-key was input (step 1-8-2), if the two-sided copy mode or serial-page copy mode has been selected (step 1-8-15), this copy mode is released (step 1-8-16).

When the two-sided key was input (step 1-8-3), if the multi-copy mode or serial-page copy mode has been selected (step 1-8-13), this copy mode is released (step 1-8-14).

When the serial-page key was input (step 1-8-4), if the two-sided copy mode or multi-copy mode has been selected (step 1-8-11), this copy mode is released (step 1-8-12).

When the image changing key was input (step 1-8-5), if the copy MODE 6 or 7 has been selected (step 1-8-6), and if the multi-copy mode or two-sided copy mode or serial-page copy mode has been selected (step 1-8-9), this copy mode is released (step 1-8-10).

When the image changing key was input (step 1-8-5), if the code MODEs 6 and 7 are not selected (i.e., if either one of the copy MODEs 8 to 11 has been selected) (step 1-8-6), and if the mode for forming the binding margin or the mode for erasing the frame has been selected (step 1-8-7), this copy mode is released (step 1-8-8).

The interlock (i.e., when a certain mode is selected, the mode which has been selected so far is released) of the copy mode has been described above. However, it is possible to combine the copy modes which are not concerned with the interlock. For example, the two-sided copy mode can be combined with the area designation mode of either one of the copy MODEs 8 to 11. The multi-copy mode can be combined with either one of the copy MODEs 8 to 11. Due to this, the image can be output in the copy modes such as color mode, multi-copy mode or two-sided copy mode, and masking or trimming mode, and the like.

(Description of the density correction)

In general, in copying apparatuses, the following two methods are used to set the optimum copy density.

The first method is to set amount of illumination of the lamp for exposing the original to a predetermined value. The second method is to set a value of development bias to a predetermined value.

As a rational method of managing those values, it is desirable to constitute in a manner such that the optimum combination data is previously stored in a non-volatile data memory provided in the copying apparatus upon shipping and the copy density is adjusted by controlling the density adjustment key by the user himself in accordance with his taste. On the other hand, there is the situation such that the processing means changes with the elapse of time and even if the density adjustment key is set to the center (standard density value), the copy image density does not become the standard density. In such a situation, it is sufficient to be able to correct the development bias value.

However, for example, when the amount of illumination of the lamp and development bias value have once been stored to the RAM, the values which are set at present need to be displayed in the case of adjusting the illumination amount of the lamp or development bias value. However, it is also inconvenient in terms of the costs to increase the number of display LEDs in the operation display section of the copying apparatus, resulting in deterioration of the operating efficiency. Therefore, in this embodiment, the development bias value can be also displayed in the indicator for the amount of light exposed by the lamp and the exposing amount is displayed by lighting on the LED and the development bias value is displayed by flickering the LED for discrimination.

Methods of adjusting the exposing amount and development bias vlaue in this embodiment will now be described with reference to FIGS. 68 to 71.

Figure 68:
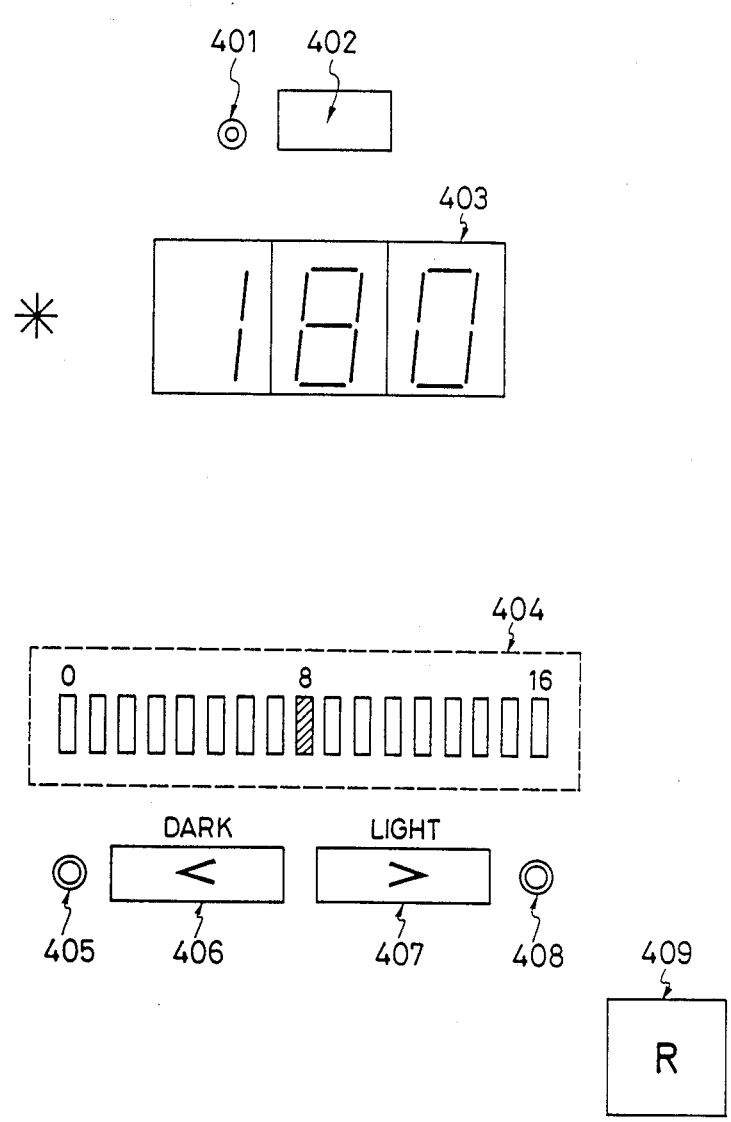
FIG. 68 is a detailed diagram showing the portion regarding the density adjustment in an operation display section shown in FIG. 3.

In FIG. 68, reference numeral 403 denotes a segment indicator of three digits corresponding to the magnification display section 154 shown in FIG. 3. The indicator 403 can also display a voltage value D-Bis of the development bias to adjust the density, as will be explained hereinafter. Numeral 404 corresponds to the density display LED 162; 406 and 407 correspond to the copy density adjustment key 114; and 405 and 408 correspond to the copy density correction key 115, respectively. Numerals 401 and 402 denote data transfer keys to store each data stored in a data ROM 440, which will be explained hereinafter, into a data RAM 441; and 409 is a turn off the display of the key to light off the development bias value which is displayed by flickering the density display LED 404. Although each of the keys 401, 402, and 409 can be provided on the operation section shown in FIG. 3, it is desirable to arrange in the copying apparatus because they are not used ordinarily.

Figure 69:
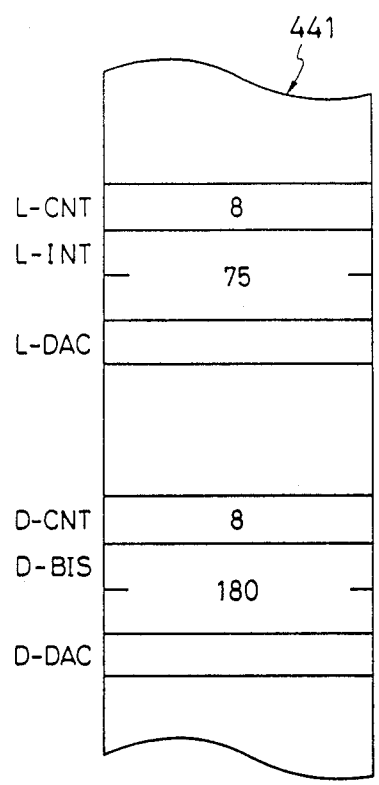
FIG. 69 is a diagram showing a data RAM 441.

FIG. 69 shows predetermined areas in the data RAM 441 which is used to adjust the exposing amount or development bias value. Each numerical value shown in the diagram denotes each data value in the area in the data RAM and each data value is backed up by a lithium battery. L-CNT indicates an exposure correction index; L-INT is a lamp control voltage value corresponding to the exposure correction index; and L-DAC is an area to store the value derived by scale converting the value of the L-INT in order to set it into a D/A converter of eight bits. Similarly, D-CNT, D-Bis, and D-DAC represent data tables of the development biases corresponding to the L-CNT, L-INT, and L-DAC, respectively.

Figure 70:
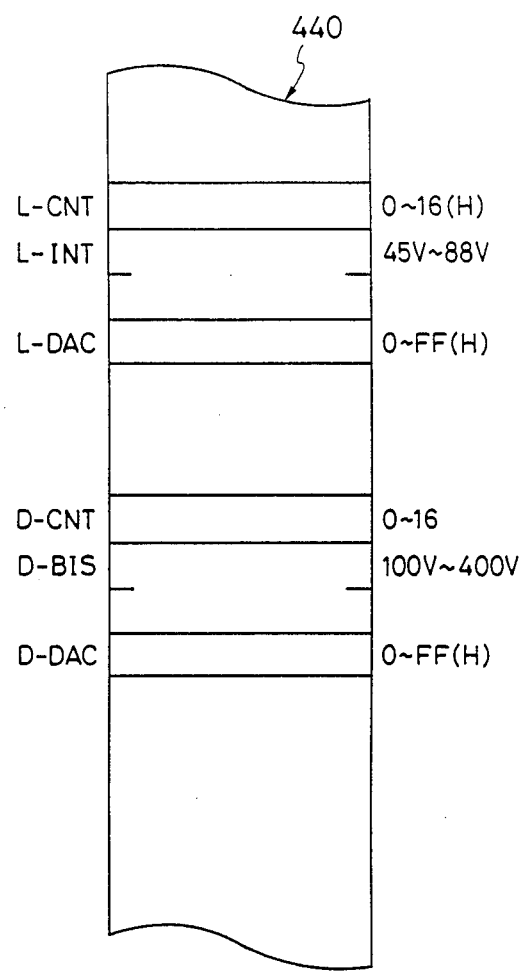
FIG. 70 is a diagram showing a data ROM 440.

FIG. 70 shows the data ROM 440 to store each standard data regarding the exposing amount and development bias value. Respective areas L-CNT to D-DAC in the data ROM 440 correspond to the areas L-CNT to D-DAC in the data RAM 441, respectively.

Each data in the data ROM 440 is previously set, for example, as the standard data upon shipping of the copying apparatus in order to obtain the optimum copy density. All of the standard data in the data ROM 440 are transferred into the data RAM 441 by pressing the data transfer key 402. On the other hand, by pressing the data transfer key 401, only the standard data stored in the areas L-CNT and D-CNT in the data ROM 440 are transferred into the corresponding areas in the data RAM 441.

Figure 71:
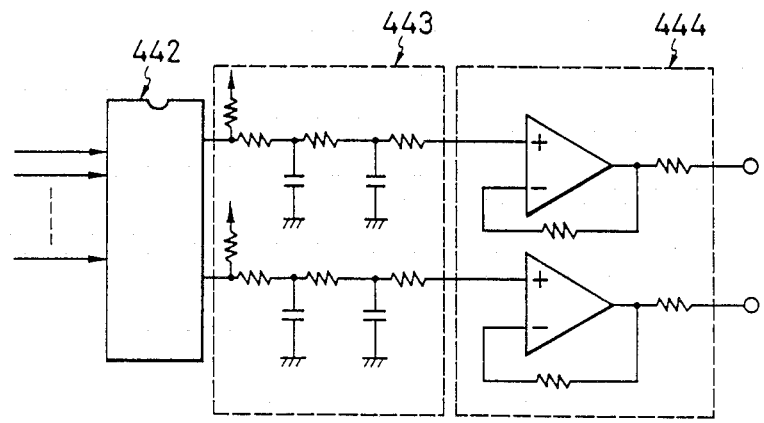
FIG. 71 is a diagram of a circuit to set a lamp control voltage value and a development bias voltage value into a light amount control circuit CVR and a high voltage generator HVT.

The foregoing control section 60 determines the exposing amount and development bias value on the basis of each data stored in the data RAM 441 when the copy operation is executed. FIG. 71 is a circuit diagram to set the lamp control voltage value and development bias voltage value stored in the areas L-INT and D-Bis in the data RAM 441 into the light amount control circuit CVR and high voltage generator HVT. FIG. 71 will be explained. When the copy key is turned on and the copy operation is started, the control section 60 scale converts the lamp control voltage and development bias voltage value stored in the respective areas L-INT and D-Bis in the data RAM 441 into the 8-bit data at predetermined timings. The control section 60 then sets these data into the areas L-DAC and D-DAC and outputs to a pulse width modulator 442. The output of the modulator 442 is converted into the DC voltage by a filter 443 and supplied to the light amount control circuit CVR and high voltage generator HVT through a buffer amplifier 444.

Methods of adjusting the exposing amount and development bias value in this embodiment will now be explained.

When the copy density adjustment key 406 or 407 is pressed, the value of the area L-CNT in the data RAM 441 is decreased or increased by "1" and one of the segments 404 corresponding to the value of the area L-CNT is turned on and shifted. Simultaneously, a predetermined value is subtracted from or added to the content of the area L-INT in the data RAM 441. When the data transfer key 402 is pressed, all of the data in the data ROM 440 are transferred into the data RAM 441. Each standard value such as, e.g., L−CNT=8, L−INT=75, and the like is written into each area in the data RAM 441. The segments of the display LED 404 corresponding to the value "8" of the area D-CNT flicker. At the same time, the value "180" of the area D-Bis is displayed by the segment indicator 403. By pressing the copy density correction key 405 or 408, the value of the area D-CNT in the data RAM 441 is decreased or increased by "1" and one of the segments 404 corresponding to the value of the area D-CNT flickers and is shifted. Simultaneously, a predetermined value is subtracted from or added to the content of the area D-Bis in the data RAM 441. When the development bias value is adjusted, the segments 404 flicker in order to distinguish from the adjustment of the exposing amount. Namely, when the copy density correction key 405 or 408 is pressed, the segments 404 flicker. When the copy density adjustment key 406 or 407 is pressed, the segments 404 are turned on. If the flickering operation and lighting operation overlap, the lighting operation is preferentially performed.

In this example, the flickering of the segments 404 can be lit off by the light-off key 409. However, even when the light-off key 409 is pressed during the lighting state of the segments 404, the segments 404 cannot be lit off. When the copy density correction key 405 or 408 is pressed, the value of the area D-Bis in the data RAM 441, i.e., the voltage value of the development bias is displayed in the magnification indicator 403.

This indication is returned to the inherent magnification indication when the copy key is pressed. An example of the adjustment will be practically explained. First, the data RAM 441 is initialized by pressing the data transfer key 402. The standard voltage value "180" of the development bias is displayed on the segment indicator 403. The segments corresponding to the standard value "8" among the segments 404 flicker. Next, the copy density correction keys 405 and 408 are properly operated so as to obtain the optimum copy density of the standard original.

As described above, in this embodiment, the shift amount of the development bias can be also displayed by the indicator which is used to adjust the exposing amount. Therefore, the development bias can be easily adjusted without providing the additional indicator which is not used ordinarily.

(Description of the automatic paper selecting mode)

The automatic paper selecting mode (hereinafter, referred to as the APS mode) which is provided for the copying apparatus in this embodiment will now be explained with reference to FIG. 72.

A plurality of cassettes (paper sizes) can be loaded in the copying apparatus of the embodiment. This copying apparatus has the APS mode to automatically select the optimum paper cassette in accordance with the size of set original and the designated variable magnification. In the diagram, a key 411, LEDs 412, 413, 414, 415, and 416, and a key 417 correspond to the key 124, LEDs 156, 156, 157, 158, and 159, and key 113 shown in FIG. 3, respectively.

Figure 72:
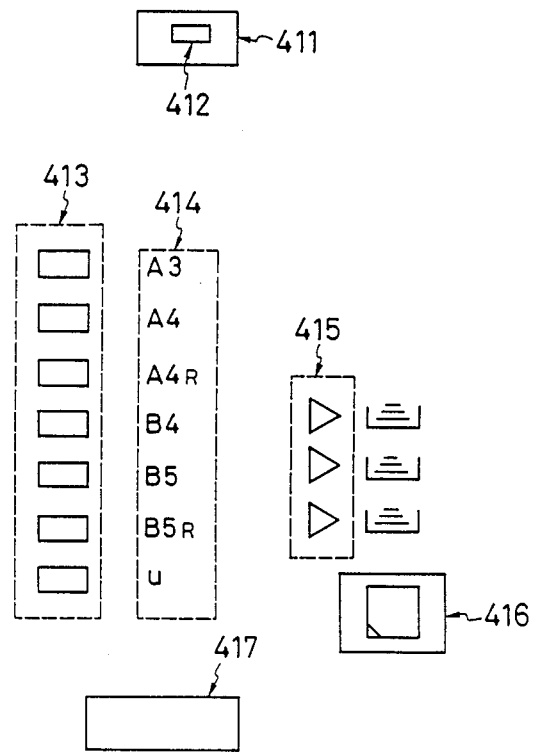
FIG. 72 is a diagram for explaining an APS mode in the embodiment.

In FIG. 72, the key 411 is used to select and release the APS mode. The selected state is displayed by the LED 412. The display section 414 displays all of the sizes of papers loaded in the cassettes in the copying apparatus at present. The LED 413 displays the paper size which is selected at present among the sizes displayed in the LED 414. However, if no paper exists in the selected cassette, the LED 413 is not turned on. The LED 415 displays the cassette at the cassette loading port (including the hand-insertion port) which is selected at present. If no paper exists in the selected cassette, the LED 416 is turned on. Numeral 417 denotes a cassette selection key. Each time the key 417 is pressed, the segments of the LED 415 are sequentially cyclically turned on and shifted one by one from the lower segment to the upper segment.

In the copying apparatus in this embodiment, when the cassette selection key 417 is pressed after the APS mode was selected, the APS mode is released and the LED 412 is turned off. When the copy key is pressed, if the original pressing plate 34 is open, it is determined that the original size cannot be detected and the APS mode is released and the papers are picked up from the lowest cassette.

The copying apparatus in this embodiment is constituted so that it can cope with various inconveniences which may occur when the APS mode was selected. For example, it can cope with the case where the optimum paper cassette to be selected does not exist where the origianl size cannot be detected due to some causes or the like.

A method of copying where the APS mode cannot be smoothly executed will be explained hereinafter.

(1) When the size of the original cannot be detected, the APS mode is released and the cassette of a predetermined priority (e.g., lowest cassette) is selected.

(2) When the power switch is turned on or the automatic clear key is pressed or the reset key 119 is pressed, if two or more paper cassettes are not loaded, the APS mode is released and only the loaded cassette is selected.

(3) When no cassette is loaded, the APS mode is released and the cassette of a predetermined priority is selected, while the no paper is indicated in this state (the LED 416 is turned on).

(4) When only one paper cassette is loaded and the cassette loading port in which no cassette is loaded is selected (while the no paper is displayed in the LED 416), if the APS key 411 is pressed, the LED 412 is once turned on in response to the depression of the APS key 411 and only the loaded cassette is then selected and the display of the no paper is turned off. Thereafter, the LED 412 is turned off and the APS mode is released.

An example of a method of detecting the size of original will now be described.

Figure 73:
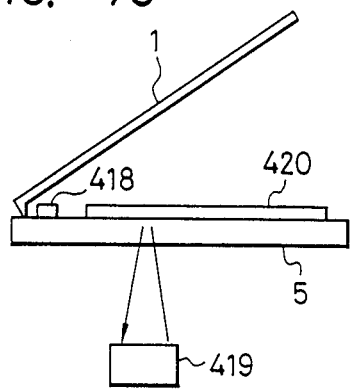
FIG. 73 is a diagram showing the upper portion of the copying apparatus in FIG. 1.

FIG. 73 is a diagram illustrating the upper portion of the copying apparatus shown in FIG. 1. In FIG. 73, reference numeral 418 denotes a switch to detect whether the original plate cover 1 is open or closed; 419 is a sensor to detect the presence or absence of an original; and 420 is an original.

Figure 74:
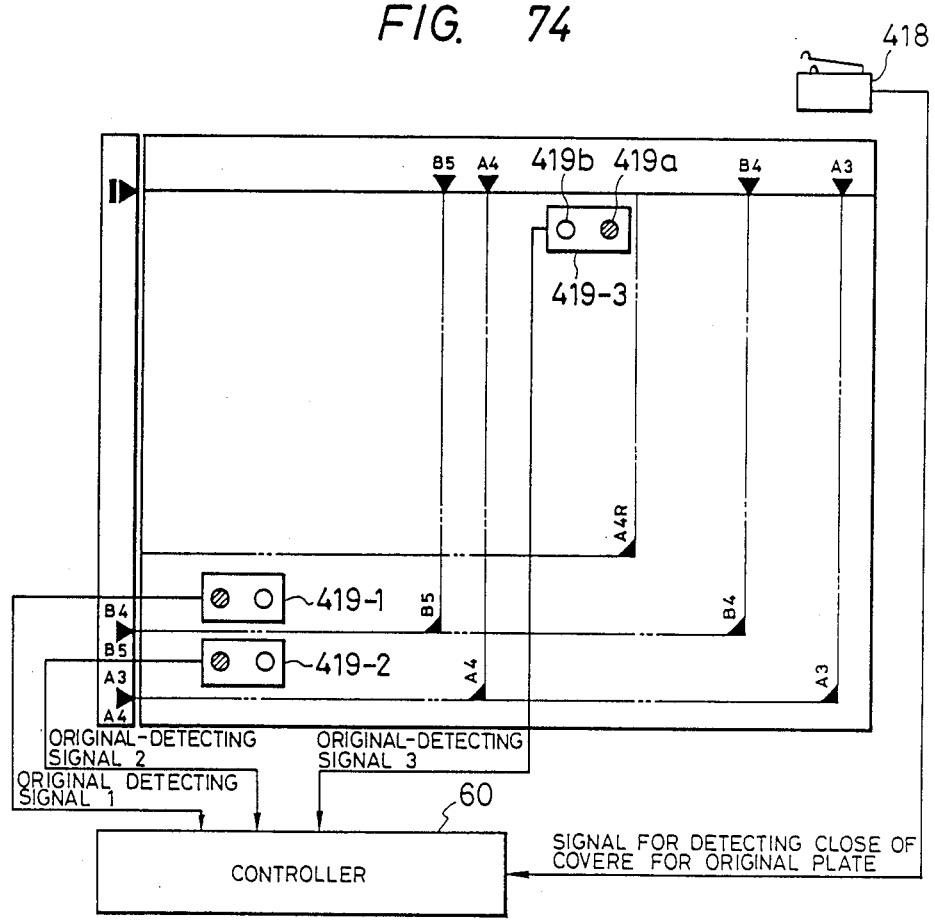
FIG. 74 is a block diagram showing a constitution of an original size detecting circuit.

FIG. 74 is a simple block diagram showing a constitution of the embodiment.

Although the copying apparatus in this embodiment has the automatic paper selecting function and the automatic variable magnification function, in the case of using these functions, it is necessary to detect the size of original to be used.

For this purpose, three original detecting circuits are arranged at positions shown in FIG. 74 below the original plate glass 5. When the original plate cover is closed, the presence or absence of the original is detected. The controller 60 checks the size of original and determines that the original size is the fixed form corresponding to either one of A3, B4, A4, and 5B.

Each of original detecting circuits 419-1 to 419-3 allows and LED 419a to emit the light onto the surface of the original and detects the reflected light by a phototransistor 419b. Each original detecting circuit converts the signal from the phototransistor into the signal indicative of the presence or absence of the original and then outputs to the controller 60.

When the original plate cover is closed at an angle smaller than about 30°, the microswitch 418 arranged on the side behind the main body of the copier is turned on, thereby detecting the original size. The original detecting circuit 419 (419-1 to 419-3) is included in the group of sensors S in FIG. 2.

The controller 60 detects the size of original on the basis of a combination of the signals indicative of the presence or absence of the original from the original detecting sensors as shown in FIG. 75.

The method of detecting the size of original is not limited to the foregoing method but it is also possible to use a method whereby an image pickup device such as a CCD or the like is attached to a part of the optical system and the edge of the original is detected, thereby detecting the original size.

(Description of the memory diagnosis)

Figure 78:
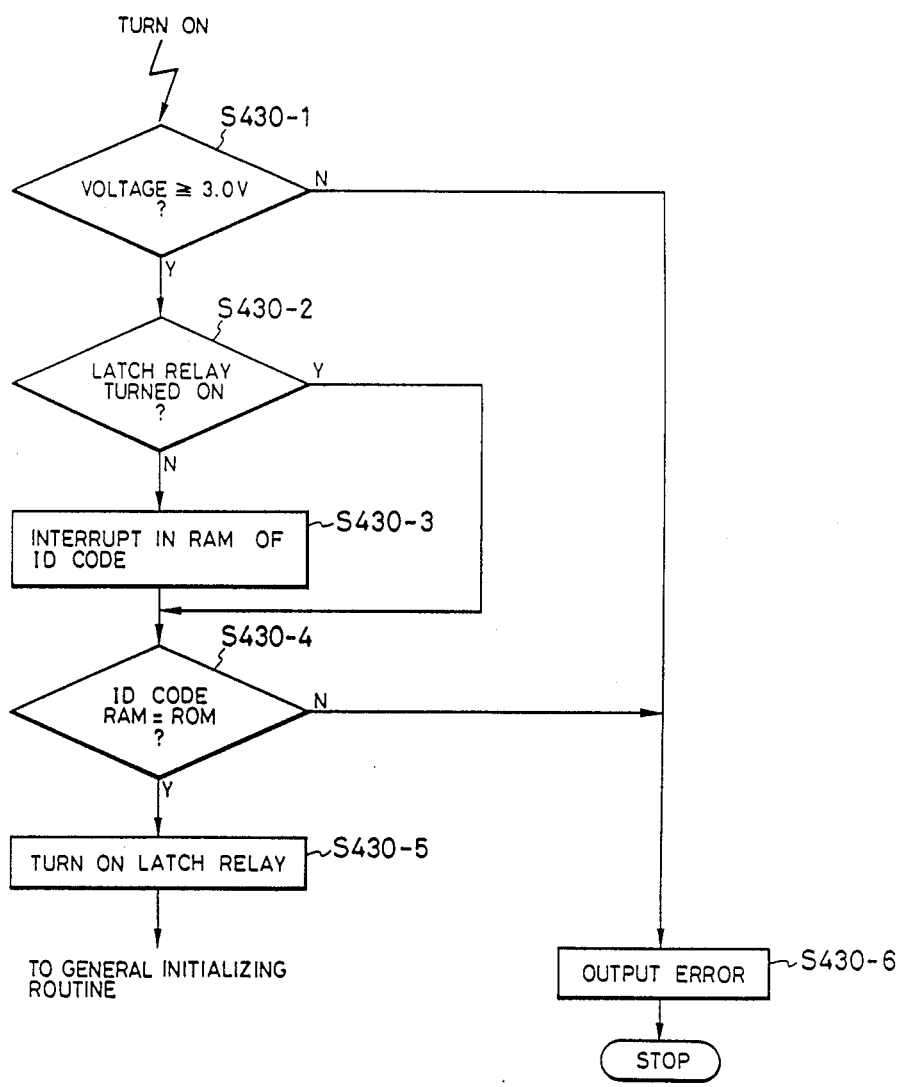

A diagnostic method of the non-volatile data memory in the embodiment will now be described with reference to FIGS. 76 to 78.

The copying apparatus in the embodiment has a non-volatile data memory 421. Various control constants, e.g., high voltage output value, exposure voltage value, resist correction value, and the like are stored in the areas in this memory. These control constants are properly read out and the copy operation is performed.

The copying apparatus in the embodiment has the diagnostic function to examine whether each data read out of the memory 421 is correct or not. By providing such a diagnostic function, the reliability of the copying apparatus is further improved.

In FIG. 76, reference numeral 421 denotes the static RAM (non-volatile data memory) having the standby function to store the various control constants; 423 is a CPU (corresponding to the controller 60 in FIG. 2) to perform various kinds of controls such as sequence control and the like on the basis of the data stored in the RAM 421; and 422 is a lithium battery which is used as a backup power source of the RAM 421. When the power source of 5V is applied to the RAM 421, $\overline{CE}=0$ and the RAM 421 can be accessed from the CPU 423. However, when the power source 5B is shut off by turning off the power switch or the like, $\overline{CE}$ becomes a high level and a holding current is supplied from the lithium battery 422 to a port VDD of the RAM 421. Thus, even if the current is shut off, the data in the RAM 421 can be held by the lithium battery 422.

In this embodiment, the output voltage of the battery 422 can be monitored by the microprocessor (CPU) 423 when the power source +5V is in the active state.

In FIG. 77, numeral 428 denotes a parallel I/O port connected to the CPU 423. A latching relay 426 can be driven by the output of the parallel I/O port 428. On the other hand, the state of the latching relay 426 is read out by the CPU 423 through the parallel I/O port 428.

The latching relay 426 is released by a push switch 427. This switch is used to initialize the data RAM 421.

The diagnostic operations of the backup power source 422 and RAM 421 which are executed by the CPU 423 will now be described in detail with reference to a flowchart shown in FIG. 78.

When the power switch is turned on, in step 430-1, the voltage of the data holding power source 422 connected to the A/D conversion input terminal of the CPU 423 is first compared with a reference voltage (e.g. 3.0 V). If it is equal to or lower than the reference value, step 430-6 follows and the data error is displayed, thereby requesting for the user to take the necessary process.

If the voltage of the power source 422 is higher than the reference value in step 430-1, step 430-2 follows and a check is made to see if the latching relay 426 has been turned on or not. If NO, the data previously stored in the ROM is transferred into a predetermined area in the RAM 421 in step 430-3. Then, a check is made in step 430-4 to see if the transferred data can be completely read out of the RAM 421 or not on the basis of the output from the ROM. If it is decided in step 430-4 that the RAM 421 is correct, the coil of the latching relay is energized in step 430-5.

If the latching relay is ON in step 430-2, it is determined that the initialization has already been performed. Then, step 430-4 follows and the data is a predetermined address in the RAM is compared with the data in a predetermined address in the ROM. If they coincide, the RAM 421 is determined to be correct.

(Description of the adjusting mode)

A method of correcting the predetermined development bias value has previously been described. The case of setting an changing the reference value itself due to some reasons such as exchange of the drum and the like will be explained hereinbelow. FIG. 79 is a diagram showing standard values of the adjustable portions in the copying apparatus. These values are stored into the RAM.

In the factory, the copying apparatuses are preliminarily adjusted one by one and the adjustment values are written on a label sticked in each apparatus. At the market, when the control board in which the adjustment values are stored is exchanged, the data of the RAM is rewritten in accordance with the content written on the label. When the new values are input at the market, they are written on the label.

In adjustment, the kind of data is recognized by the data number, the data number is displayed in the copy number indicator 160, and the standard value is displayed in the magnification indicator 154.

An adjusting method will now be described.

By pressing a tact switch (not shown) attached to a portion other than the operation section and further by pressing the ✱ key 121, the adjusting mode is set and the copy number indicator 160 displays □, namely, the data number 0. Namely, a constant of inclination of the AE (automatic density adjusting mode) is displayed in the copy magnification indicator 154. The "%" indicator 153 is turned off and the "*" indicator 152 blinks, thereby informing the changeable state.

In this state, numerical values are directly input by the ten-key 122, or the value displayed in the magnification indicator 154 is increased or decreased by the zoom key 109. After a desired copy magnification was set, by pressing the [*] key 121, the value displayed in the copy magnification indicator 154 is stored into the RAM as the content of the data number 0 and at the same time, the next adjustment value will be set. The copy number indicator 160 displays ¦ , and the value corresponding to the data number 1 is indicated in the indicator 154. The above operations are similarly executed until the data number 16. By pressing the [*] key 121 when the data number is 16, the data number is returned to 0 and the adjustment can be again performed.

When the user wants to finish the adjustment, by pressing the reset key 119 at any time, the adjusting mode is released and the standard mode is set, so that the copy can be performed.

(Description of the editor: III)

Figure 80:
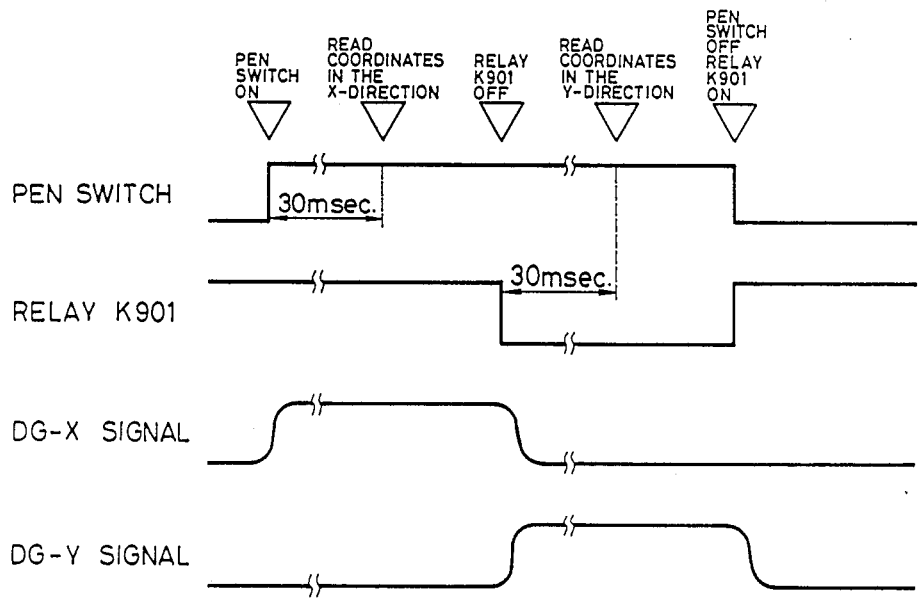
FIGS. 80 to 82 are diagrams showing the reading operation of coordinates in a conventional editor.

FIG. 80 shows a timing chart for inputting coordinates by the editor 70. When the pen switch is turned on, the CPU 60 performs the process to input coordinates by the editor. When the pen switch is turned on, the relay $K_{901}$ is in the operative mode. At this time, the editor 70 is expressed by the equivalent circuit shown in FIG. 5-2. An editor signal DG-X becomes as shown by the DG-X signal in FIG. 80 when considering the time constant of the electric circuit. When the relay $K_{901}$ is in the inoperative mode, the editor 70 is expressed by the equivalent circuit shown in FIG. 5-3. An editor signal DG-Y becomes as shown by the DG-Y signal in FIG. 80 when considering the time constant of the electric circuit. The CPU 60 reads the editor signal DG-X after the expiration of 30 msec from the timing of the turn-on of the pen switch. The relay $K_{901}$ is turned off after the elapse of about 1 msec from the completion of the reading of the signal DG-X. The CPU 60 also reads the editor signal DG-Y after the elapse of 30 msec from the timing of the turn-off of the relay $K_{901}$. The time of 30 msec is provided to prevent the influence of the chattering of the pen switch and relay $K_{901}$.

Figure 81:
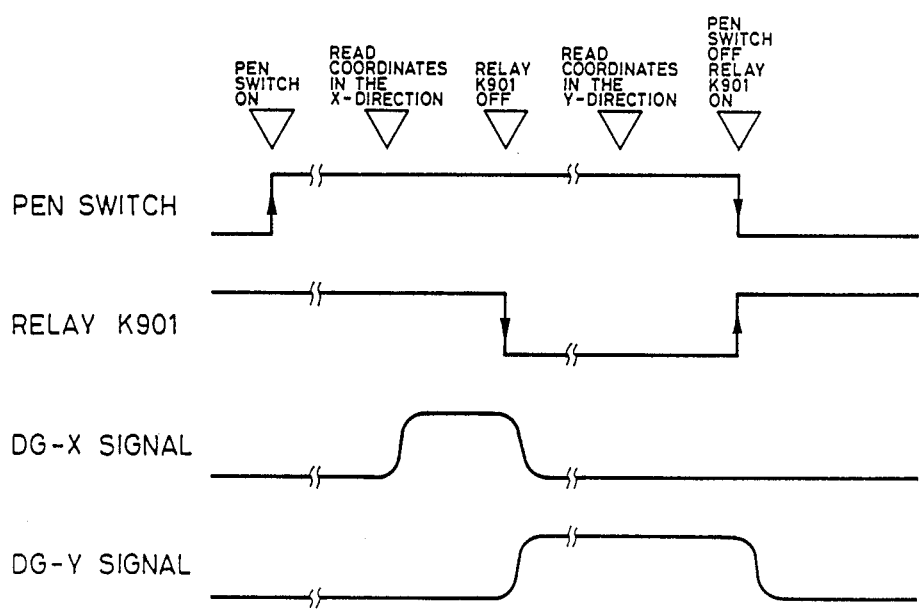

On the other hand, there is the possibility such that when the pen switch is turned on without sufficiently pressing the resistor of the editor 70, the DG-X signal of the editor is output after readout timing of the CPU. FIG. 81 shows a situation in such a case. At this time, an error occurs in the readout value of the coordinate in the X direction of the editor.

Figure 82:
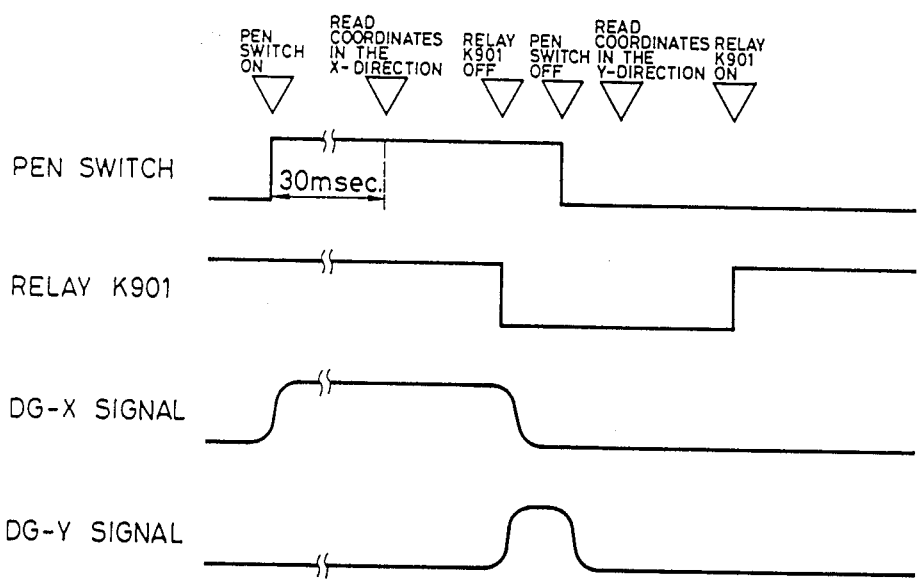

When the pen switch is removed from the resistor of the editor 70 before the coordinate in the Y direction is read, the DG-Y signal becomes as shown in FIG. 82. In this case, an error occurs in the readout coordinate value in the Y direction of the editor.

Figure 83:
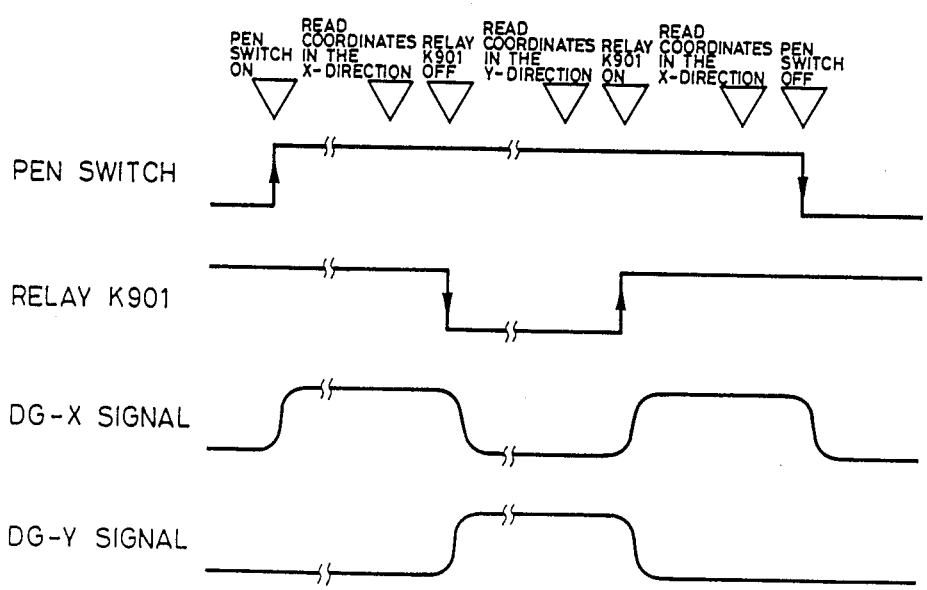
FIG. 83 is a diagram showing the reading operation of coordinates in an editor of the invention.

Due to the above reasons, errors occur in the readout coordinate data in the X and Y directions. Therefore, as shown in FIG. 83, after the DG-Y signal was read, the DG-X signal is again read out and compared with the first DG-X signal read out. If they do not coincide, the input coordinate data is regarded as the invalid data and the buzzer is not actuated. If the difference between those two DG-X signals falls within a predetermined range, the input coordinate data is considered to be the valid data. By comparing the input coordinate data from the editor as explained above, the reliability of the input data can be improved.

Figure 84:
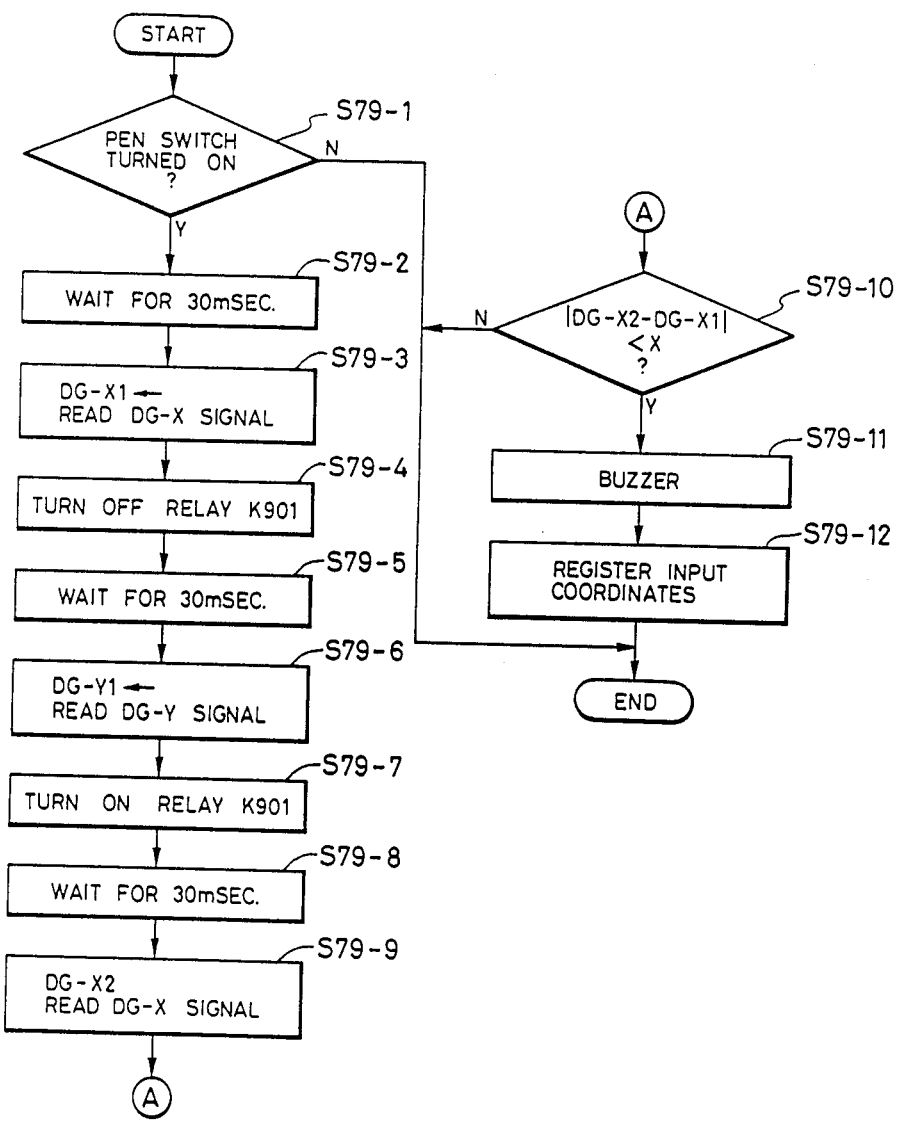
FIG. 84 is a flowchart showing the reading operation of coordinates.

FIG. 84 shows a flowchart in this case. When the pen switch is turned on (step 79-1), the apparatus waits for 30 msec (step 79-2) to remove the chattering of the pen switch. The DG-X signal is read and set to DG-$X_1$ (step 79-3). Next, after the elapse of about 1 msec, the relay $K_{901}$ is turned off (step 79-4). The apparatus waits for 30 msec (step 79-5) to remove the chattering of the relay. The DG-Y signal is read and set to DG-$Y_1$ (step 79-6). After the expiration of about 1 msec, the relay $K_{901}$ is again turned on (step 79-7). The apparatus waits for 30 msec (step 79-8). After the chattering of the relay was removed, the DG-X signal is read and set to DG-X (step 79-9).

The signals DG-$X_1$ and DG-$X_2$ are compared (step 79-10). If the difference between them lies within a predetermined value X, it is possible to decide, that such a phenomenon as shown in FIGS. 81 or 82 does not occur. If the input coordinate data is correct, the buzzer is actuated (step 79-11) and the input coordinate data is registered (step 79-12). On the contrary, if the difference exceeds the predetermined value X, the input coordinate data is decided to be invalid. By changing the value X, the reliability can be improved even in the case of the cheap editor.

In addition, by increasing the number of comparison times with respect to the DG-X and DG-Y signals, the reliability is further improved.

(Description of the supply of the color toner)

The supply of the toner will now be described.

Figure 85:
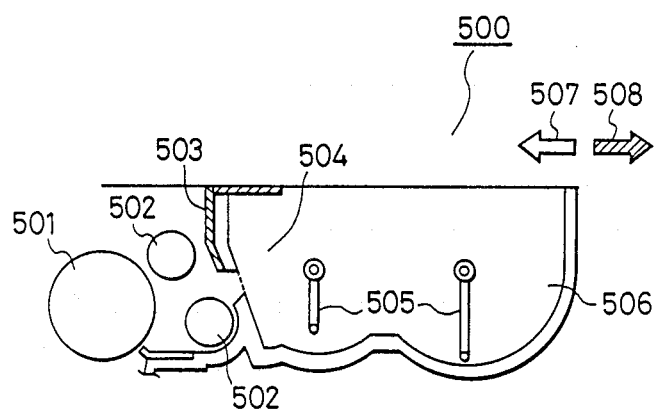
FIG. 85 is a diagram showing a constitution of a color development container.
Figure 86:
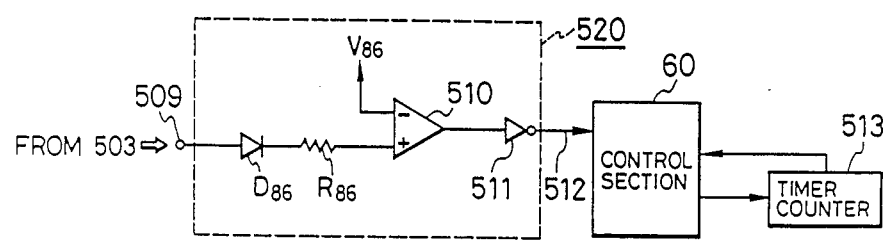
FIG. 86 is a diagram showing a circuit to detect a remaining toner amount.

FIG. 85 shows a constitution of the color development container. FIG. 86 shows a circuit to detect the amount of remaining color toner. In the diagrams, reference numeral 500 denotes a color development container and corresponds to the color development container 7 in FIG. 1; 501 is a development cylinder; 502 denotes a stirring screw; 503 denotes an AC voltage detecting plate; 504 denotes a color toner supply window; 505 denotes a stirring rod; 506 denotes a color toner hopper; 507 denotes an arrow which indicates a direction to press the development container; and 508 denotes an arrow which indicates a direction to release the pressing action.

One end of the stirring rod 505 is formed like an L-shape. When the rod 505 rotates, this L-shaped portion serves to transport the toner in the color toner hopper into the development cylinder 501.

In a circuit 520 to detect the residual color toner amount in FIG. 86, the AC voltage applied to the development cylinder 501 is input from the AC voltage detecting plate 503 through the toner and applied to an input terminal 509. The applied AC voltage is rectified by a diode $D_{86}$ and then supplied to the positive side of a comparator 510 through a resistor $R_{86}$. The rectified voltage is compared with a reference voltage $V_{86}$ on the negative side. If the rectified voltage is higher than the reference voltage $V_{86}$, a "1" signal is output. If it is lower than $V_{86}$, a "0" signal is output. When a sufficient amount of toner exists around the development cylinder 501, the development agent has a large resistance, so that the input voltage from the AC voltage detecting plate 503 becomes low. The output of the comparator 510 becomes "0". On the contrary, when an amount of toner is less, the development agent has a low resistance, so that the output of the comparator 510 becomes "1".

The output of the comparator 510 is inverted by an inverter 511 and supplied as an output 512 to the control section 60. A timer counter 513 counts up by the signal indicative of the absence of the toner and is reset by the signal indicative of the existance of the toner.

The residual color toner detecting circuit operates during the copy operation. An amount of toner which will be determined to be the absence of the toner can be easily decided by changing the reference voltage $V_{86}$ on the negative side of the comparator 510.

Figure 87A:
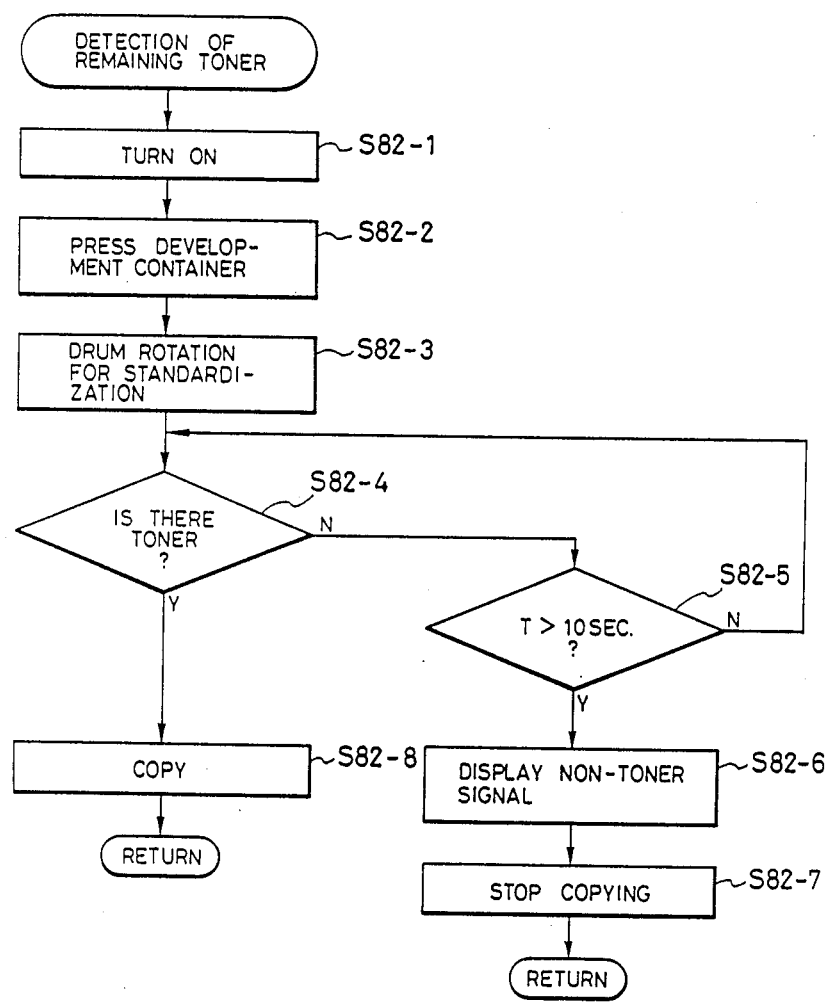
FIGS. 87A and 87B are flowcharts showing the operations to detect a remaining color toner

Flowcharts shown in FIGS. 87A and 87B will now be described. In general, the first side in the serial-copy mode is likely to be deposited with the toner and to be supplied with a too much amount of toner as compared with the second and subsequent sides. Therefore, in this embodiment, the control sequences for the first side and the second and subsequent sides in the serial-copy mode are made differ. When the color copy is performed after the turn-on of the power source, an amount of toner is checked in accordance with FIG. 87A in the case of the color copy of the first side. The power switch is turned on (step 82-1). The color development container 7 (500) is pressed onto the surface of the drum (step 82-2). The drum is rotated for standardization for about four seconds (step 82-3), thereby uniforming the deposition state of the development agent on the development cylinder. Next, the output 512 of the residual color toner detecting circuit is read to check the presence or absence of the toner (step 82-4). If the absence of toner is detected, a check is made to see if the no toner signal has continued for a time longer than ten seconds or not (step 82-5). If YES, the no toner is displayed (step 82-6) and the copy operation is stopped (step 82-7), thereby preparing for the supply of the toner.

Figure 87B:
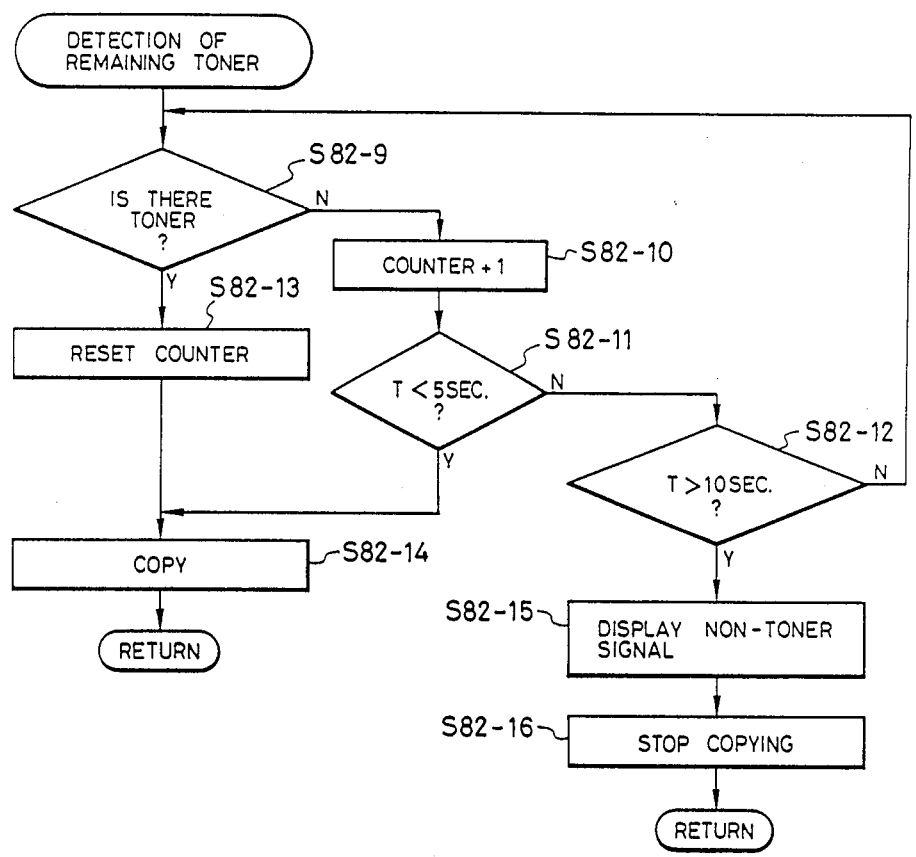

In the other cases, namely, in the case of the second and subsequent sides, the control is executed in accordance with FIG. 87B. The output 512 of the residual color toner detecting circuit is read to check an amount of toner (step 82-9). Each time the no toner signal is input, the count value of the timer counter is increased by "+1" (step 82-10). A check is made in step 82-11 to see if the time of the timer is shorter than five seconds or not. If YES, the copy operation is performed (step 82-14). If it is equal to or longer than five seconds, the copy operation is not performed but the signal is always checked in steps 82-9 to 82-12. In step 82-12, a check is made to see the time of the timer is equal to or longer than ten seconds or not. If it is ten seconds or longer, no toner is displayed (step 82-15) on the copy operation is stopped (step 82-16), thereby preparing or the the supply of the toner. The timer counter is reset when the existence of the toner is detected in step 82-13. The no toner may be also displayed after a series of operations were finished as mentioned above.

Although the description has been made with respect to the color toner development agent in this embodiment, the invention can be also obviously applied to every development agent consisting of two components. Also, although the AC voltage detecting plate is the single plate in this embodiment, if it is divided into a plurality of plates and connected to the residual color toner detecting circuit by well-known switching means and the residual toner is detected, a partial toner amount of the development agent in the development container can be controlled.

What is claimed is:

1. A coordinate input apparatus comprising:
   a tablet;
   a position designating device for designating an arbitrary position on said tablet;
   output means for outputting coordinate data for image processing corresponding to the coordinate of said position on said tablet designated by said position designating device; and
   control means for controlling said output means such that when a position on said tablet corresponding to a coordinate adjacent to a predetermined coordinate is designated by said position designating device, coordinate data related to said adjacent coordinate is corrected so that said output means outputs coordinate data relating to said predetermined coordinate.

2. A coordinate input apparatus according to claim 1, further comprising correcting means for correcting coordinate data relating to a plurality of coordinates adjacent to said predetermined coordinate.

3. A coordinate input apparatus according to claim 1, wherein said predetermined coordinate is a coordinate of maximum value or of minimum value, wherein said position designating device designates a position on said tablet corresponding to said predetermined maximum or minimum value coordinate.

4. A coordinate input apparatus according to claim 1, wherein said output means outputs said coordinate data corresponding to positions in first and second directions with respect to a position on said tablet.

5. A coordinate input apparatus according to claim 1, wherein said adjacent coordinate corresponds to a coordinate in the vicinity of the edge of the area on said tablet within which points are adapted to be designated on said tablet by said position designating device.

6. A coordinate input apparatus according to claim 1, wherein said tablet includes a sheet resistor.

7. A coordinate input apparatus according to claim 6, wherein said sheet resistor includes a first sheet resistor for recognizing said position designated by said position designating device in the vertical direction and a second sheet resistor for recognizing said position designated by said position designating device in the horizontal direction.

8. A coordinate input apparatus according to claim 7, wherein said position designating device is adapted to designate an area on said tablet, wherein said tablet includes an image processing mode area, and wherein when said area is designated by said position designating device, said output means outputs a signal indicating the mode in which data corresponding to a point on said tablet is to be processed.

9. A coordinate input apparatus comprising:
   a tablet;
   a pointing device for designating an arbitrary point on said tablet;
   means for recognizing positions in first and second directions from said point designated by said pointing device, wherein said recognizing means recognizes said positions in the following order: a position in said first direction, a position in said second direction, and a position in said first direction, wherein said recognizing means recognizes said positions in said first direction at a first time and at a second time;
   determining means for determining whether said positions recognized at said first and second times in said first direction substantially coincide with each other; and control means for identifying the point designated by said pointing device as valid or invalid in response to the determining by the determining means of whether the positions recognized at said first and second times in said first direction substantially coincide with each other.

10. A coordinate input apparatus according to claim 9, further comprising storage means for storing data representing said positions in said first and second directions, recognized by said recognizing means.

11. A coordinate input apparatus according to claim 10, wherein when said determining means determines that the points recognized at said first and second times in the first direction do not substantially coincide, said control means identifies said data stored in said storage means, as being invalid.

12. A coordinate input apparatus according to claim 10, wherein when said determining means determines that the points recognized at said first and second times in the first direction substantially coincide, said control means identifies said data, stored in said storage means, as being invalid.

13. A coordinate input apparatus according to claim 12, further comprising mean for displaying that the data is valid.

14. A coordinate input apparatus according to claim 9, wherein said pointing device is in the shape of a pen.

15. A coordinate input apparatus according to claim 9, wherein said tablet includes a first sheet resistor for recognizing said designated point in the first direction and a second sheet resistor for recognizing said designated point in the second direction.

16. A coordinate input apparatus according to claim 9, wherein said determining means compares the positions recognized by said recognizing means at said first and second times with each other.

17. A coordinate input apparatus comprising:
a tablet including a first area for identifying a coordinate for image processing and a second area for identifying a mode of image processing;
a pointing devide for designating an arbitrary position in said first or second area; and
informing means for informing a user of the apparatus that said coordinate has been designated by said pointing device or that said mode has been designated by said pointing device, wherein said informing means produces different sounds when informing the user that said coordinate and said mode have been designated.

18. A coordinate input apparatus according to claim 17, wherein said informing means changes the period of time during which the sounds are produced.

* * * * *

UNITED STATES PATENT AND TRADEMARK OFFICE
CERTIFICATE OF CORRECTION

PATENT NO. : 4,766,404
DATED : August 23, 1988
INVENTOR(S) : Ishida, et al.

It is certified that error appears in the above-identified patent and that said Letters Patent is hereby corrected as shown below:

SHEET 9

Fig. 8, "DESIGNTED" should read --DESIGNATED--.

SHEET 10

Fig. 9, "DESIGNTED" should read --DESIGNATED--.

SHEET 13

Fig. 12, " TURN OF BUZZER " should read -- TURN ON BUZZER --; and

Fig. 13, " TURN OF BUZZER " should read -- TURN ON BUZZER --.

SHEET 15

Fig. 15, "INHIBITATION" should read --INHIBITION--.

UNITED STATES PATENT AND TRADEMARK OFFICE
CERTIFICATE OF CORRECTION

PATENT NO. : 4,766,404                   Page 2 of 10
DATED      : August 23, 1988
INVENTOR(S): Ishida, et al.

It is certified that error appears in the above-identified patent and that said Letters Patent is hereby corrected as shown below:

SHEET 18

Fig. 19, "FIAG" should read --FLAG--.

SHEET 19

Fig. 20, "TIMIN" should read --TIMING--.

SHEET 24

Figure 29:
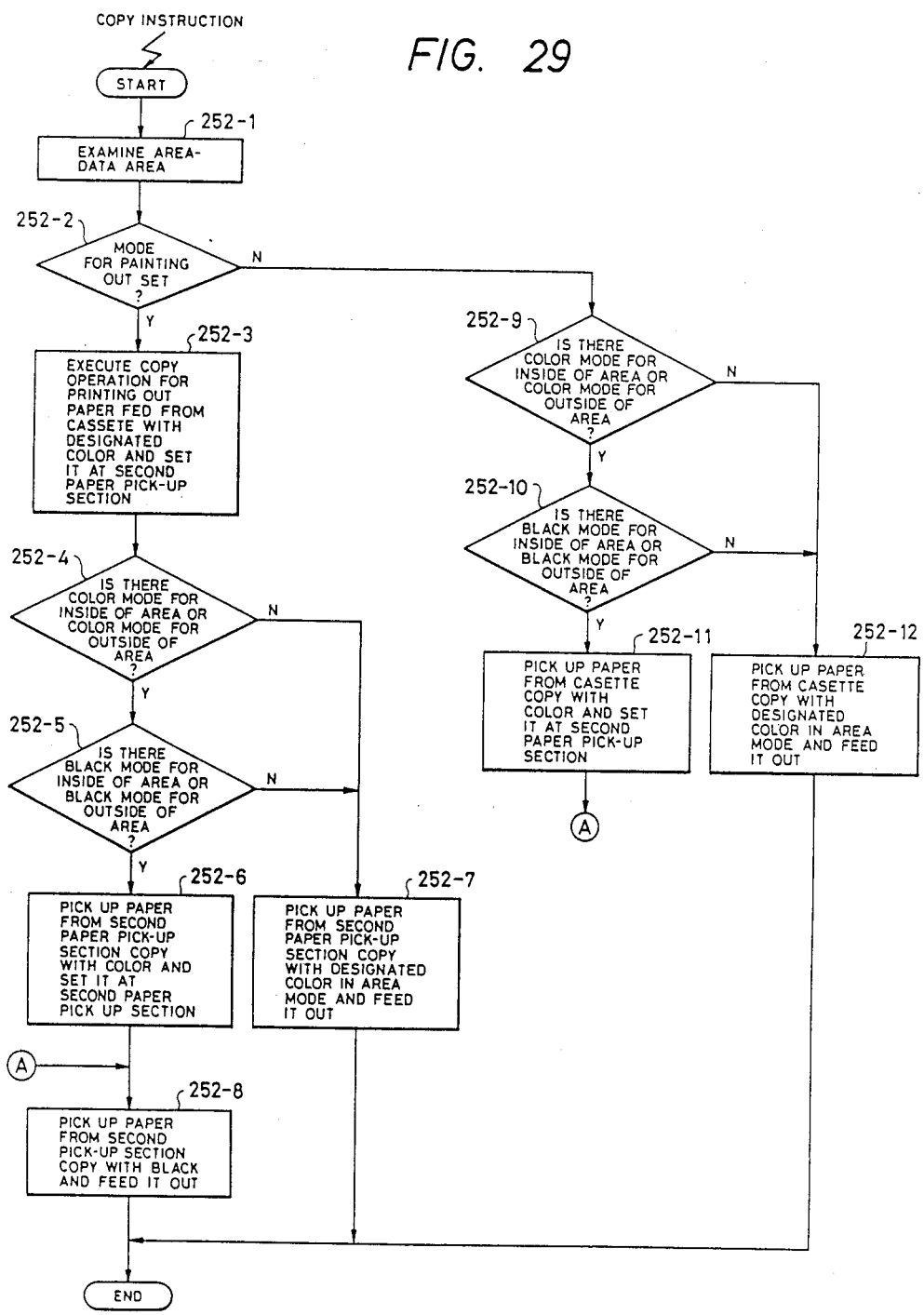
FIGS. 29 and 30 are flowcharts showing the copying operation in the case of designating an area.

Fig. 29, "CASSETE" should read --CASSETTE--; and

"CASETTE" should read

--CASSETTE--(both occurences).

SHEET 47

Fig. 74, "COVERE" should read --COVER--.

SHEET 50

Fig. 79, "COUNTAINER" should read

--CONTAINER-- (both occurences).

COLUMN 2

Line 46, "is diagrams" should read --is a diagram--.

COLUMN 3

Line 20, "toner" should read --toner amount.--;

UNITED STATES PATENT AND TRADEMARK OFFICE
CERTIFICATE OF CORRECTION

PATENT NO. : 4,766,404              Page 3 of 10

DATED : August 23, 1988

INVENTOR(S) : Ishida, et al.

It is certified that error appears in the above-identified patent and that said Letters Patent is hereby corrected as shown below:

Line 33, "denotes," should read --denotes--;

Line 37, "As" should read --A--; and

Line 39, "come" should read --comes--.

COLUMN 4

Line 53, "container 8." should read --toner.--; and

Line 55, "container 7." should read --toner.--.

COLUMN 7

Line 37, "multi-copying." should read

--multi-copying operation.--.

COLUMN 8

Line 23, "keyboard the" should read

--keyboard to input the--.

COLUMN 10

Line 41, "to the" should read --the--.

UNITED STATES PATENT AND TRADEMARK OFFICE
CERTIFICATE OF CORRECTION

PATENT NO. : 4,766,404
DATED : August 23, 1988
INVENTOR(S) : Ishida, et al.

It is certified that error appears in the above-identified patent and that said Letters Patent is hereby corrected as shown below:

<u>COLUMN 11</u>

Line 35, "by with" should read --with--; and

Line 64, "LEd" should read --LED--.

<u>COLUMN 12</u>

Line 14, "be also" should read --also be--; and

<u>COLUMN 13</u>

Line 32, "either" should be deleted.

<u>COLUMN 16</u>

Line 22, "the," should read --the--; and

Line 41, "relating the" should read --relating to the--.

UNITED STATES PATENT AND TRADEMARK OFFICE
CERTIFICATE OF CORRECTION

PATENT NO. : 4,766,404
DATED : August 23, 1988
INVENTOR(S) : Ishida, et al.

It is certified that error appears in the above-identified patent and that said Letters Patent is hereby corrected as shown below:

COLUMN 17

Line 11, "time operation" should read
--time the operation--;

Line 20, "ten-key 122 keyboard" should read
--ten-key keyboard 122--; and

Line 25, "ten-key 122 keyboard" should read
--ten-key keyboard 122--.

COLUMN 18

Line 1, "lacks," should read --is absent--;

Line 16, "t he" should read --the--; and

Line 65, "differ." should read --to differ--.

COLUMN 20

Line 68, "at the" should read --a--.

COLUMN 21

Line 43, "point key 109," should read
--point key 104,--.

UNITED STATES PATENT AND TRADEMARK OFFICE
CERTIFICATE OF CORRECTION

PATENT NO. : 4,766,404
DATED : August 23, 1988
INVENTOR(S) : Ishida, et al.

It is certified that error appears in the above-identified patent and that said Letters Patent is hereby corrected as shown below:

COLUMN 25

Line 2, "step 200-2" should read --step 202-2--.

COLUMN 28

Line 26, "finished. FIG." should read

--finished. ¶ FIG.--.

COLUMN 29

Line 58, "ten-key 122," should read

--ten-key keyboard 122,--; and

Line 62, "to the" should read --to match the--.

COLUMN 30

Lines 5-6, "followinq" should read --following--; and

Line 25, "news" should read --news items--.

COLUMN 31

Line 19, "have" should read --have been--.

COLUMN 34

Line 67, "rotated" should read --is rotated--.

UNITED STATES PATENT AND TRADEMARK OFFICE
CERTIFICATE OF CORRECTION

PATENT NO. : 4,766,404

DATED : August 23, 1988

INVENTOR(S) : Ishida, et al.

It is certified that error appears in the above-identified patent and that said Letters Patent is hereby corrected as shown below:

COLUMN 35

Line 10, "was" should read --is--;

Line 21, "was away" should read --is removed--;

Line 24, "to be" should read --to--; and

Lines 60-61, "it was detected that the cassette is ready to be come off." should read --detection that the cassette is ready to come off.--.

COLUMN 36

Line 68, "modes." should read --mode.--.

COLUMN 37

Line 35, "comes." should read --begins.--.

COLUMN 39

Line 64, "warns to" should read --warns--.

COLUMN 41

Line 60, "than" should read --more than--; and

Line 61, "than" should read --less than--.

UNITED STATES PATENT AND TRADEMARK OFFICE
CERTIFICATE OF CORRECTION

PATENT NO. : 4,766,404

DATED : August 23, 1988

INVENTOR(S) : Ishida, et al.

It is certified that error appears in the above-identified patent and that said Letters Patent is hereby corrected as shown below:

COLUMN 43

Line 39, "set" should read --set the--;

Line 62, "costs" should read --cost--; and

Line 68, "on" should be deleted.

COLUMN 44

Line 18, "turn off the display of the key to light off the" should read --light-off key to turn off the display of the--.

COLUMN 46

Line 23, "sequentially cyclically" should read --sequentially and cyclically--.

COLUMN 47

Line 16, "and 5B." should read --or B5--; and

Line 18, "allows and" should read --allows an--.

COLUMN 48

Line 39, "data is" should read --data in--;

Line 47, "an" should read --and--; and

UNITED STATES PATENT AND TRADEMARK OFFICE
CERTIFICATE OF CORRECTION

PATENT NO. : 4,766,404

DATED : August 23, 1988

INVENTOR(S) : Ishida, et al.

It is certified that error appears in the above-identified patent and that said Letters Patent is hereby corrected as shown below:

Line 55, "sticked" should read --stuck--.

COLUMN 49

Line 1, "☐," should read --⌐¬,--; and

Line 8, "ten-key 122," should read

--ten-key keyboard 122,--.

COLUMN 50

Line 17, "set to DG-X" shuld read --set to $DG-X_2$--.

COLUMN 51

Line 8, "existance" should read --existence--;

Line 17, "a" should be deleted;

Line 21, "differ." should read --to differ.--;

Line 50, "see the" should read --see if the--;

Line 52, "on the" should read --and the--; and

Line 53, "or the" should read --for the--.

COLUMN 53

Line 17, "data" should read --data,--; and

Line 27, "mean" should read --means--.

UNITED STATES PATENT AND TRADEMARK OFFICE
CERTIFICATE OF CORRECTION

PATENT NO. : 4,766,404
DATED : August 23, 1988
INVENTOR(S) : Ishida, et al.

It is certified that error appears in the above-identified patent and that said Letters Patent is hereby corrected as shown below:

COLUMN 54

Line 16, "devide" should read --device--.

Signed and Sealed this

Thirtieth Day of January, 1990

Attest:

JEFFREY M. SAMUELS

Attesting Officer  Acting Commissioner of Patents and Trademarks